US012686352B2

(12) United States Patent
Young et al.

(10) Patent No.: US 12,686,352 B2
(45) Date of Patent: Jul. 21, 2026

(54) MACHINE LEARNING-BASED CONTINUOUS MONITORING FOR IMPROVING CRASH DETECTION AND RESPONSE SYSTEM ACCURACY

(71) Applicant: Cambridge Mobile Telematics Inc., Cambridge, MA (US)

(72) Inventors: Cornelius F. Young, Needham, MA (US); Burak Erem, Needham, MA (US); István Madarász, Budapest (HU); Christine Huang, Quincy, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 47 days.

(21) Appl. No.: 18/812,764

(22) Filed: Aug. 22, 2024

(65) Prior Publication Data

US 2025/0065836 A1      Feb. 27, 2025

Related U.S. Application Data

(60) Provisional application No. 63/578,885, filed on Aug. 25, 2023.

(51) Int. Cl.
*B60R 21/0132*      (2006.01)
*G06N 20/00*      (2019.01)

(52) U.S. Cl.
CPC ......... *B60R 21/0132* (2013.01); *G06N 20/00* (2019.01); *B60R 2021/01322* (2013.01)

(58) Field of Classification Search
None
See application file for complete search history.

(56) References Cited

U.S. PATENT DOCUMENTS 9,818,239 B2    11/2017    Pal et al.
10,246,037 B1    4/2019    Shea et al.
(Continued)

FOREIGN PATENT DOCUMENTS

DE    102005042203 A1 *    3/2007    ......... B60R 21/0132
EP        3744601 B1    4/2024
(Continued)

OTHER PUBLICATIONS

English Translation of DE 102005042203 A1 (Year: 2007).*
EP24196274.5, "Extended European Search Report", Jan. 31, 2025, 8 pages.

*Primary Examiner* — James J Lee
*Assistant Examiner* — Melanie G Huber
(74) *Attorney, Agent, or Firm* — Kilpatrick Townsend & Stockton LLP

(57)      ABSTRACT

Techniques for using machine learning-based continuous monitoring to improve crash detection and response system accuracy are provided. In examples, a driving event is detected as it occurs at a first time from driving data collected by a plurality of sensors of a mobile device disposed in a vehicle during a trip. After a second time, a crash prediction model is executed on driving data leading up to the second time to generate a first crash classification. In response to determining that the first crash classification meets first criterion, an escalation action sequence is initiated based on a severity of the crash prediction. After a third time, the crash model is executed on driving data leading up to the third time to generate a second classification, from which it is determined whether to terminate the escalation action sequence prior to an automatic execution of an action.

18 Claims, 32 Drawing Sheets

(56)  References Cited

U.S. PATENT DOCUMENTS

| | | | | |
|---|---|---|---|---|
| 11,012,667 | B1 * | 5/2021 | Nodder | H04N 7/181 |
| 2017/0053461 | A1 * | 2/2017 | Pal | G08G 1/012 |
| 2018/0218549 | A1 * | 8/2018 | Wahba | G06Q 10/00 |
| 2019/0335035 | A1 * | 10/2019 | Borras | H04M 1/72421 |
| 2021/0049837 | A1 * | 2/2021 | Karnik | G06N 3/04 |
| 2022/0242427 | A1 | 8/2022 | Petersen et al. | |

FOREIGN PATENT DOCUMENTS

| | | | |
|---|---|---|---|
| EP | 3507787 | B1 | 8/2024 |
| EP | 4005252 | B1 | 1/2025 |
| EP | 3588373 | B1 | 6/2025 |
| WO | 2022087163 | A1 | 4/2022 |

* cited by examiner

Computing Device 104

Sensor Data Block
108

Data Transmission Block
164

Electronic Device 204

Vector Determiner
212

Crash Service Provisioning
Engine
228

Crash Service Escalation
Engine
234

Vector Analyzer
208

Data Storage
236

External Information Receiver
216

Classifier
220

Activity Detection Engine
232

200

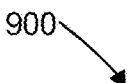

900

| Operating a plurality of sensors of a computing device to collect driving data during a trip in a vehicle | 902 |

↓

| Detecting, using the driving data, a driving event as it occurs at a first time | 904 |

↓

| Executing, after a first predefined duration starting at the first time and ending at a second time, a crash prediction model on the driving data collected up to the second time to generate a first crash classification | 906 |

↓

| Determining that the first crash classification meets a first predefined crash threshold criterion | 908 |

↓

| Initiating an escalation action sequence that comprises a plurality of actions that are automatically executed at predefined points in time according to a predefined order | 910 |

↓

| Determining, prior to each predefined point in time, whether the driving data collected up to the corresponding predefined point in time confirms the first crash classification | 912 |

↓

| Terminating the escalation action sequence prior to the execution of an action in response to determining that the driving data collected up to the corresponding predefined point in time contradicts the first crash classification | 914 |

FIG. 9

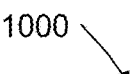

1000

| Operating a plurality of sensors of a computing device to collect driving data during a trip in a vehicle | 1002 |

| Detecting, using the driving data, a driving event as it occurs at a first time | 1004 |

| Executing, after a first predefined duration starting at the first time and ending at a second time, a crash prediction model on the driving data collected up to the second time to generate a first crash classification | 1006 |

| Determining that the first crash classification meets a first predefined crash threshold criterion | 1008 |

| Determining a crash severity for the driving event using the first crash classification | 1010 |

| Initiating an escalation action sequence that comprises a plurality of actions that are automatically executed according to a predefined order based on the crash severity | 1012 |

FIG. 10

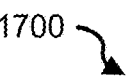
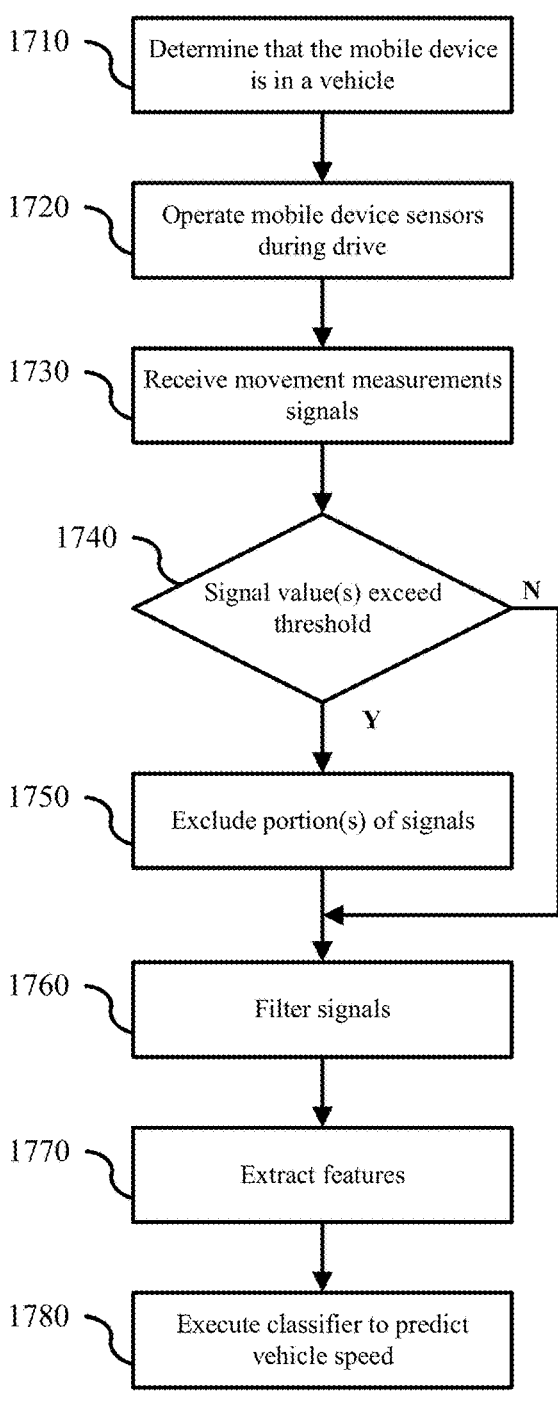
1700
1710 — Determine that the mobile device is in a vehicle
1720 — Operate mobile device sensors during drive
1730 — Receive movement measurements signals
1740 — Signal value(s) exceed threshold
N
Y
1750 — Exclude portion(s) of signals
1760 — Filter signals
1770 — Extract features
1780 — Execute classifier to predict vehicle speed
FIG. 17

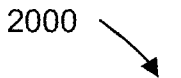
2000
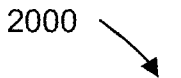
FIG. 20

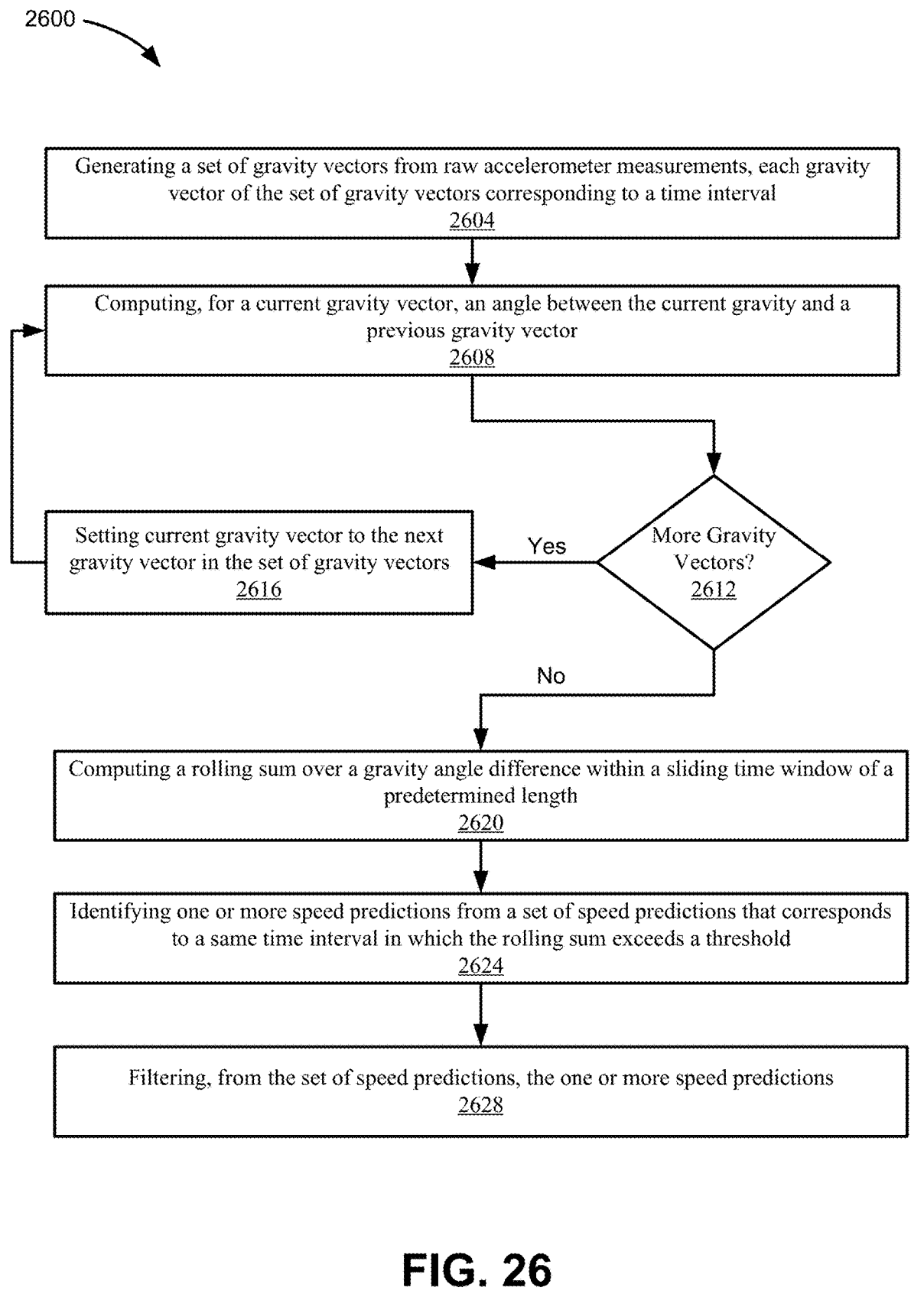

2600

Generating a set of gravity vectors from raw accelerometer measurements, each gravity vector of the set of gravity vectors corresponding to a time interval
2604

Computing, for a current gravity vector, an angle between the current gravity and a previous gravity vector
2608

Setting current gravity vector to the next gravity vector in the set of gravity vectors
2616

Yes

More Gravity Vectors?
2612

No

Computing a rolling sum over a gravity angle difference within a sliding time window of a predetermined length
2620

Identifying one or more speed predictions from a set of speed predictions that corresponds to a same time interval in which the rolling sum exceeds a threshold
2624

Filtering, from the set of speed predictions, the one or more speed predictions
2628

FIG. 26

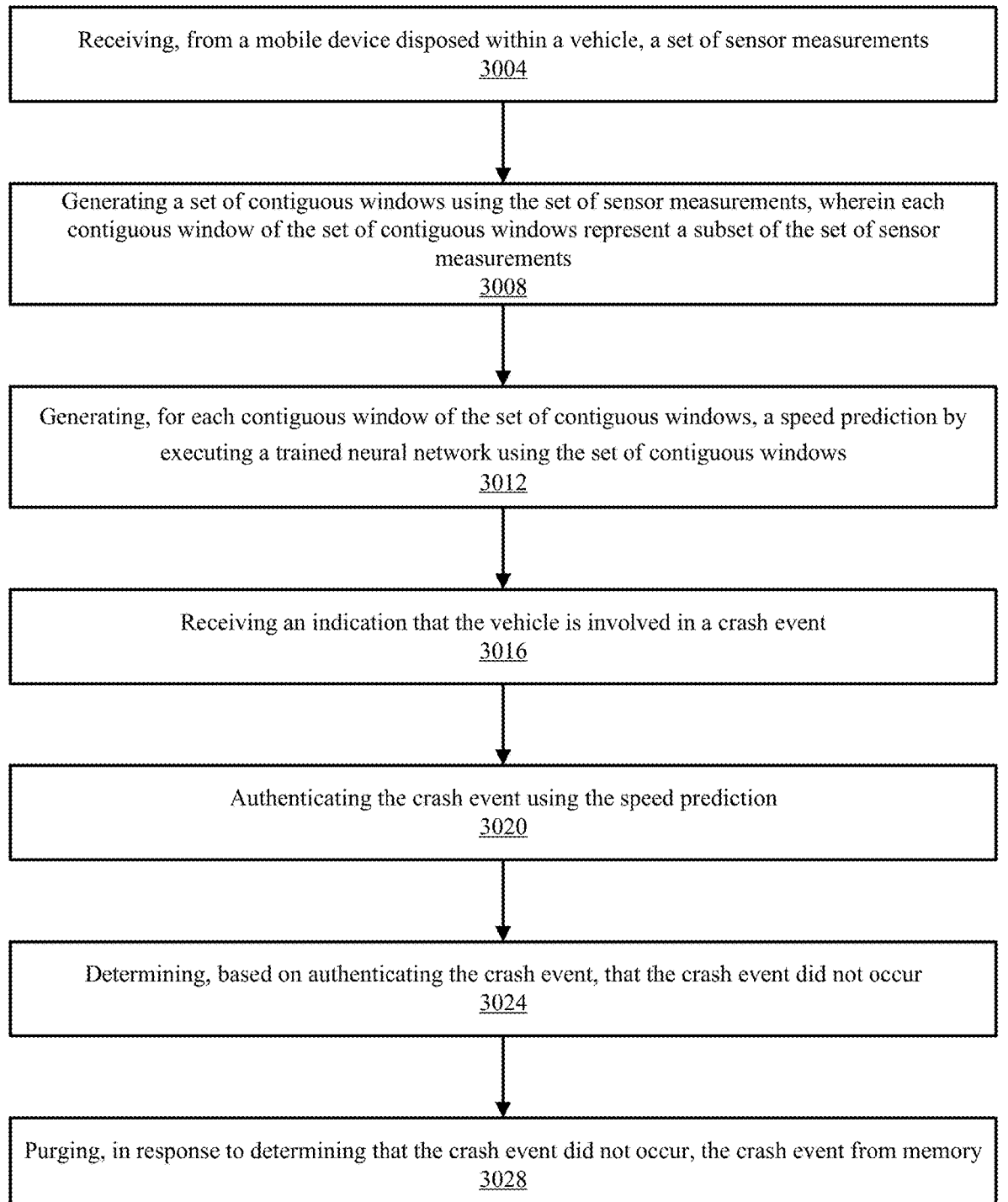

Receiving, from a mobile device disposed within a vehicle, a set of sensor measurements
3004

Generating a set of contiguous windows using the set of sensor measurements, wherein each contiguous window of the set of contiguous windows represent a subset of the set of sensor measurements
3008

Generating, for each contiguous window of the set of contiguous windows, a speed prediction by executing a trained neural network using the set of contiguous windows
3012

Receiving an indication that the vehicle is involved in a crash event
3016

Authenticating the crash event using the speed prediction
3020

Determining, based on authenticating the crash event, that the crash event did not occur
3024

Purging, in response to determining that the crash event did not occur, the crash event from memory
3028

FIG. 30

MACHINE LEARNING-BASED CONTINUOUS MONITORING FOR IMPROVING CRASH DETECTION AND RESPONSE SYSTEM ACCURACY

CROSS-REFERENCES TO RELATED APPLICATIONS

This application claims priority to U.S. Provisional Patent Application No. 63/578,885, filed on Aug. 25, 2023, entitled "Method and System for Smart Crash Service Provisioning," the disclosure of which is hereby incorporated by reference in its entirety for all purposes.

BACKGROUND OF THE INVENTION

Modern mobile devices typically include a number of sensors operable to measure characteristics of an environment of the mobile device. Despite the progress made in the area of detecting vehicle accidents using data collected by sensors of a mobile device, there is a need in the art for improved methods and systems related to confirming the accuracy of the detected accidents and assessing the appropriate level of response quickly and efficiently without consuming unnecessary public or private resources.

SUMMARY OF THE INVENTION

Embodiments of the present invention generally relate to crash service provisioning, and more particularly, to smart escalation and de-escalation of crash service provisioning. In some embodiments, a system for provisioning crash response services is described. The system may comprise: a mobile device comprising a plurality of sensors; a memory; and a processor coupled to the memory. The processor may be configured to perform operations including operating the plurality of sensors during a trip in a vehicle to collect driving data. The operations may further include detecting, using the driving data, a driving event as it occurs during the trip, wherein the driving event occurs at a first time. The operations may further include executing, after a first predefined duration starting at the first time and ending at a second time, a crash prediction machine learning model on the driving data collected during the first predefined duration and the driving data used to detect the driving event to generate a first crash classification. The operations may further include determining that the first crash classification meets a first predefined crash threshold criterion. The operations may further include initiating an escalation action sequence in response to determining that the first crash classification meets the first predefined crash threshold criterion, wherein the escalation action sequence comprises a plurality of actions that are automatically executed according to a predefined order. The operations may further include executing, after a second predefined duration starting at the second time and ending at a third time, the crash prediction machine learning model on the driving data collected during the second predefined duration, the driving data collected during the first predefined duration, and the driving data used to detect the driving event to generate a second crash classification. The operations may further include determining that the second crash classification does not meet a second predefined crash threshold criterion. The operations may further include, in response to determining that the second crash classification does not meet a second predefined crash threshold criterion, terminating the escalation action sequence prior to an automatic execution of an action of the plurality of actions.

In some embodiments, the escalation action sequence begins with a first action of the plurality of actions, and the first action comprises outputting, via the mobile device, an indication of the first crash classification and a prompt to a user of the mobile device to confirm the first crash classification. In some embodiments, the operations may further include determining, prior to the third time, that a denial of the first crash classification has been received from the user in response to the prompt, and modifying the second predefined crash threshold criterion based on the denial of the first crash classification.

In some embodiments, the operations may further include determining, prior to the third time, that a response to the prompt has not been received from the user. The operations may further include determining that the vehicle drove during the second predefined duration starting at the second time and ending at the third time using the driving data collected during the second predefined duration. The operations may further include modifying the second predefined crash threshold criterion in response to determining that the vehicle drove during the second predefined duration.

In some embodiments, the first crash classification is generated by the crash prediction machine learning model in response to determining that the vehicle remained stationary for the first predefined duration after the first time using the driving data collected during the first predefined duration starting at the first time. In some embodiments, the operations may further include determining a crash severity for the driving event using the first crash classification, wherein the predefined order in which the plurality of actions are automatically executed is based on the crash severity.

In some embodiments, a system for provisioning crash response services is described in which a processor is configured to perform operations including operating the plurality of sensors during a trip in a vehicle to collect driving data. The operations may further include detecting, using the driving data, a driving event as it occurs during the trip, wherein the driving event occurs at a first time. The operations may further include executing, after a first predefined duration starting at the first time and ending at a second time, a crash prediction machine learning model on the driving data collected during the first predefined duration and the driving data used to detect the driving event to generate a first crash classification. The operations may further include determining that the first crash classification meets a first predefined crash threshold criterion. The operations may further include initiating an escalation action sequence in response to determining that the first crash classification meets the first predefined crash threshold criterion, wherein the escalation action sequence comprises a plurality of actions that are automatically executed at corresponding predefined points in time according to a predefined order. The operations may further include determining, prior to each corresponding predefined point in time, whether the driving data collected up to each corresponding predefined point in time confirms the first crash classification, wherein in response to determining that the driving data collected up to a particular predefined point in time contradicts the first crash classification, the escalation action sequence is terminated prior to an execution of a corresponding action.

In some embodiments, the escalation action sequence begins with a first action of the plurality of actions, and the first action comprises outputting, via the mobile device, an indication of the first crash classification and a prompt to a user of the mobile device to confirm the first crash classification. In some embodiments, the operations further include determining, prior to a third time, that a denial of the first crash classification has been received from the user in response to the prompt. The operations may further include terminating the escalation action sequence prior to an automatic execution of an action of the plurality of actions based on the denial of the first crash classification.

In some embodiments, determining that the driving data collected up to the particular predefined point in time contradicts the first crash classification comprises determining that the vehicle continued driving drove between the second time and the particular predefined point in time. In some embodiments, determining that the driving data collected up to the particular predefined point in time contradicts the first crash classification comprises: executing the crash prediction machine learning model on the driving data collected up to the particular predefined point in time to generate a second crash classification; and determining that the second crash classification does not meet a second predefined crash threshold criterion.

In some embodiments, the first crash classification is generated by the crash prediction machine learning model in response to determining that the vehicle remained stationary for the first predefined duration after the first time using the driving data collected during the first predefined duration starting at the first time. In some embodiments, the operations further include determining a crash severity for the driving event using the first crash classification, wherein the predefined order in which the plurality of actions are automatically executed is based on the crash severity.

In some embodiments, a system for provisioning crash response services is described in which a processor is configured to perform operations including operating the plurality of sensors during a trip in a vehicle to collect driving data. The operations may further include detecting, using the driving data, a driving event as it occurs during the trip, wherein the driving event occurs at a first time. The operations may further include executing, after a first predefined duration starting at the first time and ending at a second time, a crash prediction machine learning model on the driving data collected during the first predefined duration and the driving data used to detect the driving event to generate a first crash classification for the driving event. The operations may further include determining that the first crash classification meets a first predefined crash threshold criterion. The operations may further include determining a crash severity for the driving event using the first crash classification. The operations may further include initiating an escalation action sequence in response to determining that the first crash classification meets the first predefined crash threshold criterion, wherein the escalation action sequence comprises a plurality of actions that are automatically executed according to a predefined order based on the crash severity for the driving event.

The operations may further include executing, after a second predefined duration starting at the second time and ending at a third time, the crash prediction machine learning model on the driving data collected during the second predefined duration, the driving data collected during the first predefined duration, and the driving data used to detect the driving event to generate a second crash classification. The operations may further include determining that the second crash classification does not meet a second predefined crash threshold criterion. The operations may further include in response to determining that the second crash classification does not meet a second predefined crash threshold criterion, terminating the escalation action sequence prior to an automatic execution of an action of the plurality of actions.

In some embodiments, the escalation action sequence begins with a first action of the plurality of actions, and the first action comprises outputting, via the mobile device, an indication of the first crash classification and a prompt to a user of the mobile device to confirm the first crash classification. In some embodiments, the operations further include determining, prior to a third time, that a denial of the first crash classification has been received from the user in response to the prompt; and terminating the escalation action sequence prior to an automatic execution of an action of the plurality of actions based on the denial of the first crash classification.

In some embodiments, the operations further include determining, prior to a third time, that a response to the prompt has not been received from the user; determining that the vehicle drove during a second predefined duration starting at the second time and ending at the third time using the driving data collected during the second predefined duration; and terminating the escalation action sequence prior to an automatic execution of an action of the plurality of actions in response to determining that the vehicle drove during the second predefined duration.

In some embodiments, the first crash classification is generated by the crash prediction machine learning model in response to determining that the vehicle remained stationary for the first predefined duration after the first time using the driving data collected during the first predefined duration starting at the first time. In some embodiments, the first crash classification comprises a confidence that the driving event was detected as a result of a vehicle accident, and determining the crash severity for the driving event is based on the confidence.

Numerous benefits are achieved by way of the various embodiments over conventional techniques. For example, various embodiments provide methods and systems that can be used to provide tailored responses to vehicle accidents in a timely manner while minimizing the consumption of unnecessary resources spent on false-positive crash determinations. In some embodiments, crash service provisioning may be automatically executed in response to an initial determination that a possible crash event has been detected. Subsequently, as additional data related to the crash event becomes available, the execution of the crash service provisioning may be allowed to continue while the additional data confirms the initial crash determination, or terminated in response to subsequent input indicating that additional services are no longer required, or that the initial crash determination was erroneous. These and other embodiments along with many of its advantages and features are described in more detail in conjunction with the text below and attached figures.

In some embodiments, a crash detection and response system is provided. The crash detection and response system may comprise: a mobile device comprising a plurality of sensors;

a memory; and a processor coupled to the memory. The processor may be configured to perform operations including operating the plurality of sensors during a trip in a vehicle to collect driving data. The operations may further include detecting, using the driving data, a driving event as it occurs during the trip, wherein the driving event occurs at a first time. The operations may further include generating, after a first predefined duration starting at the first time and ending at a second time, a first crash classification for the driving event. In some embodiments, generating the first crash classification comprises executing a crash prediction machine learning model on the driving data collected during the first predefined duration and the driving data used to detect the driving event. The operations may further include determining that the first crash classification meets a first predefined crash threshold criterion. The operations may further include initiating an escalation action sequence in response to determining that the first crash classification meets the first predefined crash threshold criterion. In some embodiments, the escalation action sequence comprises a plurality of actions that are automatically executed by the system according to a predefined order.

In some embodiments, the processor is further configured to perform operations including generating, after a second predefined duration starting at the second time and ending at a third time, a second crash classification for the driving event. In some embodiments, generating the second crash classification comprises executing the crash prediction machine learning model on the driving data collected during the second predefined duration, the driving data collected during the first predefined duration, and the driving data used to detect the driving event. In some embodiments, the operations further include determining that the second crash classification does not meet a second predefined crash threshold criterion and, in response to determining that the second crash classification does not meet a second predefined crash threshold criterion, terminating the escalation action sequence prior to an automatic execution of an action of the plurality of actions.

In some embodiments, the plurality of actions are automatically executed at corresponding predefined points in time according to the predefined order, and the processor is further configured to perform operations including determining, prior to each corresponding predefined point in time, whether the driving data collected up to each corresponding predefined point in time confirms the first crash classification. In some embodiments, in response to determining that the driving data collected up to a particular predefined point in time contradicts the first crash classification, the escalation action sequence is terminated prior to an execution of a corresponding action.

In some embodiments, the processor is further configured to perform operations including determining a crash severity for the driving event using the first crash classification. In some embodiments, the predefined order in which the plurality of actions are automatically executed is based on the crash severity. In some embodiments, the first crash classification comprises a confidence that the driving event was detected as a result of a vehicle accident, and determining the crash severity for the driving event is based on the confidence.

In some embodiments, the escalation action sequence begins with a first action of the plurality of actions, and the first action comprises outputting, via the mobile device, an indication of the first crash classification and a prompt to a user of the mobile device to confirm the first crash classification. In some embodiments, the processor is further configured to perform operations including determining, prior to a third time, that a denial of the first crash classification has been received from the user in response to the prompt, and terminating the escalation action sequence prior to an automatic execution of an action of the plurality of actions based on the denial of the first crash classification. In some embodiments, the processor is further configured to perform operations including: determining, prior to a third time, that a response to the prompt has not been received from the user; determining that the vehicle drove during a second predefined duration starting at the second time and ending at the third time using the driving data collected during the second predefined duration; and terminating the escalation action sequence prior to an automatic execution of an action of the plurality of actions based on determining that the vehicle drove during the second predefined duration.

In some embodiments, the processor is further configured to perform operations including determining that the vehicle remained stationary for the first predefined duration after the first time using the driving data collected during the first predefined duration starting at the first time. In some embodiments, the first crash classification is generated in response to determining that the vehicle remained stationary for the first predefined duration after the first time; or the crash prediction machine learning model is further executed on an indication that the vehicle remained stationary for the first predefined duration after the first time.

In some embodiments, a method of executing crash response services by a crash detection and response system is provided. The method may comprise operating a plurality of sensors of a mobile device disposed in a vehicle during a trip in the vehicle to collect driving data. The method may further comprise detecting, using the driving data, a driving event as it occurs during the trip, wherein the driving event occurs at a first time. The method may further comprise generating, after a first predefined duration starting at the first time and ending at a second time, a first crash classification for the driving event. In some embodiments, generating the first crash classification comprises executing a crash prediction machine learning model on the driving data collected during the first predefined duration and the driving data used to detect the driving event. The method may further comprise determining that the first crash classification meets a first predefined crash threshold criterion. The method may further comprise initiating an escalation action sequence in response to determining that the first crash classification meets the first predefined crash threshold criterion. In some embodiments, the escalation action sequence comprises a plurality of actions that are automatically executed according to a predefined order.

In some embodiments, the method further comprises: generating, after a second predefined duration starting at the second time and ending at a third time, a second crash classification for the driving event, wherein generating the second crash classification comprises executing the crash prediction machine learning model on the driving data collected during the second predefined duration, the driving data collected during the first predefined duration, and the driving data used to detect the driving event; determining that the second crash classification does not meet a second predefined crash threshold criterion; and in response to determining that the second crash classification does not meet a second predefined crash threshold criterion, terminating the escalation action sequence prior to an automatic execution of an action of the plurality of actions.

In some embodiments, the plurality of actions are automatically executed at corresponding predefined points in time according to the predefined order, the method further comprises: determining, prior to each corresponding predefined point in time, whether the driving data collected up to each corresponding predefined point in time confirms the first crash classification, wherein in response to determining that the driving data collected up to a particular predefined point in time contradicts the first crash classification, the escalation action sequence is terminated prior to an execution of a corresponding action.

In some embodiments, the method further comprises determining a crash severity for the driving event using the first crash classification, wherein the predefined order in which the plurality of actions are automatically executed is based on the crash severity. In some embodiments, the first crash classification comprises a confidence that the driving event was detected as a result of a vehicle accident, and determining the crash severity for the driving event is based on the confidence.

In some embodiments, the escalation action sequence begins with a first action of the plurality of actions comprising outputting, via the mobile device, an indication of the first crash classification and a prompt to a user of the mobile device to confirm the first crash classification. In some embodiments, the method further comprises: determining, prior to a third time, that a denial of the first crash classification has been received from the user in response to the prompt; and terminating the escalation action sequence prior to an automatic execution of an action of the plurality of actions based on the denial of the first crash classification.

In some embodiments, the escalation action sequence begins with a first action of the plurality of actions comprising outputting, via the mobile device, an indication of the first crash classification and a prompt to a user of the mobile device to confirm the first crash classification. In some embodiments, the method further comprises: determining, prior to a third time, that a response to the prompt has not been received from the user; determining that the vehicle drove during a second predefined duration starting at the second time and ending at the third time using the driving data collected during the second predefined duration; and terminating the escalation action sequence prior to an automatic execution of an action of the plurality of actions based on determining that the vehicle drove during the second predefined duration.

In some embodiments, the method further comprises determining that the vehicle remained stationary for the first predefined duration after the first time using the driving data collected during the first predefined duration starting at the first time. In some embodiments, the first crash classification is generated in response to determining that the vehicle remained stationary for the first predefined duration after the first time, or the crash prediction machine learning model is further executed on an indication that the vehicle remained stationary for the first predefined duration after the first time.

In some embodiments, a non-transitory machine-readable storage medium is provided. The non-transitory machine-readable storage medium may instructions that, when executed by one or more processors of a crash detection and response system, cause the one or more processors to perform operations comprising operating a plurality of sensors of a mobile device disposed in a vehicle during a trip in the vehicle to collect driving data. The operations may further comprise detecting, using the driving data, a driving event as it occurs during the trip, wherein the driving event occurs at a first time. The operations may further comprise generating, after a first predefined duration starting at the first time and ending at a second time, a first crash classification for the driving event. In some embodiments, generating the first crash classification comprises executing a crash prediction machine learning model on the driving data collected during the first predefined duration and the driving data used to detect the driving event. The operations may further comprise determining that the first crash classification meets a first predefined crash threshold criterion. The operations may further comprise initiating an escalation action sequence in response to determining that the first crash classification meets the first predefined crash threshold criterion, wherein the escalation action sequence comprises a plurality of actions that are automatically executed according to a predefined order.

In some embodiments, the operations further comprise determining a crash severity for the driving event using the first crash classification. In some embodiments, the predefined order in which the plurality of actions are automatically executed is based on the crash severity. In some embodiments, the operations further comprise generating, after a second predefined duration starting at the second time and ending at a third time, a second crash classification for the driving event. In some embodiments, generating the second crash classification comprises executing the crash prediction machine learning model on the driving data collected during the second predefined duration, the driving data collected during the first predefined duration, and the driving data used to detect the driving event. In some embodiments, the operations further comprise determining that the second crash classification does not meet a second predefined crash threshold criterion. In some embodiments, the operations further comprise, in response to determining that the second crash classification does not meet a second predefined crash threshold criterion, terminating the escalation action sequence prior to an automatic execution of an action of the plurality of actions.

BRIEF DESCRIPTION OF THE DRAWINGS

Aspects and features of the various embodiments will be more apparent by describing examples with reference to the accompanying drawings, in which:

FIG. 9 illustrates another example of a method of crash service provisioning according to some aspects of the present disclosure.

FIG. 10 illustrates an example of a method of crash service selection according to some aspects of the present disclosure.

FIG. 17 is a flowchart illustrating an example of a process for estimating vehicle speed according to aspects of the present disclosure.

FIG. 20 is a cluster plot showing distance estimated by the classifier compared to distance measured by GPS according to aspects of the present disclosure.

FIG. 26 is a flowchart of example of a process for filtering speed predictions according to aspects of the present disclosure.

FIG. 30 is a block diagram of a process for authenticating a vehicle crash prediction using speed predictions according to aspects of the present disclosure.

DETAILED DESCRIPTION

While certain embodiments are described, these embodiments are presented by way of example only and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Example Systems

Figure 1:
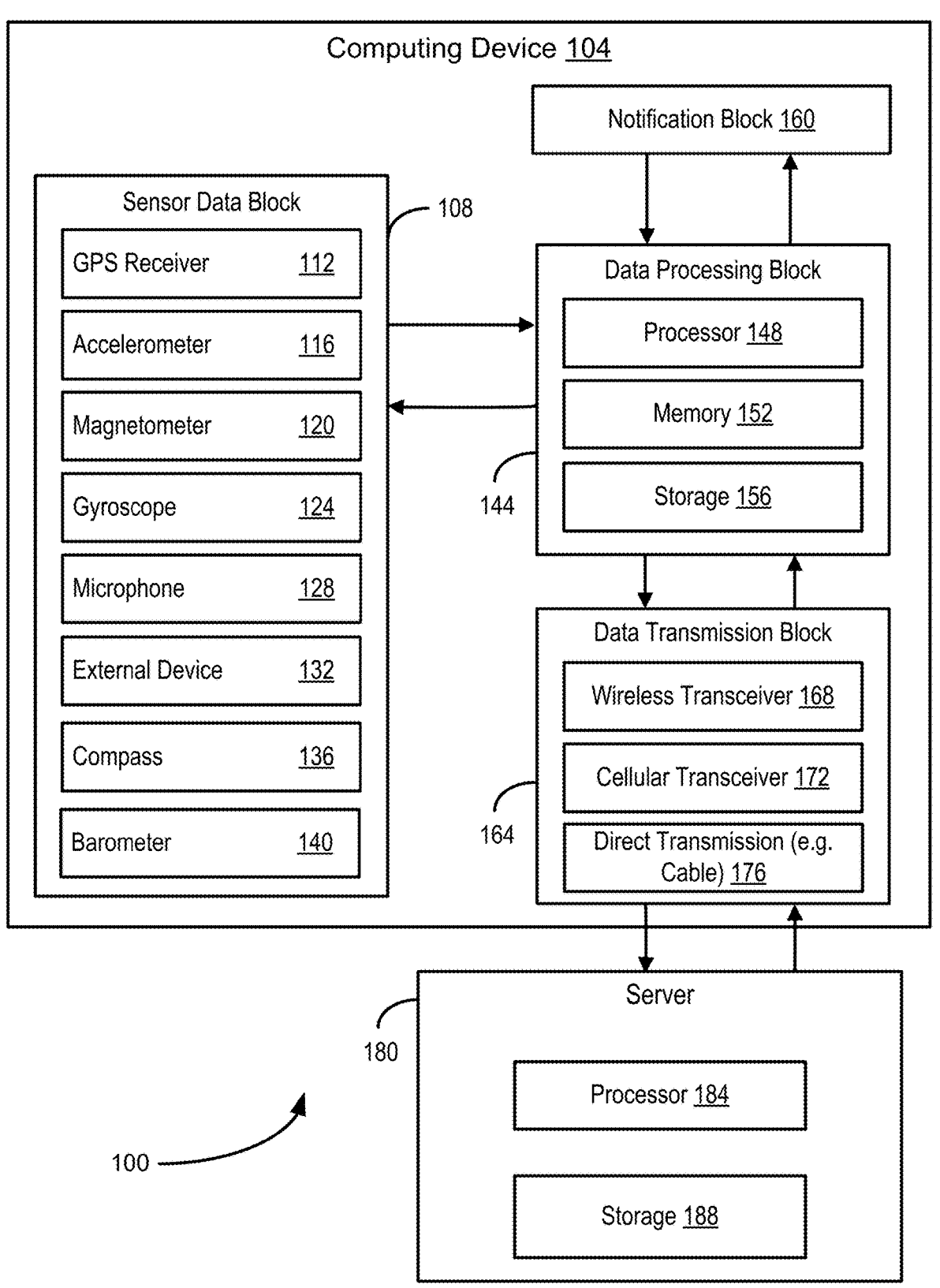
FIG. 1 is a simplified block diagram illustrating an example of a system for collecting driving data according to some aspects of the present disclosure.

FIG. 1 is a system diagram illustrating a system 100 for collecting and analyzing driving data according to some aspects of the present disclosure. System 100 includes a computing device 104 which includes a plurality of processing, sensor, and communication resource components. Computing device 104 may include a sensor data block 108, a data processing block 144, a data transmission block 164, and optionally a notification block 160. The sensor data block 108 includes data collection sensors as well as the data collected from sensors that are available to mobile device 104. This can include external devices connected via Bluetooth, USB cable, etc. The data processing block 144 may include storage 156 which may include data from the sensors of the sensor data block 108 processed by processor 148. This may include, but is not limited to, analyzing, characterizing, manipulating, smoothing, subsampling, filtering, reformatting, etc. Examples of mobile devices include, but are not limited to, smartphones, tablets, laptops, application specific integrated circuits (ASICs), and the like.

Data transmission block 164 may process communications (e.g., transmitted and received communications), such as the processed sensor data transmitted to an external computing device (e.g., server 180). The external computing device may also store and/or process the data obtained from sensor data block 108. Server 180 may include its own processor 184 and storage 188.

Notification block 160 may report the results of analysis of sensor data performed by the data processing block 144 to a user associated with the computing device 104 via a display (not shown). For example, notification block 160 may display or otherwise present a warning communication to a user associated with the computing device 104 upon determining that that the user may be a distracted driver. In some examples, the physical interaction determination may be a process executed by processor 148 of computing device 104. In other examples, the physical interaction determination may be a process executed by processor 184, as described further herein with respect to FIG. 2.

Some embodiments are described using examples where driving data is collected using computing device 104, and these examples are not limited to any particular computing device. For example, computing devices may include a variety of devices that can be included within or connected to computing device 104. Examples of electronic devices include, but are not limited to, devices with one or more of location determination systems such as global positioning system (GPS) receivers 112, accelerometers 116, magnetometers 120, gyroscopes 124, microphones 128, external (sensor) devices 132, compasses 136, barometers 140, communications capabilities, and the like. Exemplary electronic devices include smart watches, fitness monitors, Bluetooth headsets, tablets, laptop computers, smart phones, music players, movement analysis devices, and the like.

One or more sensors of computing device 104 (e.g., the sensors of sensor data block 108) may be operated to collect measurements to provide an indication of vehicle dynamics (e.g., speed, acceleration, location, etc.). In some examples, the measurements may be collected at time when the electronic device is likely to be with a driver when operating a vehicle, such as when the device is moving with a particular speed or when the device is located on a known road (e.g., a highway). The sensors used to collect data may be components of the computing device 104 and use power resources available to computing device 104 components (e.g., battery power and/or a data source external to computing device 104).

In some examples, settings of a computing device may be used to enable different functions described herein. For example, in Apple IOS, Android OS, and/or wearable device operating systems having certain settings enabled can enable certain functions of embodiments. In some examples, having location services enabled allows the collection of location information from the computing device (e.g., collected by global positioning system (GPS) receiver 112) and enabling the background app refresh allows some embodiments to execute in the background, collecting and analyzing driving data even when the application is not executing. In some instances, location information may be determined by other sensors of the mobile device, such as by tracking movement of the mobile device (e.g., using an accelerometer), by receiving location information from an external source, radio triangulation (e.g., using cellular, Bluetooth, or Wi-Fi radios), by an IP address of the mobile device, or by other means. In some implementations, alerts are provided or surfaced using notification block 160 while the app is running in the background since the physical measurements can be performed in the background.

Figure 2:
FIG. 2 is a simplified block diagram illustrating another example of a system for collecting driving data according to some aspects of the present disclosure.

FIG. 2 is a simplified block diagram illustrating an example of another system 200 for collecting driving data according to some aspects of the present invention. System 200 may include electronic device 204, which may be incorporated within computing device 104 (e.g., as specialized hardware or software) or may be a separate device (or execute on a separate device) that communicates with the computing device 104. For instance, as a separate device, electronic device 204 may be a mobile device (e.g., such as mobile device 104 of FIG. 1, a similar type of mobile device, a different type of mobile device, or the like), a server, a computing device such as desktop or laptop computer, a specialized processing device (e.g., such as one or more application specific integrated circuits, field programmable gate arrays, or the like), a distributed processing system (e.g., such a cloud environment or the like), a combination thereof (e.g., as a distributed process), or the like. In some embodiments, the electronic device 204 may provide functionality using components including, but not limited to: a vector analyzer 208, a vector determiner 212, an external information receiver 216, a classifier 220 (e.g., a machine learning model), an activity detection engine 232, a crash service provisioning engine 228, and a crash service escalation engine 234. Each component may include one or more processors (not shown) and memory (not shown). Instructions stored in the memory of a component may be executed by the one or more processors of the component to provide the functionality of the component. Alternatively, one or more processors of electronic device 204 (not shown) may execute instructions stored in a central memory of electronic device 204 to provide the functionality of the components. The electronic device 204 may also include a data storage 236. In some instances, one or more of the components 208-234 operating on electronic device 204 may be stored in memory 152 or storage 156 of computing device 104, and/or executed by processor 148 of mobile device 104.

One or more sensors of computing device 104 (e.g., sensors of sensor data block 108) are used to measure characteristics of an environment in which the mobile device is positioned. For instance, the one or more sensors are used to collect characteristics of a vehicle while the mobile device is positioned in the vehicle during a drive. In that instance, the one or more sensors may be operated while the mobile device is positioned proximate to a driver during a time interval that corresponds to when the driver is operating the vehicle. As used herein, the terms "drive" and "trip" refer to the operation of a vehicle over an interval of time. Measurements obtained from the one or more sensors may be analyzed to determine acceleration vectors for the vehicle, as well as different features of the drive. In some instances, external data (e.g., weather, traffic, vehicle information, driver information) can be retrieved and correlated with collected driving data.

In some embodiments, a display of a mobile device (such as computing device 104) can show representations of driving data collected by the one or more sensors or generated by any of components 208-234. For instance, representations of driving data can be generated by transforming collected sensor data (e.g., driving data collected using sensor data block 108) into different results, including but not limited to, estimates of an activity of a user of a mobile device (e.g., stationary, walking, running, or driving), estimates of the occurrence of different driving events during a drive or a trip for which data was collected (e.g., speeding, hard acceleration/braking, swerving, mobile device usage, and the like), a metric descriptive of the driving behavior of a driver during the drive, a metric descriptive of the overall driving behavior of a driver for all drives, a metric descriptive of a driver's behavior as related to the occurrence of certain events, a prediction of a vehicle crash event, one or more classifications of a predicted crash event, and/or a combination of transformed driving data and geographic data.

In some instances, collected driving data can be analyzed to assign scores to a drive, multiple drives, a driver, and/or driving behavior based on different criteria. A scoring engine (not shown) may aggregate data collected by the one or more sensors and apply one or more rules to generate scores for the embodiments. Further disclosure regarding scoring can be found in U.S. Pat. No. 11,072,339, entitled "SYSTEMS AND METHODS FOR SCORING DRIVING TRIPS," which is hereby incorporated by reference in its entirety.

Sensor data (e.g., collected using the sensor data block 108) may be used to analyze movement of the computing device to detect the occurrence of driving events. The sensor data may be aggregated by electronic device 204 and analyzed once a predetermined amount of the sensor data is received. For example, once the electronic device 204 aggregates 50 megabytes of sensor data, the electronic device 204 may initiate an analysis of the sensor data. In another example, the electronic device 204 may initiate an analysis of the sensor data once electronic device 204 receives sensor data collected over a predetermined interval (e.g., a half hour of sensor data or an hour of sensor data). In still yet another example, the electronic device 204 aggregates sensor data associated with a trip and analyzes the sensor data once all of the sensor data associated with the trip is received. Alternatively, computing device 104 includes one or more of components 208-234 and provides analysis of sensor data in real time (e.g., as the one or more sensors obtain measurements).

A GPS receiver may provide time stamped location and speed data that can be used by various applications executing on the mobile device. The time stamped data can be used to accurately determine vehicle location and speed. A GPS receiver may be used to detect a crash and to determine distance traveled by the vehicle. For instance, GPS receiver may detect a crash by detecting sudden changes in speed or location. However, since mobile devices operate with limited resources due power and processing constraints and due to the high power consumption of operating a GPS receiver, electronic device 204 may use the one or more other sensors of computing device 104 to detect vehicle location and/or speed.

For instance, a mobile device positioned in a vehicle experiences mechanical vibrations related to the activity of the vehicle. These vibrations are measurable using a subset of the sensors in the sensor data block 108 of computing device 104 referred to as an inertial measurement unit (IMU). The measurements of the mechanical vibration can occur at varying amplitudes and frequencies, which can be used to identify the vehicle activity or in some cases activity of the user. For example, some or all of the accelerometer, gyroscope, and magnetometer measurements may distinguish walking patterns of the user from driving patterns of the vehicle (e.g., vehicle speed of approximately 5 m/s).

The IMU may include any of the accelerometer 116, the gyroscope 124, and the magnetometer 120. The IMU and the sensors included within may be a separate unit from a GPS receiver. The accelerometer 116 may be a three-axis accelerometer operable to measure longitudinal and lateral acceleration, as well as acceleration due to gravity. The gyroscope 124 and the magnetometer 114 may also be three-axis devices and may measure angular rotation and magnetic heading, respectively, in three dimensions. The IMU may combine the three-dimensional accelerometer data with the three-dimensional gyroscopic data to identify movement of the mobile device with six degrees of freedom (6 DOF) (e.g., translation and rotation).

In some instances, data obtained from the IMU can be filtered and used as input to train a classifier, such as classifier 220, to predict vehicle speed and classify driving events as crash events. An example of such a classifier includes, but is not limited to, an xgboost classifier. The classifier may be trained using features extracted from training data of a large number of driving trips and/or vehicle accidents. The extracted training features may include statistical features of the driving data, for example, median, variance, and maximum values of the IMU signals (e.g., accelerometer, gyroscope, and magnetometer signals). In some instances, the orientation of the mobile device with respect to gravity may be determined and input to the classifier for training. Other statistical features may be used without departing from the scope of the present invention.

During a trip with a computing device positioned in a vehicle, the IMU of the computing device may be used to obtain movement measurements from any of the accelerometer, the gyroscope, and the magnetometer, and the movement measurements to generate an input for a classifier to estimate vehicle speed and detect possible crash events. In some embodiments, the classifier used to detect possible crash events from sensor measurements is integrated in the operating system of a mobile device. Additionally, or alternatively, the classifier may be part of a third-party application installed on the mobile device. In some instances, the acceleration measurements used in the estimation of vehicle speed and detection of possible crash events may be user acceleration measurements. User acceleration measurements may be acceleration measurements for which the gravity component of acceleration has been removed. In some instances, the acceleration measurements used in the prediction of vehicle speed may be raw acceleration measurements. Raw acceleration measurements may be acceleration measurements that include the gravity component.

The movement measurement signals from the IMU sensors may be sampled at a specified sampling rate to obtain digital signals. In some instances, a 9 Hz sampling rate may be used for the movement measurement signals. In other instances, a 30 Hz sampling rate may be used for the movement measurement signals. Other sampling rates, for example, 50 Hz or another sampling rate may be used. Higher sampling rates can provide improved speed estimation at the cost of increased resource consumption (e.g., processing and/or power resources). Electronic device 204 and/or computing device 104 may modulate IMU sensor sampling in real time to optimize the volume of data collected (e.g., for accuracy of data analysis) and the resource consumption.

For instance, if the computing device is connected to a reliable power source (e.g., such as the vehicle's power supply), the movement measurement signals may be sampled at a highest frequency (e.g., 50 Hz or a predetermined highest frequency). If the computing device is not connected to a power source, the movement measurement signals may be sampled at a lower frequency (e.g., 30 Hz sampling or a predetermined medium frequency). If the power supply of the computing device is below a threshold value (e.g., 25% of maximum), then the sampling of the movement measurement signals may be reduced to a lower frequency (e.g., 9 Hz or a predetermined low frequency) to conserve the remaining power of the computing device. In some instances, the sampling rate of the movement measurement signals may be modified to improve the speed estimation. For instance, an accuracy metric may be used to indicate a likelihood that a given speed estimation is valid. If the accuracy metric does not exceed a threshold, the sampling rate of the movement measurement signals may be temporarily or permanently increased until the accuracy metric exceeds the threshold. The computing device may modulate the sampling rate in real time based on the operating conditions (e.g., resource consumption) of the computing device or the metric.

Filtered IMU signals can distinguish driving, stopping, and user walking patterns. A bandpass filter (e.g., implemented in hardware or software), for example, an infinite impulse response (IIR) filter, may be used to filter the IMU signals to isolate frequencies indicative of various vehicle activities and to remove signal magnitude values exceeding a specified threshold. Portions of the signals having magnitude values exceeding the specified threshold may be excluded from further bandpass filtering. The digital bandpass filters can be designed to isolate the amount of vibration (i.e., frequencies) occurring within specific frequency ranges of interest. For example, the amount of vibrations may be separated into frequency ranges from 0.2 Hz to 1.1 Hz, from 1.1 Hz to 2.0 Hz, etc., depending on the sampling frequency, by bandpass filtering the signals.

Changes in lower frequency bands, for example up to approximately 1 Hz, may contain information about the vehicle stopping, while changes in higher frequency bands may correspond to the vehicle driving at higher speeds. The sources of the vibrations detected by the IMU sensors are complex interactions between engine vibrations resulting from speed changes or vibrations due to the vehicle interacting with the road surface at different speeds. A machine-learning model (e.g., the classifier) can learn these more complex interactions, which can be a combination of high and low frequencies, which correspond to each vehicle behavior.

In some instances, IMU sensor signals having large magnitudes may be disruptive to the vehicle speed prediction. In those instances, filtering may exclude the large magnitude signals. For example, accelerometer signal magnitude values exceeding a threshold value of about 10 m/s$^2$ or another threshold value, as well as any subsequent portions of the signal, may be excluded. The portions of the IMU signals up to, but not including, the signal magnitude values exceeding the threshold value may be bandpass filtered using the IIR filter.

The IIR filtering process may employ forward-backward filtering in which the portions of the IMU signals are filtered normally (i.e., forward filtering), and the forward filtered signals are "flipped" in time and filtered again with the IIR filter (i.e., backward filtering) producing a squared amplitude response. The IIR filters can better isolate the signals of interest and minimize or eliminate nonlinear phase distortion of the signals. The IIR filters are applied recursively, such that the result of the last step of the filter algorithm is applied to the next step. IIR filtering methods may be more computationally efficient than filtering methods that require computation of all intermediate numerical quantities that lead to the result (e.g., Fourier transforms). IIR filters are also advantageous because they can isolate frequency ranges of interest with greater signal amplitude attenuation outside of a range of interest. In some implementations, a finite impulse response (FIR) filter, rather than an IIR filter, may be used for bandpass filtering of the IMU signals.

The number of frequency bands used for the bandpass filtering may be determined by the desired granularity and the sampling frequency of the sensor data. For example, 14 passbands may be used in equally spaced 0.3 Hz frequency bands from 0.2 Hz to a Nyquist sampling frequency of 4.5 Hz for data obtained using a 9 Hz sampling, and 28 passbands may be used from 0.2 Hz to 15 Hz for data obtained using a 30 Hz data. More granular frequency bands may be used when the IMU signals are sampled at higher sampling frequencies. Selection of the number and width of the frequency bands may be determined based on the desired signal quality in each band and the granularity of the information. For example, too many frequency bands can result in degraded signal quality due to the narrow bandwidth, while too few frequency bands may result in loss of granularity of the captured information.

Features, for example statistical features, may be extracted from some or all of the filtered signals. The features used as inputs to classifier 220 can be summary statistics (e.g., median, variance, and maximum) over the various signals, covering different time spans. The features may be extracted from time windows of different lengths. In some implementations, each of the statistical features may be extracted from the IMU signals over a 5-second time window, a 10-second time window, and a 20-second time window. Each window may be centered at the time point under consideration. Over each of the windows, summary statistics such as the mean, median, variance, maximum, and minimum of the various band-passed versions of the IMU sensor signals (e.g., accelerometer, gyroscope) contained in these windows can be calculated.

The different length windows may provide levels of stability for the feature values, with longer window times producing more stable feature values. Other window lengths or a different number of windows may be used without departing from the scope of the invention. For example, in some implementations, a single window may be used. For a bandpass filtered accelerometer signal between 0.2 Hz to 1.1 Hz, nine features may be extracted (e.g., median, variance, and maximum, with each feature extracted over a 5-second time window, a 10-second time window, and a 20-second time window). The feature extraction produces a single list of values (e.g., a feature vector) for each time point under consideration.

The extracted features (e.g., the feature vectors) may be input to classifier 220. A machine learning model (e.g., classifier 220) can then make a speed prediction based on the feature vector inputs. The vehicle speed prediction by the classifier may be quantized, for example, in increments of 5 m/s or another increment. In some implementations, the orientation of the mobile device with respect to gravity may be determined and input to the classifier. Additionally, or alternatively, the machine learning model, or a similar machine learning model, can be used to detect a possible crash event and subsequently generate a crash classification indicating the likelihood that the detected event was in fact a crash that occurred during the drive, as described further herein.

Activity detection engine 232 identifies an activity that corresponds to sensor measurements received from the one or more sensors of sensor data block 108. For instance, the activity detection engine 232 identifies: when computing device 104 is stationary, with a user who is walking, with a user who is running, with a user who is riding a bicycle, in a vehicle that is driving, in a vehicle that is flying, and the like. In some instances, activity detection engine 232 outputs a probability of the activity. In those instances, activity detection engine 232 may output more than one probability such as a 45% probability that the mobile device is walking, a 33% probability that computing device is driving, and a 22% probability of some other activity. The probability may be expressed as an integer or real number, a percentage, a grade (such as a low, medium, or high), or in any way that represents the probability of a given activity.

Activity detection engine 232 may use the activity to detect drives from sensor data. For instance, activity detection engine 232 may analyze the data received from computing device 104 and identify a first time when the activity indicates a high probability that computing device 104 is in a car that is driving. Activity detection engine 232 may identify a second time after the first time in which there is a high probability another activity (e.g., stationary, walking). Activity detection engine 232 then defines a trip as occurring from the first time to the second time. Other components of electronic device 204 may then further analyze the sensor data received between the first time and the second time to identify driver behavior, driver score, crash detection, speed estimation, etc. In some instances, activity detection engine 232 or any of the operations described in connection with the activity detection engine 232 may be performed by an operating system of a mobile device to manage data collection by sensor data block 108.

In some instances, activity detection engine 232 may operate on computing device 104 to control collection of measurements from sensor data block 108. Computing device 104 may execute a data collection application that controls the operation of the one or more sensors of computing device 104 (e.g., such as sampling rates and the like) and collects measurements from the one or more sensors. The data collection application can include one or more of the components 208-232. Since the mobile device operates with limited resources, the data collection application may be suspended or terminated by a user, due to inactivity of the data collection application, when the computing device is at rest, or the like. Activity detection engine 232 may operate in a background process to detect if a drive/trip is occurring. If a trip is occurring, activity detection engine 232 may cause the data collection application to be initiated and begin collection of sensor data associated with the drive.

In some instances, activity detection engine 232 may generate a geo-fence around computing device 104, which, when crossed, will cause activity detection engine 232 to execute the data collection application or return the data collection application to an active state from a suspended state. If computing device 104 crosses the geo-fence, then activity detection engine 232 may cause the data collection application to be initiated. For instance, the geo-fence may surround a user's vehicle or residence such that when the geo-fence is crossed, it is likely due to the user initiating a drive or a trip. The geo-fence may be generated after a period of inactivity such as when the computing device has been at rest for a predetermined time interval. The geo-fence may be generated a predetermined distance from the computing such that when the computing crosses the geo-fence it is likely due to the beginning of a drive rather than through other activity such as walking. Activity detection engine 232 may use other mechanisms to determine whether to activate the data collection application including, but not limited to, detecting a visit (e.g., that the mobile device is at a particular location), a notification, a time interval, one or more sensor measurements exceeding threshold, or the like.

After detecting a possible crash event (e.g., by activity detection engine 232 and/or classifier 220), crash service provisioning engine 228 and crash service escalation engine 234 may provide relevant and timely crash services. For example, crash service provisioning engine 228 may initiate and/or manage the execution of a crash service action sequences based on the detection of a possible crash event. As described further herein, a crash service action sequence may include one or more types of interactions with a user, the responses to which may be used to assess the veracity of the initial crash detection, identify the severity of a confirmed crash, and triage the level of services required by the user. As another example, crash service escalation engine 234 may identify the appropriate crash service action sequence to be executed, and subsequently monitor the execution of the identified action sequence to ensure that crash services are used efficiently, as described further herein.

Example Crash Classification and Crash Service Provisioning System

Figure 3:
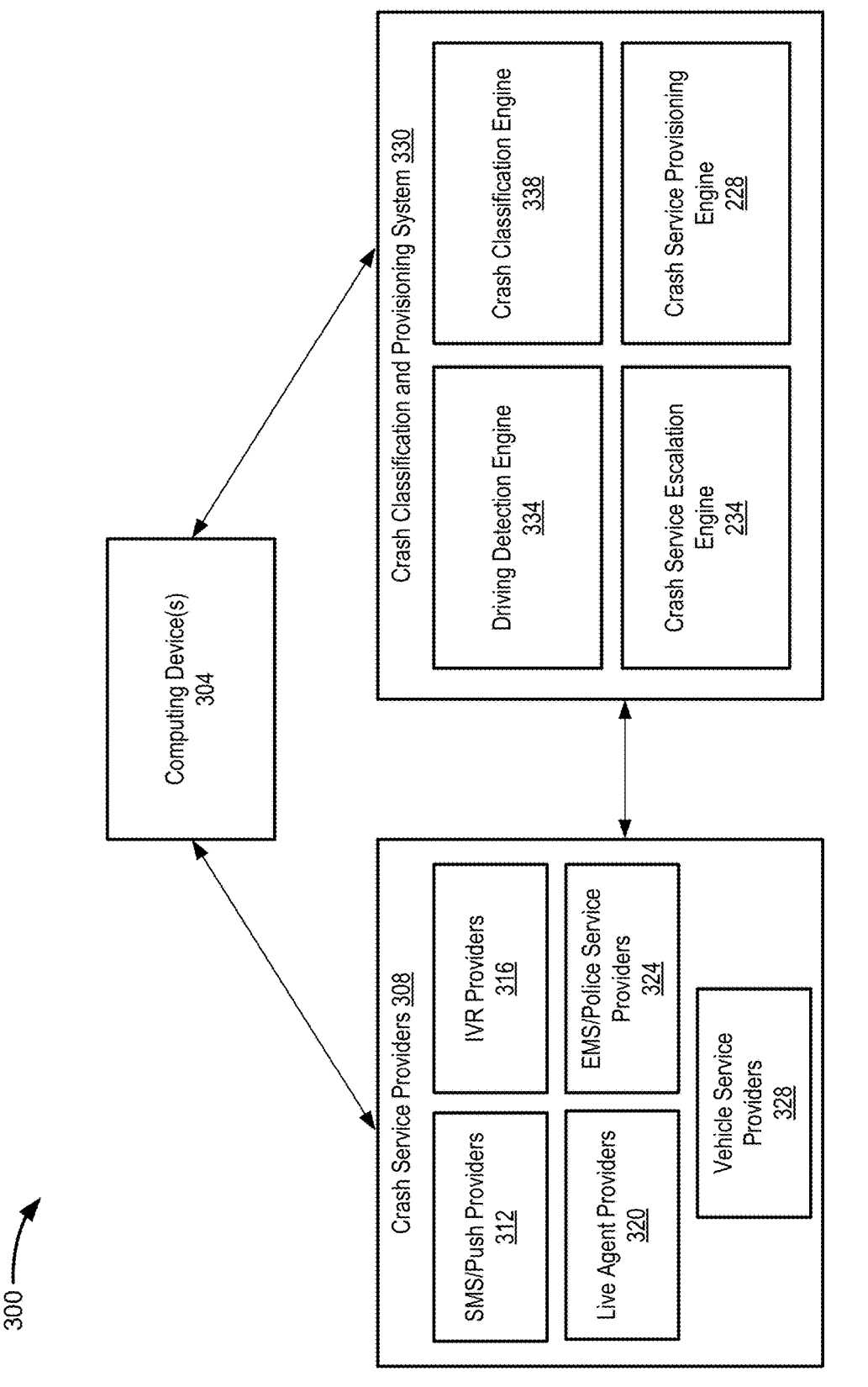
FIG. 3 is a simplified block diagram illustrating an example crash service provisioning system according to some aspects of the present disclosure.

FIG. 3 is a simplified block diagram illustrating an example crash service system 300 according to some aspects of the present disclosure. System 300 may include one or more computing devices 304, crash service providers 308, and crash classification and provisioning system 330. The one or more computing devices 304 may be the same or operate in a similar manner as computing device 104, as described above. For example, each of the one or more computing devices 304 may include a sensor block configured to collect measurements characteristic of an environment in which the mobile device is positioned. For instance, one or more sensors may be used to collect characteristics of a vehicle while the computing device is positioned in the vehicle during a drive. In that instance, the one or more sensors may be operated while the computing device is positioned proximate to a driver during a time interval that corresponds to when the driver is operating the vehicle. Measurements obtained from the one or more sensors may be analyzed to determine acceleration vectors for the vehicle, as well as different features or events that occurred during the drive.

For example, one or more sensors of a mobile device may collect movement measurements during a trip in a vehicle.

During the drive, and in substantially real time, the movement measurements may be analyzed to detect various types of driving events. Driving events may include events indicative of a person's driving habits and skills, such as hard acceleration, braking patterns, driving speed, swerving, excessive lane changes, mobile device usage, and the like. Additionally, or alternatively, driving events may include events indicative of a crash event involving the vehicle and/or one or more other vehicles or objects (e.g., pedestrians, stationary objects, and the like). For example, based on movement measurements (e.g., acceleration, gyroscopic, etc.) that exceed one or more predefined threshold criterion commonly observed during a vehicle accident, a possible crash event can be detected.

Based on the detection of a possible crash event involving a computing device, crash classification and provisioning system 330 may perform additional processing to determine the likelihood that the detected event was, in fact, a vehicle accident and the severity of the crash event, as well as begin provisioning crash services to the user of the mobile device. In some embodiments, crash classification and provisioning system 330 may perform the additional processing in response to receiving an initial indication of the crash detection from a computing device of computing devices 304. For example, after detecting a possible crash event, a computing device may transmit an indication of the detected event to crash classification and provisioning system 330.

Additionally, or alternatively, the one or more computing device 304 may transmit raw and/or processed movement measurements to crash classification and provisioning system 330. For example, computing devices 304 may transmit movement measurements to crash classification and provisioning system 330 on a periodic or semi-periodic basis for detection and/or classification of the various types of driving events described above, such as possible crash events. As another example, after detecting a possible crash event, computing devices 304 may transmit an indication of the detected event to crash classification and provisioning system 330 along with the movement measurements used to detect the possible crash event for verification.

Additionally, or alternatively, computing devices 304 may transmit motion measurements collected after detecting a possible crash event. For example, after detecting a possible crash event, a computing device may transmit an indication of the detected event to crash classification and provisioning system 330 and continue collecting motion measurements. After a predefined amount of time has elapsed since the detection of the possible crash event, the computing device may transmit the data collected during the predefined elapsed amount of time to crash classification and provisioning system 330 for additional processing.

Crash classification and provisioning system 330 may include driving detection engine 334, crash classification engine 338, crash service escalation engine 234, and crash service provisioning engine 228. While described herein as being separate systems, one or more functionalities or components of crash classification and provisioning system 330 may additionally, or alternatively, be included in computing devices 304. For example, the functionalities of driving detection engine 334 and/or crash classification engine 338 may additionally or alternatively be performed by one or more processes executing on computing devices 304.

Driving detection engine 334 may receive motion data collected by a computing device in order to determine whether the computing device is in a vehicle that is actively driving. For example, driving detection engine 334 may apply one or more algorithms, machine learning models, and/or neural networks to motion data received from a computing device to determine whether the computing device is in a vehicle that is actively driving. As described further herein, determining whether the computing device is in a vehicle that is actively driving, as opposed to, for example in the pocket of a user who is walking, or riding on public transportation, may be performed by an activity detection engine, such as activity detection engine 232. Additionally, or alternatively, driving detection engine 334 may determine whether the computing device is in a vehicle by applying one or more machine learning algorithms or trained classifiers to motion data collected by the computing device to determine a speed at which the computing device is moving. Subsequently, driving detection engine 334 may apply one or more threshold criteria to the determined speed to predict whether the computing device is in a vehicle that is driving. The one or more threshold criteria may include a threshold speed, such as 10 miles per hour, 20 miles per hour, 30 miles per hour, or a similar speed threshold indicative of travel in a vehicle, above which a determination that the computing device is in a vehicle that is actively driving may be made.

In some embodiments, determining whether a computing device is in a vehicle that is actively driving may allow crash classification and provisioning system 330 to confirm or contradict the occurrence of a vehicle accident. For example, based on an initial detection of a possible crash event (e.g., from sensor measurements exceeding one or more pre-defined threshold criteria), subsequent movement measurement may be obtained to determine whether the vehicle kept driving after the detected event, in which case it may be less likely that the detected event was actually a vehicle accident, or whether the vehicle remained stationary after the detected event, in which case it may be more likely that the detected event was in fact a vehicle accident.

Crash classification engine 338 may receive motion data from computing devices 304 collected around the time at which a possible crash event was detected, as well as motion data collected after the possible crash event, to generate a classification for the crash event.

A classification of a crash event may represent a likelihood or confidence that the detected crash event was detected as a result of a vehicle accident. The likelihood may be expressed as a percentage, a letter grade, a logical value, or a similar form of expression used to express the probability or likelihood of an event occurring. The classification of a crash event may further include a predicted severity of the crash event. For example, a crash event that is classified as unlikely to have occurred as a result of a vehicle accident, may result in a predicted severity that is low compared to crash events that are classified as being highly likely to have occurred as a result of a vehicle accident. Additionally, or alternatively, the predicted severity of a crash event may be determined after generating an initial likelihood that a detected crash event was detected as a result of a vehicle accident. For example, after classifying a crash event with a classification that meets one or more predefined threshold crash likelihood criteria, crash classification engine 338 may analyze the motion data used to generate the initial classification in order to determine a predicted severity of the crash event.

Crash classification engine 338 may apply one or more algorithms, machine learning models, and/or neural networks to motion data collected by sensors of a computing device, results of analyzing the motion data, and/or contextual data to classify crash events. For example, crash classification engine 338 may include one or more trained machine learning models. The machine learning models may be trained on motion data, results of previous motion data analysis, and/or contextual data from previously verified crash events. In some embodiments, crash classification engine 338 may use, as input, motion data collected by the sensors of computing devices, as well as one or more additional types of input features. For example, crash classification engine 338 may use, as input to a machine learning model, indications from driving detection engine 334 that a vehicle did or did not continue driving after the detection of a possible crash event.

Additional, or alternative, types of input features may include indications that a crash event occurred. Indications that a crash event occurred may include crash classifications or detections generated by previous classifier, rules-based analysis, or the like, such as an indication from an activity detection function that a possible crash event was detected. Other indications that a crash event occurred may include inputs from a user confirming or denying that a crash occurred in response to a push notification, an IVR call, a live agent call, or the like, as described further herein. Indications from a user may be considered by crash classification engine 338 when generating a crash classification, and/or applied to the subsequent evaluation of a crash classification. For example, an indication that a user confirmed the occurrence of a crash event may cause crash classification engine 338 to generate a crash classification with a high confidence or likelihood that a crash did in fact occur compared to crash classifications for which the input features did not include such an indication or included an indication that the user denied the occurrence of a crash event. As another example, an indication that a user confirmed the occurrence of a crash event may be used to adjust a crash detection threshold applied to the crash classification, such as by setting the threshold confidence for determining that a crash did in fact occur to zero so that any confidence will result in a positive determination.

Types of input features may additionally, or alternatively, include contextual information about the surrounding environment, and/or other contributing factors that may have been present during the time for which a crash classification is to be generated, that may increase the likelihood of a crash. For example, contextual information may include: weather conditions for the location of the computing device; road and/or traffic conditions for a road corresponding to the location of the computing device; a time of day; inputs from other applications executing on the computing device, such as whether a user was actively interacting with an application, whether the user was on an audio or video call, whether the user made a call to an emergency service, such as 911, or the like. Contextual information may be obtained from other processes executing on the computing device, such as a weather application, a traffic application, a messaging application or the like. Additionally, or alternatively, contextual information may be obtained from third-party sources and/or systems, such as emergency communications providers who can determine that a particular device made a call to an emergency service line.

In some embodiments, crash classification engine 338 may generate multiple classifications for a same crash event based on subsequent data collected by the computing device. For example, and as described further herein, crash classification engine 338 may generate an initial crash classification based on a first set of data received from a computing device within a predefined amount of time after the detection of the possible crash event. The predefined amount of time may be 30 second, 60 seconds, 90 seconds, 180 seconds, or a similarly suitable amount of time that maximizes crash classification accuracy while reducing crash detection response times. Based on the initial positive crash classification, a crash service escalation action sequence may be started in order to begin assessing and supplying the appropriate crash services to the user of the computing device. In the meantime, the computing device may continue to collect and/or analyze motion and driving data until another predefined amount of time has elapsed since the initial crash classification, at which point the additionally collected data, the initial crash classification, and other analysis results may be used to generate a new crash classification, and/or update the initial crash classification. By continuing to collect and analyze motion and driving data after the initial crash classification, crash classification and provisioning system 330 may continuously improve the accuracy of the initial crash classification.

In some embodiments, crash classification and provisioning system 330 may iteratively perform classifications on subsequent sets of collected motion and driving data until one or more predefined threshold criteria are met. For example, crash classification and provisioning system 330 may continue generating new classifications, or updating the initial classification, until the likelihood or confidence that the crash event was detected as a result of a vehicle accident is greater than a threshold confidence value confirming that a crash occurred, or less than a threshold confidence value indicating that a crash did not occur. Additionally, or alternatively, crash classification and provisioning system 330 may continue generating new classifications until the crash classification is confirmed or contradicted by a user of the computing device.

As described above, crash service provisioning engine 228 may initiate and/or manage the execution of one or more crash service actions based on the detection of a possible crash event. For example, after receiving an indication that a possible crash event has been detected with a classification that exceeds one or more predefined threshold criterion, crash service provisioning engine 228 may initiate a crash service action sequence. As described above, a crash service action sequence may include one or more actions intended to verify the occurrence of a vehicle accident, assess the level of appropriate services to provide in response to the vehicle accident, and coordinate the provisioning of the appropriate services from crash service providers 308 to the user.

As further described herein, the sequence of actions in a crash service action sequence may be performed in an order that incrementally escalates from lower cost actions, or actions that require fewer resources, such as a push notification to a computing device, to higher cost actions, such as an in-person wellness check by local law enforcement, based on the results of the preceding actions. For example, based on a user's response to a push notification confirming the occurrence of a vehicle accident, one or more automated telephone calls may be used to collect additional information from the user, such as whether the user requires emergency medical services (EMS).

In some embodiments, a plurality of crash service action sequences may be tailored to various crash classifications. For example, a first crash service action sequence may be used in response to crash event classifications with a high likelihood of having been detected as a result of a vehicle accident and/or for crash event classifications indicating that the possible crash event is associated with a high severity crash. Additionally, or alternatively, a second crash service action sequence may be executed in response to crash event classifications with lower likelihoods or lower crash severities based on a prediction that fewer crash services will be required. As described further herein, the various crash service action sequences may differ in the order and number of actions included in the sequence, and/or in the logic applied to selecting a next action based on the results of a previous action.

By selecting a tailored crash service action sequence for each possible crash event, crash classification and provisioning system 330 may reduce unnecessary resource consumption and user annoyance while maximizing user safety compared to other crash service provisioning systems that may rely on a single crash service action sequence to verify a possible crash event as a vehicle accident and provide services to the user.

Crash service provisioning engine 228 may further terminate a previously initiated crash service action sequence that has not been completed in response to one or more indications that additional services will not be required. For example, after transmitting a push notification to a user of a computing device to confirm the occurrence of a crash, and subsequently initiating an automated calling system based on a lack of response to the push notification from the user, crash service provisioning engine 228 may cancel the provisioning of a subsequent automated call or a live-agent call based on a delayed response from the user to the initial push notification. Additionally, or alternatively, crash service provisioning engine 228 may cancel previously initiated actions in response to a new or updated crash classification indicating that the detected crash event was not detected as a result of a vehicle accident.

Crash service provisioning engine 228 significantly enhances existing computer functionalities as well as emergency response technology more generally, by introducing a dynamic and continuous data analysis approach. Unlike traditional systems that rely on a single snapshot of motion data to initiate a fixed sequence of escalating actions, the improved system continuously collects and analyzes motion data at various intervals following the initial crash detection. This ongoing analysis allows the system to dynamically reassess the situation in real-time, potentially identifying false positives-such as when a vehicle resumes normal driving shortly after a suspected crash-thereby preventing unnecessary escalatory actions and conserving emergency response resources. By integrating real-time data analysis, the improved system not only enhances the accuracy and reliability of crash detection but also optimizes the efficiency of emergency response services, thereby reducing response times and improving overall safety outcomes. This continuous feedback loop transforms the system from a reactive to a proactive model, making it a more intelligent and adaptive solution in the realm of crash detection technology.

By allowing crash service provisioning engine 228 to cancel or otherwise deescalate the provisioning of crash services in response to one or more stimuli, crash classification and provisioning system 330 may further reduce unnecessary public resource consumption (e.g., police wellness checks) and private resource consumption (e.g., live agent calls) as well as avoid unnecessary distractions to drivers who were not involved in an accident and may still be driving, while ensuring that adequate services and responses are still provided to drivers who were involved in an accident and may need lifesaving services.

Crash service escalation engine 234 may identify the appropriate crash service action sequence to be executed by crash service provisioning engine 228. The appropriate crash service action sequence may be identified based on the crash classification generated by crash classification engine 338 as well as one or more predefined threshold criterion. For example, crash service escalation engine 234 may be configured to select a first crash service action sequence based on a determination that a crash classification meets a first set of predefined threshold criterion, and a second crash service action sequence based on a determination that the crash classification meets a second set of predefined threshold criterion. In some embodiments, the different sets of predefined threshold criterion include ranges of the crash classification likelihood or confidence. For example, a crash classification with a confidence value exceeding 50% but less than 75% may result in a crash service action sequence that is less costly compared to another crash service action sequence selected for crash classifications with a confidence value exceeding 75%.

Additionally, or alternatively, crash service escalation engine 234 may determine whether and/or when to terminate an ongoing crash service action sequence being executed by crash service provisioning engine 228. Crash service escalation engine may determine whether and/or when to terminate an ongoing crash service action sequence based on results of one or more previously executed actions in the crash service action sequence and/or based on results of subsequent classifications from crash classification engine 338. For example, in response to a new or updated crash classification indicating that a detected crash event is unlikely to have been detected as a result of a vehicle accident, crash service escalation engine 234 may terminate an ongoing crash service action sequence or otherwise cancel any remaining actions that are yet to be executed by crash service provisioning engine 228.

Crash service escalation engine 234 offers substantial improvements over existing computer functionalities and crash detection technologies by incorporating a severity-based response mechanism that more accurately predicts which emergency services may be required for each suspected crash event. Unlike traditional systems that employ a uniform response, typically culminating in the dispatch of emergency services irrespective of crash severity, the improved system evaluates the severity of each suspected crash before initiating a tailored action sequence. This targeted approach reduces unnecessary emergency dispatches for minor incidents, allowing emergency services to be reserved for more critical situations. By integrating severity assessment and customized response sequences, the system enhances its ability to accurately predict and provide the necessary emergency services, leading to better resource allocation and improved safety outcomes. This development shifts the system from a generic, reactive model to a more intelligent, adaptive, and resource-efficient solution in the realm of crash detection and emergency response technology.

As illustrated, crash classification and provisioning system 330 provides significant advances to the functionality and capabilities of traditional crash detection systems through specific computational enhancements that extend beyond simply improving manual or mental processes. Firstly, the system introduces continuous data collection and real-time analysis, shifting from a single, static snapshot of motion data to a dynamic, ongoing assessment. This continuous monitoring allows the system to reassess the situation in real-time, identifying false positives and terminating unnecessary escalatory actions if subsequent data indicates normal vehicle operation. Secondly, the system incorporates a severity-based assessment mechanism, enabling it to tailor response actions based on the severity of the suspected crash. This targeted approach ensures more precise and appropriate interventions, reducing unnecessary emergency dispatches for minor incidents and optimizing resource allocation.

These advancements are inherently tied to the computational capabilities of the system. The continuous data collection and real-time analysis require high-speed processing and the ability to handle large volumes of data rapidly, which surpasses human cognitive capabilities. The system's dynamic reassessment relies on complex algorithms and machine learning models that process and interpret motion data in real-time, beyond what humans can achieve without significant computational aid. The severity-based assessment mechanism involves sophisticated data analysis and decision-making processes that evaluate multiple variables and scenarios simultaneously, requiring computational power that is exclusive to advanced computer systems.

Furthermore, the system's ability to dynamically adapt and respond to crash events in real-time transforms it from a reactive to a proactive model, fundamentally changing how crash detection and emergency response are managed. This level of computational complexity and real-time data processing is a unique advantage of advanced computer systems, highlighting the indispensable role of technology in these improvements. The enhancements enable a more intelligent, adaptive, and efficient approach to crash detection and response, providing benefits that extend beyond mere improvements to manual or mental processes and into a new realm of technological capability.

Crash service providers 308 may include one or more systems, services, or functionalities that perform one or more actions of a crash service action sequence, such as SMS/push providers 312, Interactive Voice Response (IVR) providers 316, live agent providers 320, EMS and/or Police service providers 324, and/or vehicle service providers 328. Crash service providers 308 may perform various actions in response to provisioning by crash service provisioning engine 228 as part of a crash service action sequence. For example, after an initial crash classification, crash service provisioning engine 228 may provision an SMS message or push notification from SMS/push providers 312 to be transmitted to a mobile device that detected the crash event. The SMS or push notification may include an indication of the detected crash event and a request for the user to confirm or deny the occurrence of a vehicle accident. In some embodiments, the SMS or push notification may additionally, or alternatively, include instructions for a user to enter additional information about a confirmed vehicle accident using a web-based application operating on the mobile device that received the SMS or push notification.

Based on the response, or lack thereof, crash service provisioning engine 228 may begin to provision one or more IVR calls from IVR providers 316 to obtain additional information from the user. For example, the one or more IVR calls may be provisioned in response to a confirmation of the vehicle accident from the web-based application and/or based on a determination that a response has not been received within a threshold amount of time. Based on the response to the one or more IVR calls, one or more live agent calls may be provisioned from live agent providers 320 in order to receive any user specific information that may not be covered during an automated IVR call. Based on the response to the preceding actions, or a lack of response at any step, EMS and/or police services may be dispatched by EMS/Police service providers 324 and/or vehicle services, such as towing or roadside assistance, may be dispatched by vehicle service providers 328.

Exemplary De-Escalation of Crash Service Provisioning

Figure 4:
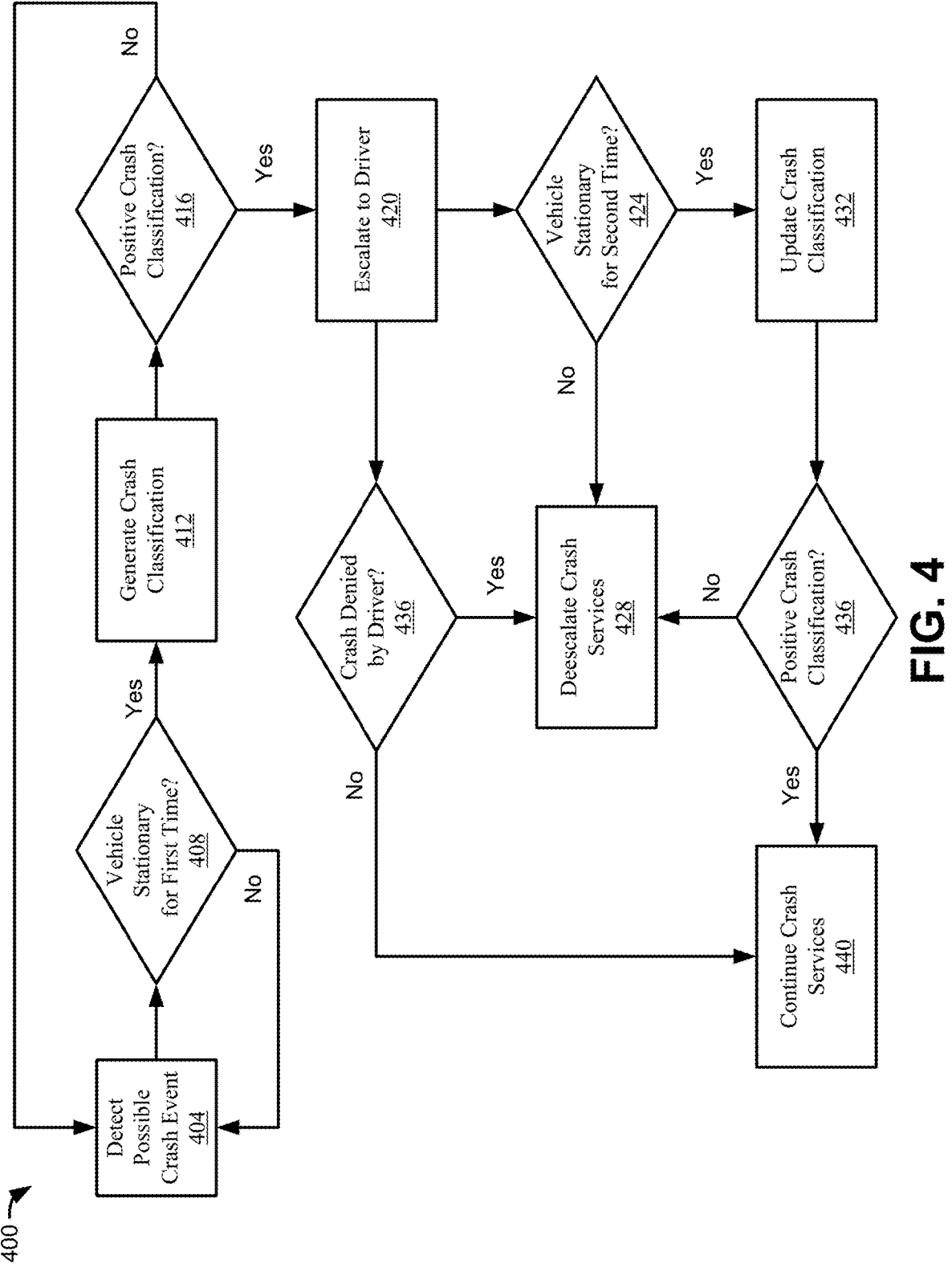
FIG. 4 is an exemplary decision tree for smart crash service escalation according to some aspects of the present disclosure.

FIG. 4 is an exemplary decision tree 400 for smart crash service escalation according to some aspects of the present disclosure. One or more of the actions and decisions illustrated in decision tree 400 may be implemented as one or more software applications executing on an electronic device, such as computing device 104, server 180, electronic device 204, computing device 304, and/or crash classification and provisioning system 330 as described above. Additionally, or alternatively, the actions and decisions illustrated in decision tree 400 may be distributed between multiple electronic devices, as explained further herein.

As further described herein, smart crash service escalation may involve one or more actions and decisions intended to adequately respond to true-positive crash event detections, while minimizing unnecessary resource consumption due to false-positive crash event detections. As illustrated, decision tree 400 may begin at action block 404 in which a possible crash event is detected. As described above, a possible crash event may be detected using sensor data collected by a computing device disposed within a vehicle during a drive. For example, one or more processes executing on a computing device may collect and analyze measurements from one or more sensors of the computing device and/or one or more sensors in communication with the computing device in order to detect a possible crash event. Additionally, or alternatively, the computing device may transmit the collected sensor data to a remote system, such as server 108 and/or crash classification and provisioning system 330 to possible crash event detection.

A possible crash event may be detected in response to a determination that measurements collected by the sensors of a computing device exceed one or more threshold criteria, such as a threshold acceleration value indicating that the computing device experienced a sudden and rapid deceleration. Additionally, or alternatively, motion data collected from the one or more sensors may be processed to extract features for a crash detection machine learning model. Using the extracted features as input, the crash detection machine learning model may identify patterns in the motion data consistent with motion data detected by other sensors during a confirmed accident.

At decision block 408, it may be determined whether the vehicle remained stationary for a first time. The first time may begin at the time when the possible crash event occurred and may end after a predefined duration. The predefined duration may be 30 seconds, 60 seconds, 90 seconds, or another suitable duration intended to maximize the accuracy of subsequent determinations while minimizing delays in crash service provisioning. As described further herein, determining whether the vehicle remained stationary may be based on one or more inputs from an activity detection engine and/or a speed prediction engine. For example, based on an indication that the computing device was moving at or above a speed threshold associated with travel in a vehicle during the first time, a decision that the vehicle did not remain stationary for the first time may be made. As another example, a determination that the vehicle did not remain stationary may be based on the detection of a driving activity by an activity detection engine during the first time. In response to a decision that the vehicle did not remain stationary, the process may terminate and/or return to action block 404 in response to a subsequently detected possible crash event.

A determination that the vehicle did remain stationary may be based on an estimated speed of the computing device not exceeding the speed threshold associated with travel in a vehicle during the first time. While described herein as remaining stationary during the first time, it should be understood that additional or alternative criteria may be applied at decision block 408, such as a determination that the vehicle remained stationary after coming to a stop after the possible crash event, a determination that the vehicle was stationary for a majority of the first time, a determination that the vehicle speed did not exceed a threshold speed, and the like.

In response to a determination that the vehicle remained stationary for a first time at decision block 408, a crash classification may be generated at action block 412. The crash classification may be generated using the motion and/or driving data used to detect the possible crash event in the first place and/or motion data collected during the first time. The crash classification may be generated by a crash classification machine learning model and may include a likelihood or confidence that the possible crash event was detected as a result of a vehicle accident. In some embodiments, the crash classification is generated by the computing device, a server system, or both. For example, the computing device may apply a first crash classification model to the motion and/or driving data used to detect the possible crash and/or motion data collected during the first time to generate a first crash classification. The computing device may then transmit the first crash classification, some or all of the data used to generate the first crash classification, or both, to a remote server system. The remote server system may then generate a second crash classification and/or update the first crash classification using the driving data alone and/or the driving data and first crash classification. The second crash classification and/or the updated first crash classification may then become the final crash classification generated at action block 412.

While illustrated as a precondition to generating the crash classification at action block 412, the determination at decision block 408 as to whether or not the vehicle remained stationary for the first time may additionally, or alternatively, be explicitly or implicitly considered as part of the generation of the crash classification at action block 412. For example, instead of performing a separate analysis of motion data, activity data, and/or features extracted from either or both after a predetermined duration since the time of the suspected crash, that data may be provided to a crash classification machine learning model that is implicitly trained to consider data indicative of a vehicle remaining stationary, or not, in the generation of crash classifications. As another example, after determining whether the vehicle remained stationary at decision block 408, the result may be provided as an explicit feature to the machine learning model. In either case, data indicative of a vehicle continuing to drive after the possible crash event, when provided to the machine learning model, may result in a crash classification suggesting that a crash did not occur, while data indicative of a vehicle remaining stationary may result in a crash classification suggesting that a crash did in fact occur.

At decision block 416, it may be determined whether the crash classification generated at action block 412 is a positive crash classification. A positive crash classification may be a crash classification with a likelihood or confidence that meets or exceeds one or more predefined threshold criteria, such as a minimum threshold confidence value. Alternatively, a negative crash classification may be identified when a crash classification does not meet the one or more predefined threshold criteria, at which point the process may terminate and/or return to action block 404 in response to a subsequently detected possible crash event.

In response to a positive crash classification, the process may proceed to action block 420 by escalating the crash to a driver or user of the computing device that detected the possible crash event. Escalating the crash to the driver or user may include initiating a crash service action sequence, as described above. For example, escalating the crash to the driver may begin with a push notification on a mobile device or an SMS message requesting that the user confirm or deny the occurrence of the crash. Subsequently, actions involving additional levels of user interaction may be employed, such as IVR calls, live agent calls, in-person wellness checks, and the like, to obtain additional confirmation and information related to the possible crash event from the user. The actions may be performed according to a predefined order of escalation and predefined intervals. For example, the action requiring the least amount of interaction and/or involvement by the user or other third parties may be performed before proceeding to a subsequent action. In some embodiments, the escalation occurs automatically at predefined time intervals absent any interaction from the user. For example, after 60 seconds, 90 seconds, 180 seconds, or another similarly suitable length of time during which a response from the user has not been received, the next action in the crash service action sequence may be automatically performed.

In response to an escalation action, at decision block 436, a determination may be made that the driver or user of the computing device has denied the occurrence of a crash. The denial of the crash may be received in response to an initial escalation to the user or a subsequent escalation action. For example, the user may respond to an initial push notification action indicating that a crash did not occur. The response may be received before or after a subsequent action has been executed. For example, the response to an initial push notification may be received after one or more automated IVR calls have been made to the user. In response to a determination that the driver or user denied the occurrence of a crash at decision block 436, the escalation of crash service provisioning may be canceled or terminated at action block 428.

At decision block 424, a determination of whether the vehicle remained stationary for a second time may be made. The second time may include the first time and a subsequent predefined amount of time after the first time, such as an additional 60 seconds, 90 seconds, 180 seconds, or the like after the conclusion of the first time. In response to a determination that the vehicle did not remain stationary, the process may end by terminating or canceling the escalation of crash services at block 428.

Alternatively, in response to a determination that the vehicle did remain stationary for the second time, the process may proceed to update the crash classification at action block 432. Updating the crash classification may include generating a new crash classification for the possible crash event and/or adjusting the initial crash classification generated at action block 412. The motion and/or driving data used to detect the possible crash event, the motion and/or driving data used to generate the initial crash classification, and/or the motion and/or driving data collected during the second time may be used to update the crash classification. As described above in relation to action block 412, and while illustrated as a precondition to action block 432, the determination at decision block 424 as to whether or not the vehicle remained stationary may additionally, or alternatively, be explicitly or implicitly considered as part of updating the crash classification at action block 432.

At decision block 436, it may be determined whether the updated crash classification is still a positive crash classification. In some embodiments, the same threshold criteria applied in decision block 416 is applied in decision block 436 to determine if the updated crash classification is a positive crash classification. Additionally, or alternatively, a second threshold criteria may be applied in decision block 436. For example, a more stringent threshold criteria may be applied in decision block 436 to account for an increased classification accuracy resulting from a classification generated from additional motion and/or driving data. In response to a determination that the updated crash classification is negative, the process may end by terminating or canceling the escalation of any remaining crash services at block 428.

Alternatively, if the updated crash classification is positive, the process may proceed to action block 440, in which subsequent crash services may continue to be provisioned. While not illustrated, the process may return at periodic intervals to decision block 424 to determine whether the vehicle has continued to remain stationary for a subsequent time period. Additionally, or alternatively, action block 432 may be repeated at subsequent intervals in order to provide an updated crash classification. In some embodiments, the timing of repeating blocks 424-436 coincides with the execution of various escalation actions. For example, blocks 424-436 may be performed just prior to the execution of each subsequent action initiated by action block 420 as part of a crash service action sequence to ensure that such actions are still warranted based on updated determinations made after the initial escalation to the driver and/or user of the computing device.

By periodically generating updated crash classifications based on subsequently collected data, thereby improving the accuracy of the initial classification, a crash classification and provisioning system, such as crash classification and provisioning system 330, may simultaneously reduce crash service response latency for true-positive crash event detections while minimizing potentially unnecessary crash service provisioning. Additionally, or alternatively, by periodically determining whether the vehicle has remained stationary from the time of the detected crash event up to the execution of each action in a crash service action sequence, false-positive crash event detections may be identified and used to avoid potentially unnecessary resource consumption.

Figure 5:
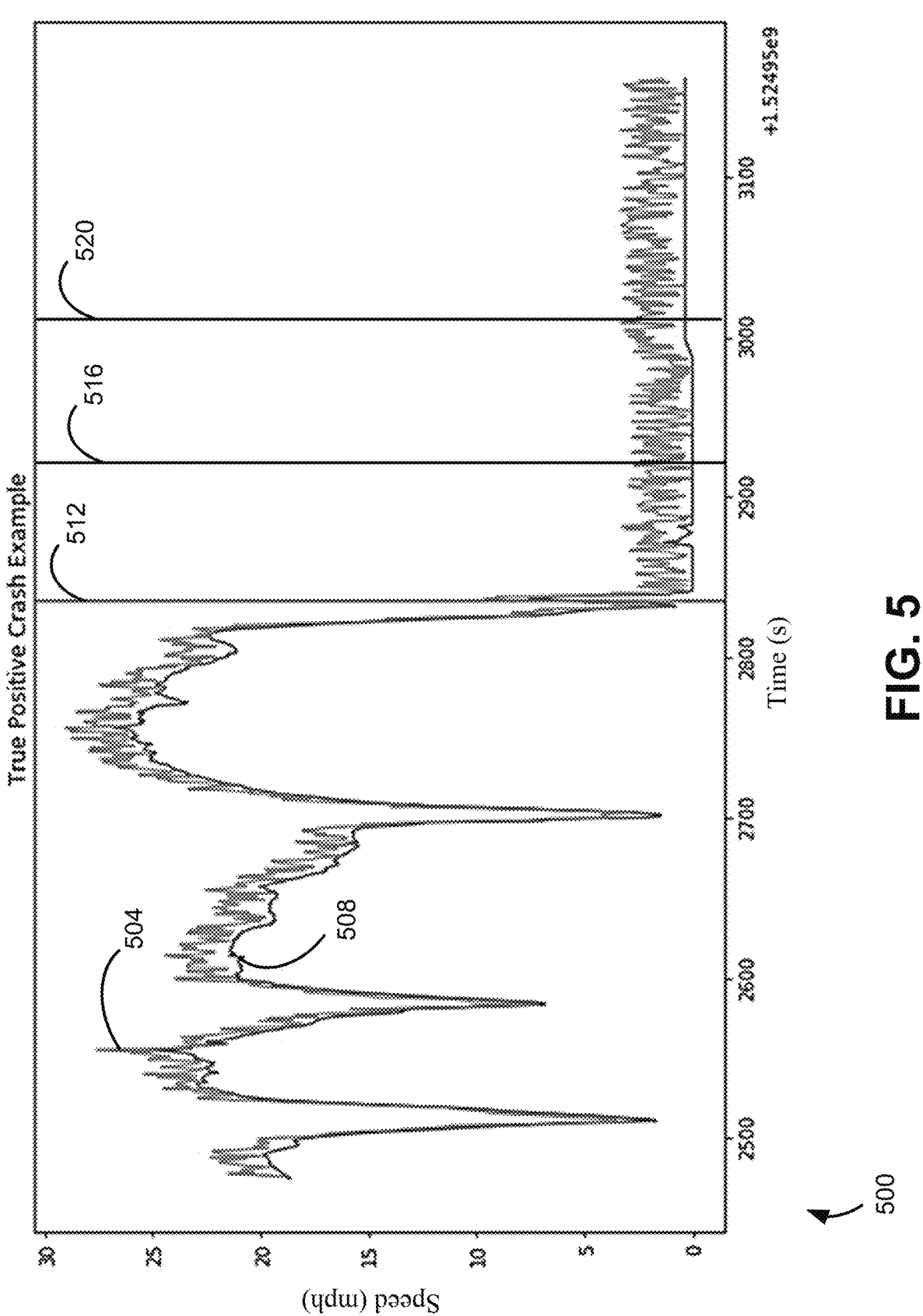
FIG. 5 is an example graph of predicted speed over time representing a true positive crash prediction according to aspects of the present disclosure.

FIG. 5 is an example graph 500 of predicted speed over time representing a true positive crash detection according to aspects of the present disclosure. Graph 500 depicts the predicted speed of a vehicle during a drive 504 (in gray) and the actual speed of the vehicle 508 (in black). At first time 512 (T=2840), a crash detection indicates the occurrence of a possible crash event. For example, referring back to FIG. 4, based on movement measurements obtained from a computing device, the possible crash event at first time 512 may be detected at action block 404. After first time 512, the predicted speed of the vehicle and the actual speed are approximately zero indicating the vehicle stopped after the possible crash event. At second time 516 (T=2930), a determination that the vehicle remained stationary after coming to a stop may be made (e.g., at decision block 408), and data, such as motion and/or driving data, collected starting at first time 512 and ending at second time 516 may be used to generate an initial crash classification for the possible crash event (e.g., at action block 412). Since the vehicle remained stationary after the crash event, the possible crash event is more likely to be a true positive (e.g., the crash occurred), and the crash classification (e.g., as determined at decision block 416) may be escalated to the user of the computing device in response (e.g., at action block 420).

At third time 520 (T=3020), a subsequent determination that the vehicle has remained stationary (e.g., at decision block 424), and an updated crash classification may be generated (e.g., at action block 432) based on the additional data collected up to third time 520. In some embodiments, third time 520, and any subsequent times intervals, are selected to coincide with the execution of a subsequent action in the crash service action sequence. For example, third time 520 may be selected such that the determination of the vehicles movement and updated crash classification are complete prior to executing a subsequent action (e.g., at action block 440).

Figure 6:
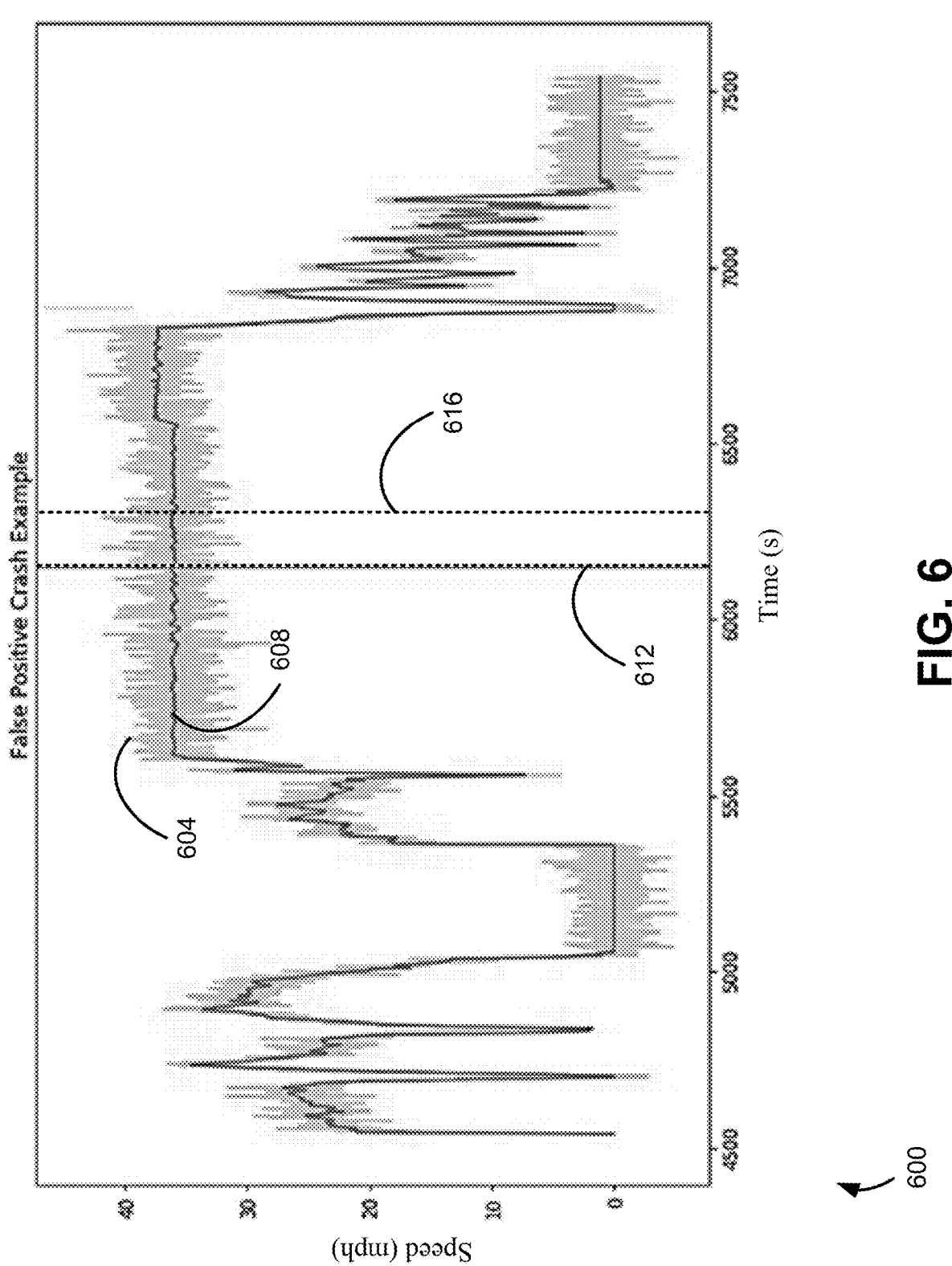
FIG. 6 is an example graph of predicted speed over time representing a false positive crash prediction according to aspects of the present disclosure.

FIG. 6 is an example graph 600 of predicted speed over time representing a false positive crash prediction according to aspects of the present disclosure. Graph 600 depicts the predicted speed of a vehicle during a drive 604 (in grey) and the actual speed of the vehicle 608 (in black). At first time 612 (T=6200), the predicted speed of the vehicle is approximately 36 mph when a crash detection indicates the occurrence of a possible crash event (e.g., at action block 404). After first time 612, the predicted speed of the vehicle (and the actual speed) does not change but continues at 36 mph. At second time 616 (T=6290), a determination (e.g., at decision block 408) that the vehicle was not stationary between first time 612 and second time 616 may be used to determine that the possible crash event is more likely to be a false positive (e.g., no crash event occurred). As a result, the possible crash event may be ignored and/or purged from local memory, and the system and/or computing device may proceed to monitor the movement measurements for future possible crash events (e.g., at action block 404).

Figures 7A, 7B, 7C:
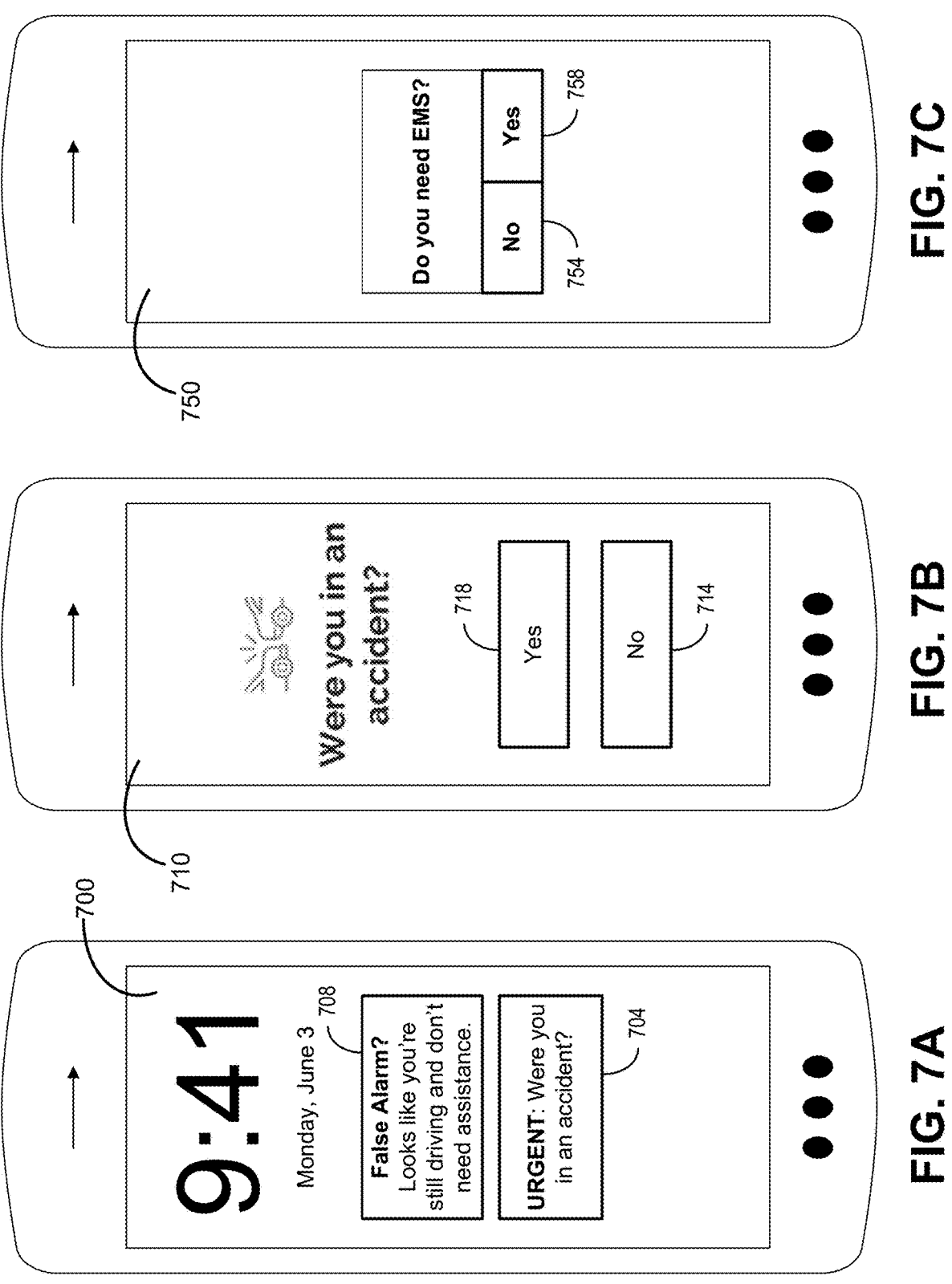
FIGS. 7A-7E illustrate example mobile device interfaces for confirming crash events and provisioning crash service according to some aspects of the present disclosure.

FIGS. 7A-7C illustrate example mobile device interfaces for confirming crash events and provisioning crash service according to some aspects of the present disclosure. As described above, each action in a crash service action sequence may involve increasing amounts of interaction from a user of the mobile device, other people, and/or third-party services. Accordingly, an initial action may involve a minimal amount of interaction from a user in order to determine whether additional interaction and/or input may be helpful to determine the appropriate level of crash services to provide.

As illustrated in FIG. 7A, user interface 700 of a mobile device may be used to display a first push notification 704 to a user. While described as a push notification, additional or alternative forms of notification may be used, such as SMS messages. As described above, the first push notification 704 may be displayed to the user in response to an initial determination that the vehicle remained stationary for a predefined amount of time after the detected crash event and/or that a positive crash classification was generated. As further illustrated, the first push notification 704 may prompt a user to interact with the notification and/or a crash services application executing on the mobile device. In response to an interaction by the user with the first push notification 704, the crash services application may display a series of user interfaces prompting the user to provide additional information about the possible crash event.

For example, as illustrated in FIG. 7B, user interface 710 may be displayed to the user with first selectable option 718 to confirm the possible crash event as a vehicle accident and a second selectable option 714 to deny that a vehicle accident has occurred. As further described above, in response to selection of the second selectable option 714 denying the occurrence of a vehicle accident, a crash service action sequence initiated in response to the initial classification may be canceled or terminated prior to the execution of a subsequent action, such as an automated IVR call, or live agent call.

Alternatively, and as illustrated in FIG. 7C, user interface 750 may be displayed to the user in response to selection of the first selectable option 718 confirming the occurrence of a vehicle accident. User interface 750 may include an offer to provide EMS, such as by dispatching an ambulance to the location of the mobile device, a third selectable option 754 to indicate that EMS is unnecessary, and a fourth selectable option 758 to confirm the possible need for EMS. In some embodiments, user interface 750 is displayed immediately in response to receiving a selection of the first selectable option 718 confirming that a vehicle accident has occurred. As described further herein, a selection of the third selectable option 754 indicating that EMS may be unnecessary, or in some embodiments, no selection of either the third selectable option 754 or the fourth selectable option 758 (e.g., after a threshold amount of time has elapsed since displaying user interface 750), may result in a crash service action sequence initiated in response to the initial classification being modified or canceled prior to the execution of a subsequent action, such as an automated IVR call, or live agent call. For example, a previously schedule automated IVR call may be canceled in response to a selection of the third selectable option 754 or a determination that neither the third selectable option 754 nor the fourth selectable option 758 were selected just prior to the previously scheduled time of the automated IVR call. Additionally, or alternatively, the user or driver may be presented with additional options and resources for addressing or correcting their initial selection of the first selectable option 718 confirming the possible crash event as a vehicle accident.

Figures 7D, 7E:
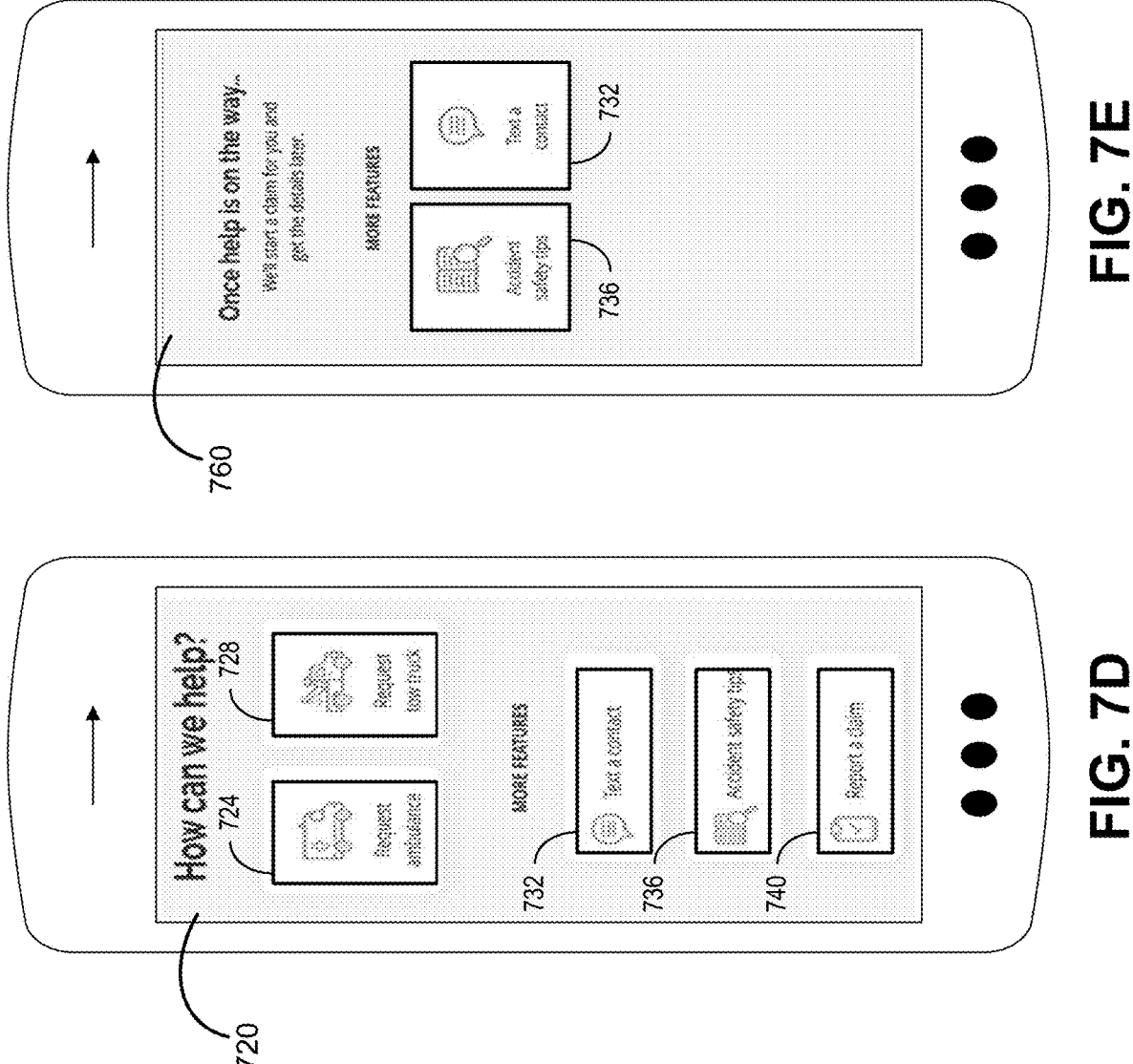

For example, as illustrated in FIG. 7D, user interface 720 may be displayed to the user in response to a selection of the third selectable option 754 indicating that EMS is unnecessary. User interface 720 may include additional selectable options including an EMS services request option 724 (e.g., in the event that EMS is subsequently determined to be necessary), a vehicle services request option 724, an emergency contact option 732, an option to view accident safety tips 736, and/or an option to report a claim to an insurance provider 740.

Alternatively, and as illustrated in FIG. 7E, user interface 760 may be displayed to the user in response to a selection of the fourth selectable option 758 confirming the need for EMS. As illustrated, user interface 760 displays an indication that EMS services are being provisioned to the user (e.g., as described above in relation to FIG. 3). As further illustrated, user interface 760 may also display additional health and safety resources to the user, such as the emergency contact option 732 and/or the option to view accident safety tips 736 described above in relation to FIG. 7D.

Returning to FIG. 7A, user interface 700 illustrates a second push notification 708 indicating that the initial crash classification has been identified as a false-positive crash event. As described above, the second push notification 708 may be displayed to the user of the mobile device after a subsequent determination that the vehicle continued driving after the initial crash event detection and/or after a new or updated crash classification has been made indicating that the first crash classification was a false-positive classification. The second push notification 708 may only be displayed after a determination that the user has not responded to the first push notification 704. In response to an interaction by the user with the second push notification 708, the crash services application may display user interface 710 enabling the user to confirm the subsequent identification of the initial crash classification as a false-positive crash event (e.g., by selecting the first selectable option 714), or confirm the initial crash classification as a true-positive crash event (e.g., by selecting the second selectable option 718). In some embodiments, a confirmation of the initial crash classification in response to the second push notification 708 may result in the crash services application displaying user interface 720 including the various options and resources that are available to the user.

Figure 8:
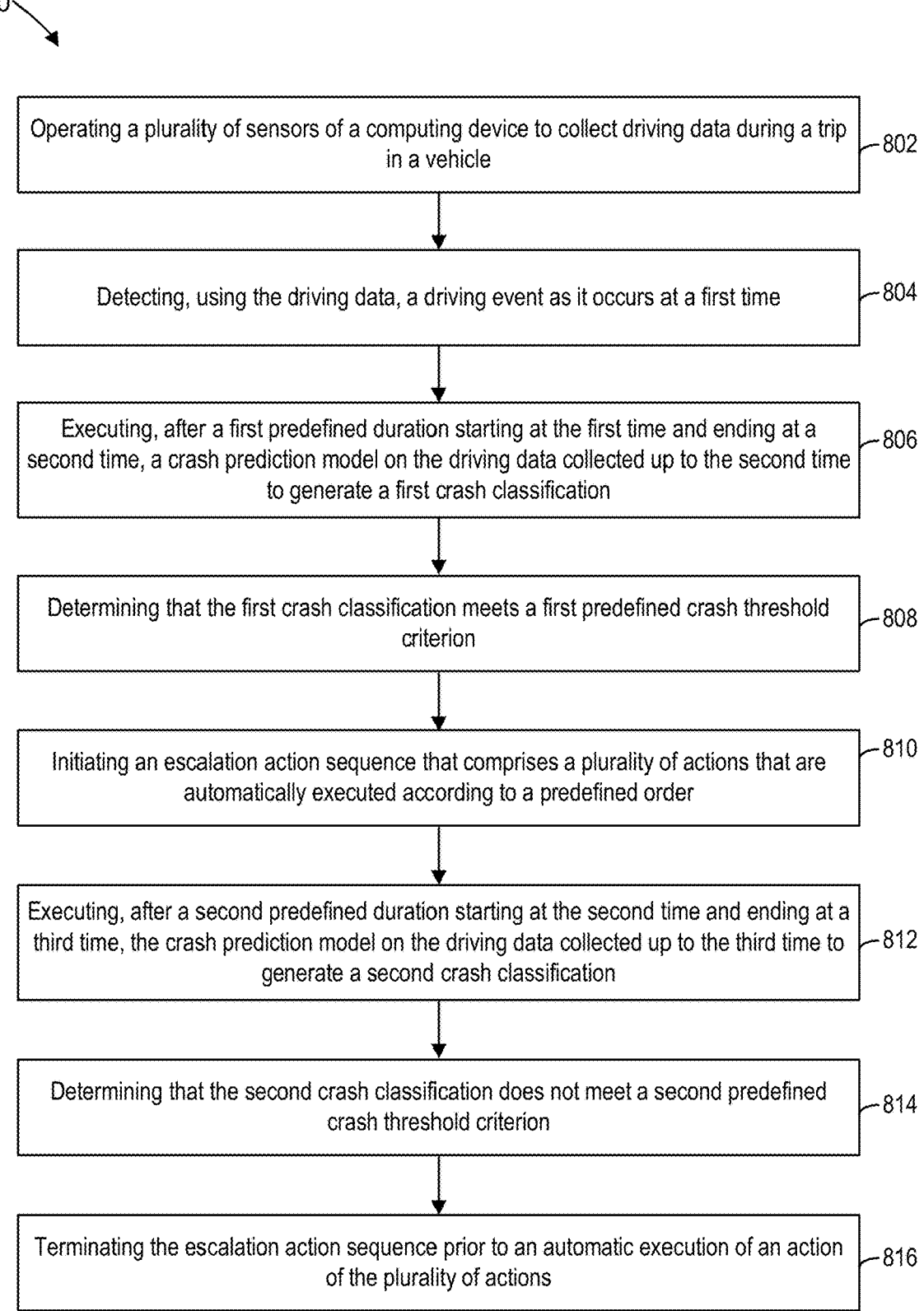
FIG. 8 illustrates an example of a method of crash service provisioning according to some aspects of the present disclosure.

FIG. 8 illustrates an example method 800 of crash service provisioning according to some aspects of the present disclosure. One or more blocks of method 800 may be performed by a computing device, such as computing device 104 described above. Additionally, or alternatively, one or more blocks of method 800 may be performed by a remote system, such as crash classification and provisioning system 330 described above.

At block 802, sensors of a computing device may be operated to collect driving data during a trip in a vehicle. For example, the computing device may include an IMU having, among other things, an accelerometer, a gyroscope, and a magnetometer. Additionally, or alternatively, the computing device may include a GPS receiver. The driving data may include measurements indicative of the movement of the vehicle during the drive, such as acceleration vectors, speed, location, and the like.

At block 804, a driving event is detected as it occurs at a first time using the driving data collected by the sensors of the computing device. In some embodiments, the driving event may be a possible crash event detected from the driving data. For example, vehicle acceleration vectors derived from accelerometer measurements greater than a threshold acceleration may be used to detect a possible crash event. Additionally, or alternatively, an indication that the speed of the vehicle experienced a sudden deceleration or acceleration may be used to detect a possible crash event.

At block 806, a crash prediction machine learning model is executed on driving data collected up to a second time to generate a first crash classification. The driving data collected up to the second time may include the driving data used to detect the possible crash event and subsequently collected driving data leading up to the second time. The crash prediction machine learning model may additionally, or alternatively, use additional features to generate the first crash classification, such as contextual information, user inputs, and other indicia of a crash event. The second time may be at the end of a first predefined duration starting at the first time, such as 30 second, 60 second, 90 seconds, or a similar duration after the first time that balances classification accuracy with crash classification latency. In some embodiments, generating the first crash classification is performed in response to determining that the vehicle remained stationary, or did not otherwise continue driving, after the possible crash event and/or leading up to the second time. As described above, the first crash classification may represent a likelihood or confidence that the possible crash event was detected as a result of a vehicle accident. In some embodiments, the first crash classification is used to determine a crash severity. For example, crash classifications indicating a high confidence or likelihood that the possible crash event was detected as a result of a vehicle accident may correspond to more sever crashes.

At block 808, a determination that the first crash classification meets a first predefined crash threshold criterion may be made. The first predefined crash threshold criterion may include a minimum likelihood or confidence value selected to maximize the elimination of false-positive crash classifications and minimize the elimination of true-positive crash classifications. At block 810, an escalation action sequence may be initiated in response to determining that the first crash classification meets the first predefined crash threshold criterion. As described above, an escalation action sequence, or a crash service action sequence, may include a plurality of actions that are automatically executed according to a predefined order. For example, the plurality of actions may be executed in order of increasing interaction required from a user, another person, or a crash service provider, in order to verify the occurrence of a vehicle accident event, identify the appropriate level of crash services to provide to the occupants of the vehicle, and subsequently provision the identified services.

In some embodiments, the escalation action sequence begins with a first action that includes outputting, via a mobile device, an indication of the first crash classification and a prompt to the user of the mobile device to confirm or deny the first crash classification. For example, as illustrated in FIG. 7A, a user interface may display a push notification transmitted to the mobile device.

At block 812, the crash prediction machine learning model is executed on driving data collected up to a third time to generate a second crash classification. The driving data collected up to the third time may include the driving data collected up to the second time and subsequently collected driving data leading up to the third time. The crash prediction machine learning model may additionally, or alternatively, use additional features to generate the second crash classification, such as contextual information, user inputs, and other indicia of a crash event. The third time may be at the end of a second predefined duration starting at the second time, such as 30 seconds, 60 seconds, 90 seconds, or a similar duration. In some embodiments, generating the second crash classification is performed in response to determining that the vehicle remained stationary, or did not otherwise continue driving, after the possible crash event and/or leading up to the third time. As described above, the second crash classification may represent an updated likelihood or confidence that the possible crash event was detected as a result of a vehicle accident. In some embodiments, the second crash classification is generated by executing a different crash prediction machine learning model compared to the crash prediction machine learning model used to generate the first crash classification. For example, a different machine learning model trained to generate crash classifications using additional data compared with the initial machine learning model, such as a user response to the push notification described above, may be used to generate the second crash classification.

At block 814, a determination that the second crash classification does not meet a second predefined crash threshold criterion may be made. In some embodiments, the second predefined crash threshold criterion are the same as the first predefined crash threshold criterion. Additionally, or alternatively, the second predefined crash threshold criterion may be more stringent compared to the first predefined crash threshold criterion to account for the improved accuracy of the second crash classification provided as a result of the additionally collected driving data.

In some embodiments, a negative response to any one or more of the actions in the escalation action sequence is used to determine that the second crash classification does not meet the second predefined crash threshold criterion. For example, prior to the third time, it may be determined that a denial of the first crash classification has been received from the user in response to an initial action (e.g., a push or SMS notification). Based on the denial by the user of the first crash classification, the second predefined crash threshold criterion may be modified. For example, the second predefined crash threshold criterion may be set above a maximum possible likelihood or confidence generated by the crash prediction machine learning model. Additionally, or alternatively, method 800 may be prematurely terminated in response to a denial of the first crash classification by the user of the mobile device.

At block 816, the escalation action sequence is terminated prior to an automatic execution of an action of the plurality of actions. The escalation action sequence may be terminated in response to determining that the vehicle continued driving before the third time, determining that the second crash classification did not meet the second predefined crash threshold criterion, and/or after receiving a denial of the first crash classification from a user of the mobile device. In some embodiments, terminating the escalation action sequence may include transmitting a request to cancel previously provisioned crash services, such as one or more automated IVR calls, a live agent call, a police wellness check, EMS services, and the like.

It should be appreciated that the specific steps illustrated in FIG. 8 provide a particular method of crash service provisioning according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 9 illustrates another example of a method 900 of crash service provisioning according to some aspects of the present disclosure. One or more blocks of method 900 may be performed by a computing device, such as computing device 104 described above. Additionally, or alternatively, one or more blocks of method 900 may be performed by a remote system, such as crash classification and provisioning system 330 described above.

At block 902, sensors of a computing device may be operated to collect driving data during a trip in a vehicle. For example, the computing device may include an IMU having, among other things, an accelerometer, a gyroscope, and a magnetometer. Additionally, or alternatively, the computing device may include a GPS receiver. The driving data may include measurements indicative of the movement of the vehicle during the drive, such as acceleration vectors, speed, location, and the like.

At block 904, a driving event is detected as it occurs at a first time using the driving data collected by the sensors of the computing device. In some embodiments, the driving event may be a possible crash event detected from the driving data. For example, vehicle acceleration vectors derived from accelerometer measurements greater than a threshold acceleration may be used to detect a possible crash event. Additionally, or alternatively, an indication that the speed of the vehicle experienced a sudden deceleration may be used to detect a possible crash event.

At block 906, a crash prediction machine learning model is executed on driving data collected up to a second time to generate a first crash classification. The driving data collected up to the second time may include the driving data used to detect the possible crash event and subsequently collected driving data leading up to the second time. The second time may be at the end of a first predefined duration starting at the first time, such as 30 seconds, 60 seconds, 90 seconds, or a similar duration after the first time that balances classification accuracy with crash classification latency. In some embodiments, the first crash classification is generated in response to determining that the vehicle remained stationary, or did not otherwise continue driving, after the possible crash event and/or leading up to the second time. As described above, the first crash classification may represent a likelihood or confidence that the possible crash event was detected as a result of a vehicle accident. In some embodiments, the first crash classification is used to determine a crash severity associated with the possible crash event. For example, crash classifications indicating a high confidence or likelihood that the possible crash event was detected as a result of a vehicle accident may result in a higher severity being associated with the possible crash event.

At block 908, a determination that the first crash classification meets a first predefined crash threshold criterion may be made. The first predefined crash threshold criterion may include a minimum likelihood or confidence value selected to maximize the elimination of false-positive crash classifications and minimize the elimination of true-positive crash classifications. At block 910, an escalation action sequence may be initiated in response to determining that the first crash classification meets the first predefined crash threshold criterion. As described above, an escalation action sequence, or a crash service action sequence, may include a plurality of actions that are automatically executed at predefined points in time according to a predefined order. For example, the plurality of actions may be executed in order of increasing interaction required from a user, another person, or a crash service provider, in order to verify the occurrence of a vehicle accident event, identify the appropriate level of crash services to provide to the occupants of the vehicle, and subsequently provision the identified services. The predefined points in time may correspond with periodic or semi-periodic intervals, such as every 30 seconds, 60 seconds, 90 seconds, 180 seconds, and the like. Additionally, or alternatively, the predefined points in time may be scheduled irregular intervals intended to provide a user with a reasonable amount of time to respond to each action. For example, actions involving little interaction or input from a user, such as a push notification, may provide a shorter amount of time for response before executing a subsequent action while actions requiring additional interaction or specialized input, such as a live agent call, may provide a longer amount of time for response before proceeding to the subsequent action.

In some embodiments, the escalation action sequence begins with a first action that includes outputting, via a mobile device, an indication of the first crash classification and a prompt to the user of the mobile device to confirm or deny the first crash classification. For example, as illustrated in FIG. 7A, a user interface may display a push notification transmitted to the mobile device.

At block 912, a determination is made prior to each predefined point in time whether the driving data collected up to the predefined point in time confirms the first crash classification. For example, the crash prediction machine learning model may be executed on driving data collected up to each predefined point in time to generate a new or updated crash classification. At each iteration, the driving data used to generate the new or updated classification may include all or a majority of the driving data collected between the first time and the respective predefined point in time. As described above, each new or updated crash classification may represent an updated likelihood or confidence that the possible crash event was detected as a result of a vehicle accident.

In some embodiments, a determination that a new or updated crash classification does not meet a subsequent predefined crash threshold criterion is used to determine whether the driving data collected up to the predefined point in time confirms the first crash classification. The subsequent predefined crash threshold criterion may be the same as the first predefined crash threshold criterion. Additionally, or alternatively, each subsequent predefined crash threshold criterion may be more stringent compared to the first predefined crash threshold criterion to account for improvements in the accuracy of each subsequent crash classification provided as a result of the additionally collected driving data.

In some embodiments, a negative response to any one or more of the actions in the escalation action sequence is used to determine that the driving data collected up to the predefined point in time contradicts the first crash classification. For example, prior to a third time, it may be determined that a denial of the first crash classification has been received from the user in response to an initial action (e.g., a push or SMS notification). Based on the denial by the user of the first crash classification, a subsequent predefined crash threshold criterion may be modified. For example, the subsequent predefined crash threshold criterion may be set above a maximum possible likelihood or confidence generated by the crash prediction machine learning model. Additionally, or alternatively, method 900 may be prematurely terminated in response to a denial of the first crash classification by the user of the mobile device.

At block 914, the escalation action sequence is terminated prior to the execution of an action in response to determining that the driving data collected up to the corresponding predefined point in time contradicts the first crash classification. For example, the escalation action sequence may be terminated in response to determining that the vehicle continued driving before the predefined point in time, determining that a new or updated crash classification did not meet a subsequent predefined crash threshold criterion, and/or after receiving a denial of the first crash classification from a user of the mobile device. In some embodiments, terminating the escalation action sequence may include transmitting a request to cancel previously provisioned crash services, such as one or more automated IVR calls, a live agent call, a police wellness check, EMS services, and the like.

It should be appreciated that the specific steps illustrated in FIG. 9 provide a particular method of crash service provisioning according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Smart Crash Service Escalation

FIG. 10 illustrates an example of a method 1000 of crash service action sequence selection according to some aspects of the present disclosure. One or more blocks of method 1000 may be performed by a computing device, such as computing device 104 described above. Additionally, or alternatively, one or more blocks of method 1000 may be performed by a remote system, such as crash classification and provisioning system 330 described above.

At block 1002, sensors of a computing device may be operated to collect driving data during a trip in a vehicle. For example, the computing device may include an IMU having, among other things, an accelerometer, a gyroscope, and a magnetometer. Additionally, or alternatively, the computing device may include a GPS receiver. The driving data may include measurements indicative of the movement of the vehicle during the drive, such as acceleration vectors, speed, location, and the like.

At block 1004, a driving event is detected as it occurs at a first time using the driving data collected by the sensors of the computing device. In some embodiments, the driving event may be a possible crash event detected from the driving data. For example, vehicle acceleration vectors derived from accelerometer measurements of the computing device that are greater than a threshold acceleration may be used to detect a possible crash event. Additionally, or alternatively, an indication that the speed of the vehicle experienced a sudden deceleration may be used to detect a possible crash event.

At block 1006, a crash prediction machine learning model is executed on driving data collected up to a second time to generate a first crash classification. The driving data collected up to the second time may include the driving data used to detect the possible crash event and subsequently collected driving data leading up to the second time. The second time may be at the end of a first predefined duration starting at the first time, such as 30 seconds, 60 seconds, 90 seconds, or a similar duration after the first time that balances classification accuracy with crash classification latency. In some embodiments, the first crash classification is generated in response to determining that the vehicle remained stationary, or did not otherwise continue driving, after the possible crash event and/or leading up to the second time. As described above, the first crash classification may represent a likelihood or confidence that the possible crash event was detected as a result of a vehicle accident.

At block 1008, a determination that the first crash classification meets a first predefined crash threshold criterion may be made. The first predefined crash threshold criterion may include a minimum likelihood or confidence value selected to maximize the elimination of false-positive crash classifications and minimize the elimination of true-positive crash classifications. At block 1010, a crash severity for the possible crash event may be determined using the first crash classification. For example, a crash severity may be assigned based on the likelihood, confidence, and/or precision of the first crash classification. Crash severity may be represented as a scalar value (e.g., within a range of 1-10, 1 indicating low-severity and 10 indicating high-severity), a percentage, a grade, a category, and the like. In some embodiments, one or more threshold criterion may be applied to determine the crash severity. For example, a first threshold criterion associated with high severity vehicle accidents may include a minimum precision threshold of 0.5, such that crash classifications having a confidence or precision value greater than or equal to 0.5 are identified as having a high severity. As another example, a second threshold criterion may include a minimum precision threshold of 0.33 and a maximum precision threshold at the minimum precision threshold of a next highest severity threshold (e.g., 0.5), such that crash classifications having a confidence or precision value greater than or equal to the minimum precision threshold (e.g., 0.33) and less than the maximum precision threshold (e.g., 0.5) are identified as having a next highest severity. In yet another example, a third threshold criterion may include a minimum precision threshold (e.g., 0.1) such that possible crash events with crash classifications having a confidence or precision less than the minimum precision threshold are identified as not being detected as a result of a vehicle accident. While two severity levels are described herein, additional severity levels may be added or removed along with their corresponding threshold criterion to account for finer levels of crash severity identification.

At block 1012, an escalation action sequence may be initiated based on the determined crash severity. The escalation action sequence may additionally be initiated in response to determining that the first crash classification meets the first predefined crash threshold criterion. As described above, an escalation action sequence, or a crash service action sequence, may include a plurality of actions that are automatically executed according to a predefined order. In some embodiments, the plurality of actions and/or the predefined order, may be determined based on the crash severity associated with the possible crash event.

As further illustrated and described herein, while the same actions may be possible for each possible crash severity level, the logic used to determine which subsequent action to perform based on the results of a preceding action may differ from one severity level to the next. For example, the logic applied for a possible crash event with low severity may bias toward less interaction and involvement by the user and/or other persons based on the assumption that less intensive crash services (e.g., EMS or vehicle services) are required, while the logic applied for high severity crash events may bias toward more interaction and involvement by other persons based on the assumption that high severity crashes may result in the user being incapacitated or severely injured.

As described further above, method 1000 may optionally include additional steps for smart de-escalation based on subsequently collected driving data. For example, as described in reference to methods 800 and 900, subsequent determinations may be made at periodic, semi-periodic, or irregular intervals as to whether the subsequently collected driving data confirms the first crash classification, such as determinations that the vehicle continued driving after the possible crash event, a subsequent crash classification with a confidence or precision less than a minimum crash classification threshold, and/or a denial of the first crash classification from a user of a mobile device. In response to a determination that subsequently collected driving data contradicts the first crash classification, the escalation action sequence may be terminated prior to the execution of the remaining actions in the sequence.

It should be appreciated that the specific steps illustrated in FIG. 10 provide a particular method of crash service provisioning according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 11:
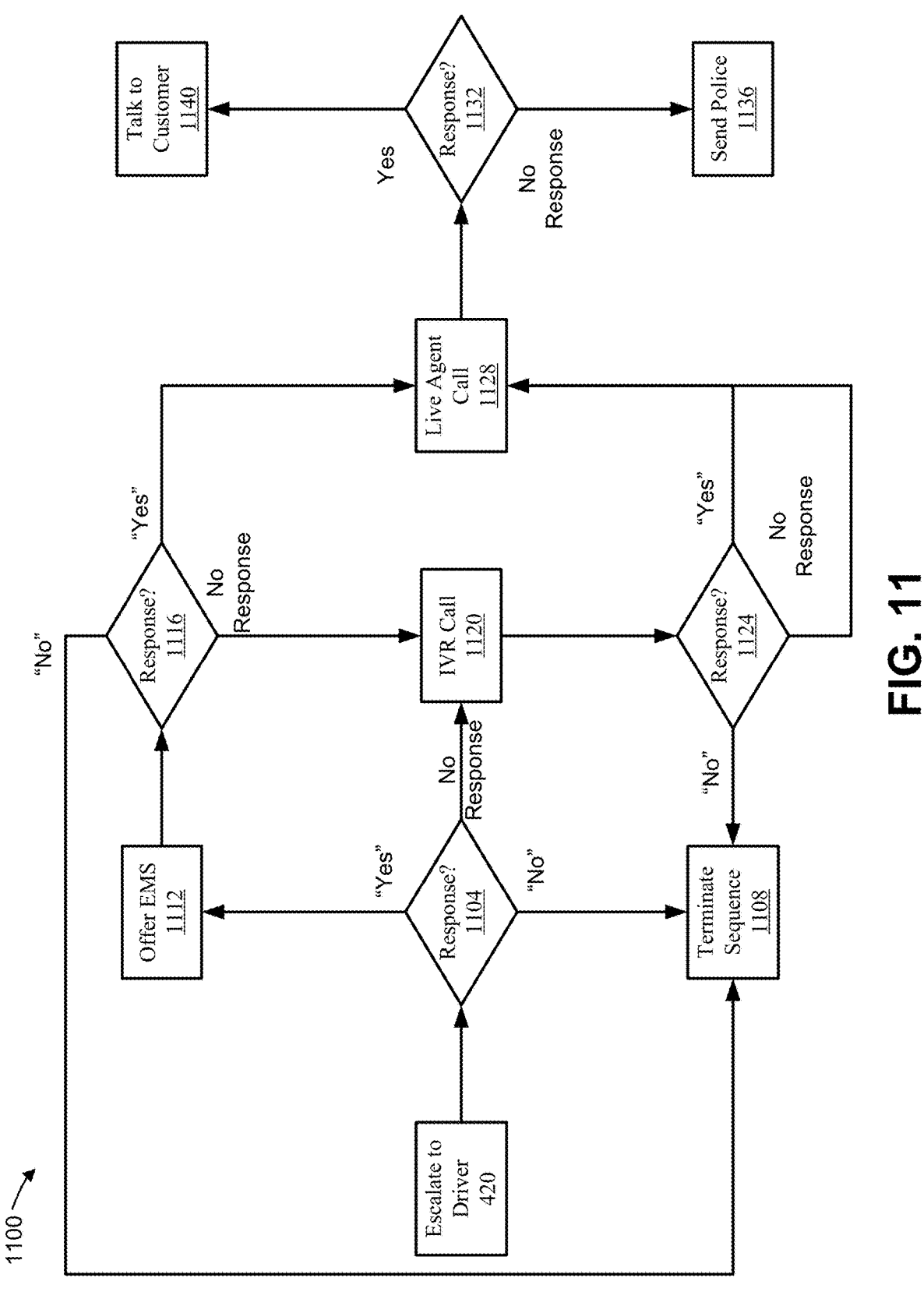
FIG. 11 illustrates a decision tree representing an exemplary crash service action sequence according to some aspects of the present disclosure.

FIG. 11 illustrates a decision tree 1100 representing an exemplary crash service action sequence according to some aspects of the present disclosure. Decision tree 1100 illustrates the predefined order of actions executed in an escalation action sequence, including the logic applied after each action to determine the next action to perform in the escalation action sequence. As further described above, the predefined order of the escalation action sequence illustrated by decision tree 1100 may be defined for a certain crash severity. For example, decision tree 1100 may be representative of an escalation action sequence used for possible crash events identified as having a high severity.

Decision tree 1100 may begin at action block 420, as described above in reference to decision tree 400. For example, after detecting a possible crash event, determining that the vehicle remained stationary for a first predefined duration after the crash event, and/or determining that a crash classification meets a first predefined classification threshold, an escalation action sequence may be initiated, beginning with an initial action in which the possible crash event is escalated to the driver or user of the computing device to confirm or deny the occurrence of a vehicle accident (e.g., via a push or SMS notification). As further described above, the initial escalation to the user may allow the user to provide additional information about the accident and/or request specific crash services.

At decision block 1104, the response to the initial escalation may be evaluated to determine the next action for execution. For example, in response to a denial (e.g., "No") of the first crash classification, the escalation action sequence may be terminated at action block 1108. Alternatively, in response to a confirmation (e.g., a "Yes") of the first crash classification from the user, the computing device may proceed to gather additional information from the user and offer EMS or other crash related services at action block 1112. For example, as described above in relation to FIGS. 7A-7E, the computing device may immediately display an option for the user to request EMS. Further still, absent any input from the user, (e.g., "No Response"), one or more automated IVR calls may be executed at action block 1120. As described above, the one or more automated IVR calls may be executed after a predefined amount of time has elapsed since the initial escalation to the user was performed, such as after 60 seconds, 90 seconds, 180 seconds, or a similarly suitable length of time designed to provide the user with enough time to response while minimizing the delay in crash service provisioning.

At decision block 1116, after receiving confirmation of the vehicle accident and offering EMS or other services to the user, the response may again be evaluated. In response to an indication from the user that no additional crash services are required, the escalation action sequence may be terminated at action block 1108. Alternatively, if the user is non-responsive at this point, one or more automated IVR calls may be initiated at action block 1120. If, on the other hand, the user requests additional crash services, the requested services may be immediately provisioned to the driver and/or a live agent call may be initiated at action block 1128 to gather additional information from the user in order to provision the appropriate crash services to the user.

At decision block 1124, after performing the one or more automated IVR calls, the results of the IVR calls may be evaluated. In response to a subsequent denial of the crash event, or rescinded request for particular crash services, the escalation action sequence may be terminated at action block 1108. Alternatively, if the user confirms that a vehicle accident occurred, affirms their previous request for additional crash services, or is unresponsive to the one or more IVR calls, a live agent call may be initiated at action block 1128 in a final attempt to remotely contact the user and/or gather additional information from the user in order to provision the appropriate crash services to the user.

At decision block 1132, the results of the live agent call may be evaluated. For example, in the event that the user answers the live agent call, a live agent will talk to the customer to collect additional information about the detected or confirmed vehicle accident, assess the appropriate level of crash services to provide, and begin provisioning the appropriate crash services to the user. Alternatively, in the event the user does not answer the live agent call, police or other third-party emergency services may be dispatched to the user to perform an in-person wellness check at action block 1136. In some embodiments, the location of the computing device at the time of the detected crash event may be used as the location to which the police or third-party emergency services are dispatched.

Figure 12:
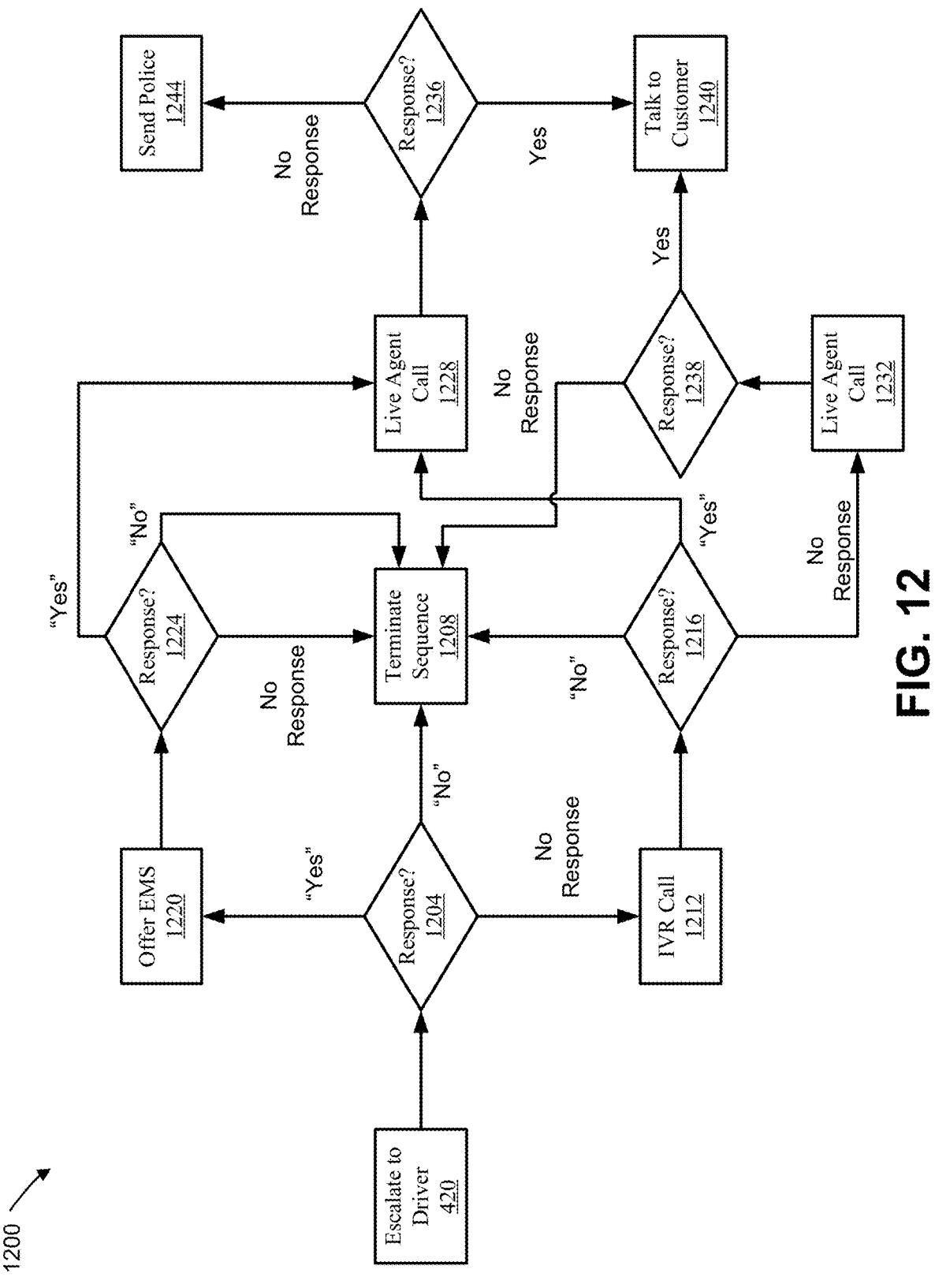
FIG. 12 illustrates a decision tree representing another exemplary crash service action sequence according to some aspects of the present disclosure.

FIG. 12 illustrates a decision tree 1200 representing another exemplary crash service action sequence according to some aspects of the present disclosure. Decision tree 1200 illustrates the predefined order of actions executed in an escalation action sequence, including the logic applied after each action to determine the next action to perform in the escalation action sequence. As further described above, the predefined order of the escalation action sequence illustrated by decision tree 1200 may be defined for a certain crash severity. For example, decision tree 1200 may be representative of an escalation action sequence used for possible crash events identified as having a medium severity.

Decision tree 1200 may begin at action block 420, as described above in reference to decision tree 400. For example, after detecting a possible crash event, determining that the vehicle remained stationary for a first predefined duration after the crash event, and/or determining that a crash classification meets a first predefined classification threshold, an escalation action sequence may be initiated, beginning with an initial action in which the possible crash event is escalated to the driver or user of the computing device to confirm or deny the occurrence of a vehicle accident (e.g., via a push or SMS notification). As further described above, the initial escalation to the user may allow the user to provide additional information about the accident and/or request specific crash services.

At decision block 1204, the response to the initial escalation may be evaluated to determine the next action for execution. For example, in response to a denial (e.g., "No") of the first crash classification, the escalation action sequence may be terminated at action block 1208. Alternatively, in response to a confirmation (e.g., a "Yes") of the first crash classification from the user, the computing device may proceed to gather additional information from the user and offer EMS or other crash related services at action block 1220. For example, as described above in relation to FIGS. 7A-7E, the computing device may immediately display an option for the user to request EMS. Further still, absent any input from the user, (e.g., "No Response"), one or more automated IVR calls may be executed at action block 1212. As described above, the one or more automated IVR calls may be executed after a predefined amount of time has elapsed since the initial escalation to the user was performed, such as after 60 seconds, 90 seconds, 180 seconds, or a similarly suitable length of time designed to provide the user with enough time to response while minimizing the delay in crash service provisioning.

At decision block 1224, after receiving confirmation of the vehicle accident and offering EMS or other services to the user, the subsequent response may be evaluated. In response to an indication from the user that no additional crash services are required and/or if the user does not provide a response, the escalation action sequence may be terminated at action block 1208. If, on the other hand, the user requests additional crash services, the requested services may be immediately provisioned to the driver and/or a live agent call may be initiated at action block 1228 to gather additional information from the user in order to provision the appropriate crash services to the user.

At decision block 1216, after performing the one or more automated IVR calls, the results of the IVR calls may be evaluated. In response to a subsequent denial of the crash event, the escalation action sequence may be terminated at action block 1208. Alternatively, if the user confirms that a vehicle accident occurred and/or affirms their previous request for additional crash services, a live agent call may be initiated at action block 1228. In the event that the user is unresponsive to the one or more IVR calls, a live agent call may still be performed at action block 1232, however as illustrated, the results of the live agent call performed at action block 1228 may differ from the results of the live agent call performed at block 1232.

For example, at decision block 1236, after a request for crash services and/or confirmation of the occurrence of a vehicle accident, a lack of response to the live agent call performed at action block 1228 may result in police or other third-party services being dispatched to perform an in person wellness check. On the other hand, at decision block 1238, no response to the live agent call performed at action block 1232 may result in no further action and/or the escalation action sequence being terminated at action block 1208. In both cases, a response to the live agent call may result in a live agent talking to the customer to collect additional information about the detected or confirmed vehicle accident, assess the appropriate level of crash services to provide, and begin provisioning the appropriate crash services to the user.

Figure 13A:
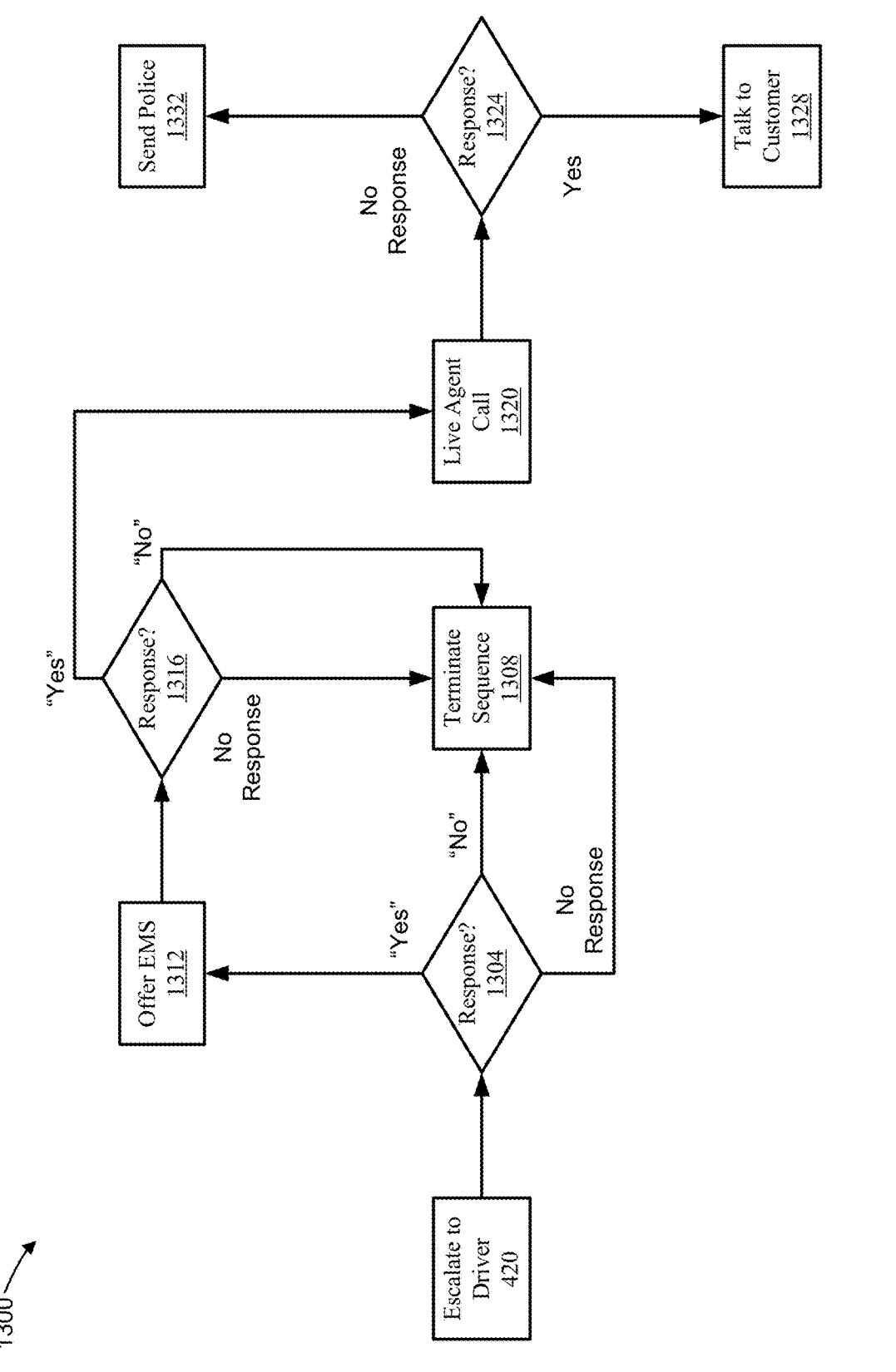
FIG. 13A illustrates a decision tree representing another exemplary crash service action sequence according to some aspects of the present disclosure.

FIG. 13A illustrates a decision tree 1300 representing another exemplary crash service action sequence according to some aspects of the present disclosure. Decision tree 1300 illustrates the predefined order of actions executed in an escalation action sequence, including the logic applied after each action to determine the next action to perform in the escalation action sequence. As further described above, the predefined order of the escalation action sequence illustrated by decision tree 1300 may be defined for a certain crash severity. For example, decision tree 1300 may be representative of an escalation action sequence used for possible crash events identified as having a low severity.

Decision tree 1300 may begin at action block 420, as described above in reference to decision tree 400. For example, after detecting a possible crash event, determining that the vehicle remained stationary for a first predefined duration after the crash event, and/or determining that a crash classification meets a first predefined classification threshold, an escalation action sequence may be initiated, beginning with an initial action in which the possible crash event is escalated to the driver or user of the computing device to confirm or deny the occurrence of a vehicle accident (e.g., via a push or SMS notification). As further described above, the initial escalation to the user may allow the user to provide additional information about the accident and/or request specific crash services.

At decision block 1304, the response to the initial escalation may be evaluated to determine the next action for execution. For example, in response to a denial (e.g., "No") of the first crash classification, or absent any input from the user, (e.g., "No Response"), the escalation action sequence may be terminated at action block 1308. Alternatively, in response to a confirmation (e.g., a "Yes") of the first crash classification from the user, an application executing on the computing device may proceed to gather additional information from the user and offer EMS or other crash related services at action block 1312. For example, as described above in relation to FIGS. 7A-7E, the computing device may immediately display an option for the user to request EMS.

Figure 13B:
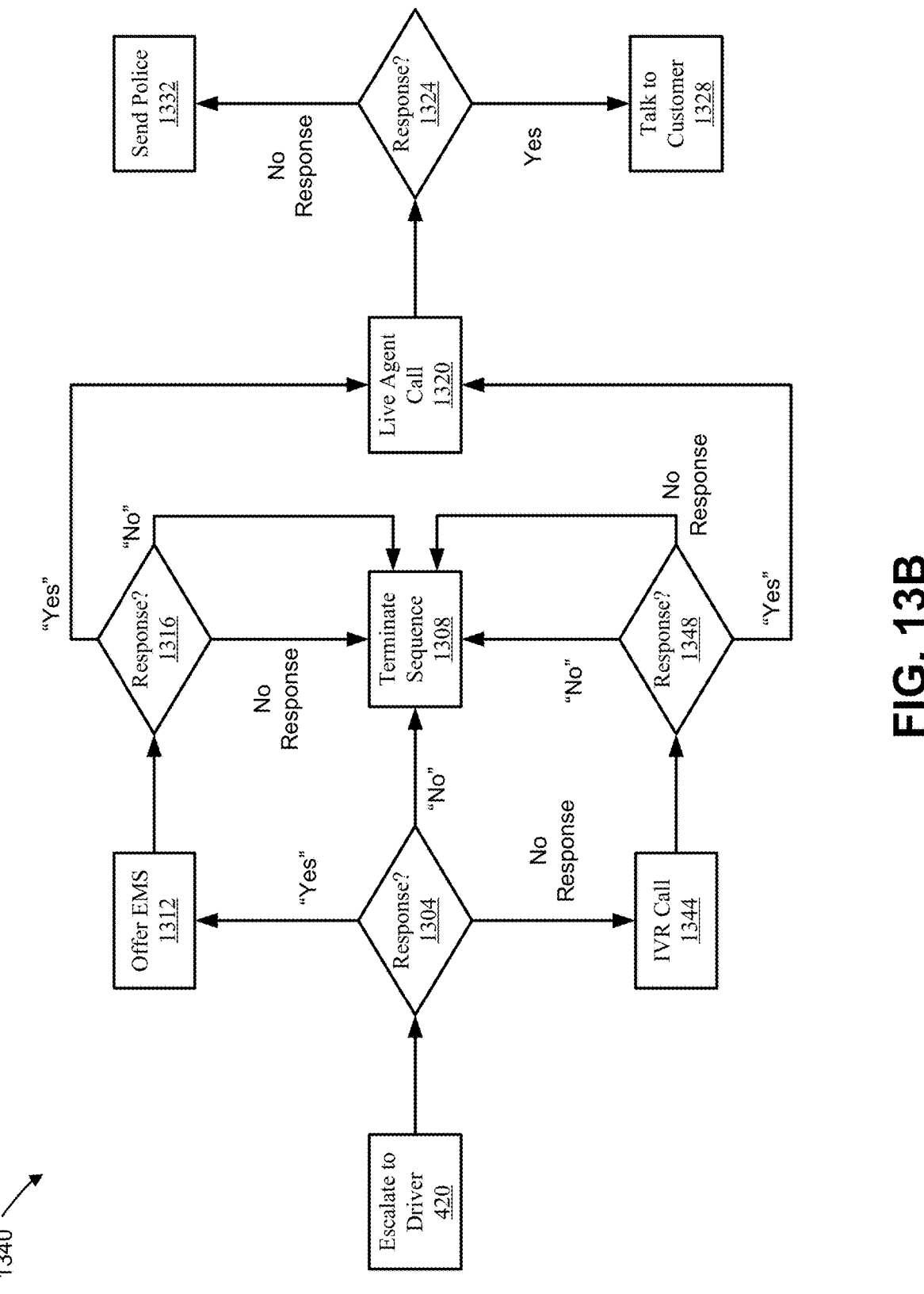
FIG. 13B illustrates a decision tree representing another exemplary crash service action sequence according to some aspects of the present disclosure.

Additionally, or alternatively, an absence of input from the user (e.g., "No Response") may result in one or more automated IVR calls. FIG. 13B illustrates decision tree 1340 as a variation of decision tree 1300. As illustrated, an absence of input from the user (e.g., "No Response") may result in one or more automated IVR calls being executed at action block 1344. As described above, the one or more automated IVR calls may be executed after a predefined amount of time has elapsed since the initial escalation to the user was performed, such as after 60 seconds, 90 seconds, 180 seconds, or a similarly suitable length of time designed to provide the user with enough time to respond while minimizing the delay in crash service provisioning.

At decision block 1348, after performing the one or more automated IVR calls, the results of the IVR calls may be evaluated. In response to a subsequent denial of the crash event during an IVR call, or in the event that the user is unresponsive to the one or more IVR calls, the escalation action sequence may be terminated at action block 1308. Alternatively, if the user confirms that a vehicle accident occurred and/or affirms their previous request for additional crash services, a live agent call may be initiated at action block 1320.

At decision block 1316 in either of decision tree 1300 or decision tree 1340, after receiving confirmation of the vehicle accident and offering EMS or other services to the user via an application executing on the computing device, the subsequent responses may be evaluated. In response to an indication from the user that no additional crash services are required and/or if the user does not provide a response, the escalation action sequence may be terminated at action block 1308. If, on the other hand, the user requests additional crash services, the requested services may be immediately provisioned to the driver and/or a live agent call may be initiated at action block 1320 to gather additional information from the user in order to provision the appropriate crash services to the user.

At decision block 1324, the results of the live agent call may be evaluated. For example, in the event that the user answers the live agent call, a live agent will talk to the customer to collect additional information about the detected or confirmed vehicle accident, assess the appropriate level of crash services to provide, and begin provisioning the appropriate crash services to the user at action block 1328. Alternatively, in the event the user does not answer the live agent call, police or other third-party emergency services may be dispatched to the user to perform an in-person wellness check at action block 1332. In some embodiments, the location of the computing device at the time of the detected crash event may be used as the location to which the police or third-party emergency services are dispatched.

Example Techniques for Vehicle Speed Estimation

Figure 14:
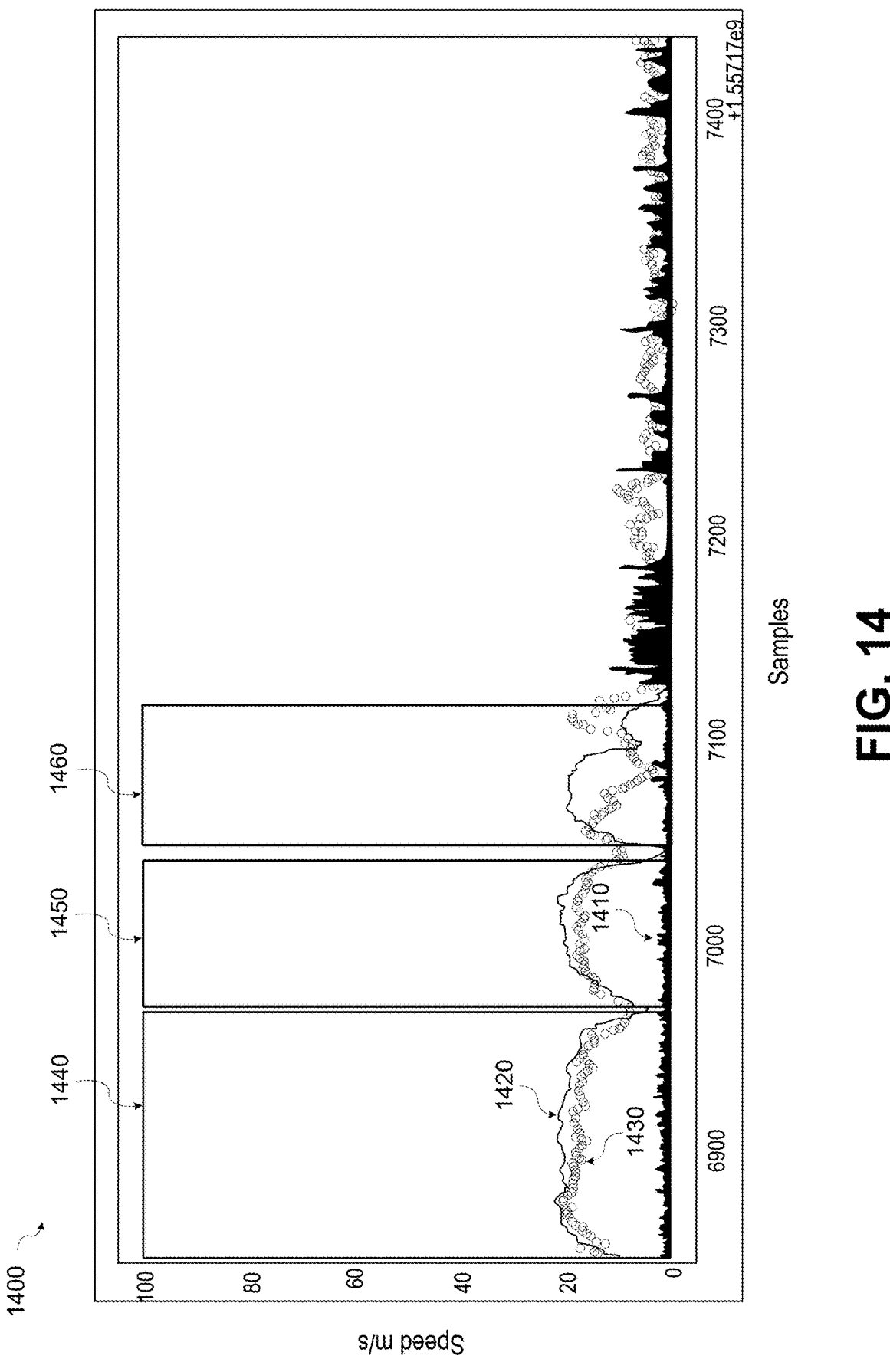
FIG. 14 is a plot illustrating an example of vehicle speed prediction by a classifier using features extracted from IMU signals sampled at 9 Hz according to various aspects of the present disclosure.

FIG. 14 is a plot 1400 illustrating an example of vehicle speed prediction by a classifier using features extracted from IMU signals sampled at 9 Hz according to aspects of the present disclosure. The vehicle speed prediction outputs can support the operations of missing route determination engine 234. FIG. 14 shows accelerometer data 1410 using user acceleration (i.e., with the gravity component of acceleration removed) and GPS vehicle speed data 1420 for a trip, as well as predicted vehicle speed 1430 generated by the classifier. The IMU signals, in particular accelerometer and gyroscope (not shown) signals, were sampled at a sampling rate of 9 Hz, and forward-backward bandpass filtered with an IIR filter using 14 equally spaced frequency bands from 0.2 Hz to 4.5 Hz. The statistical feature (e.g., median, variance, and maximum values) were extracted from the filtered signals over three window sizes (20 seconds 1440, 10 seconds 1450, 5 seconds 1460) and input to the classifier. As can be seen in FIG. 14, the predicted vehicle speed 1430 generated by the classifier approximates the GPS vehicle speed data 1420.

Figure 15:
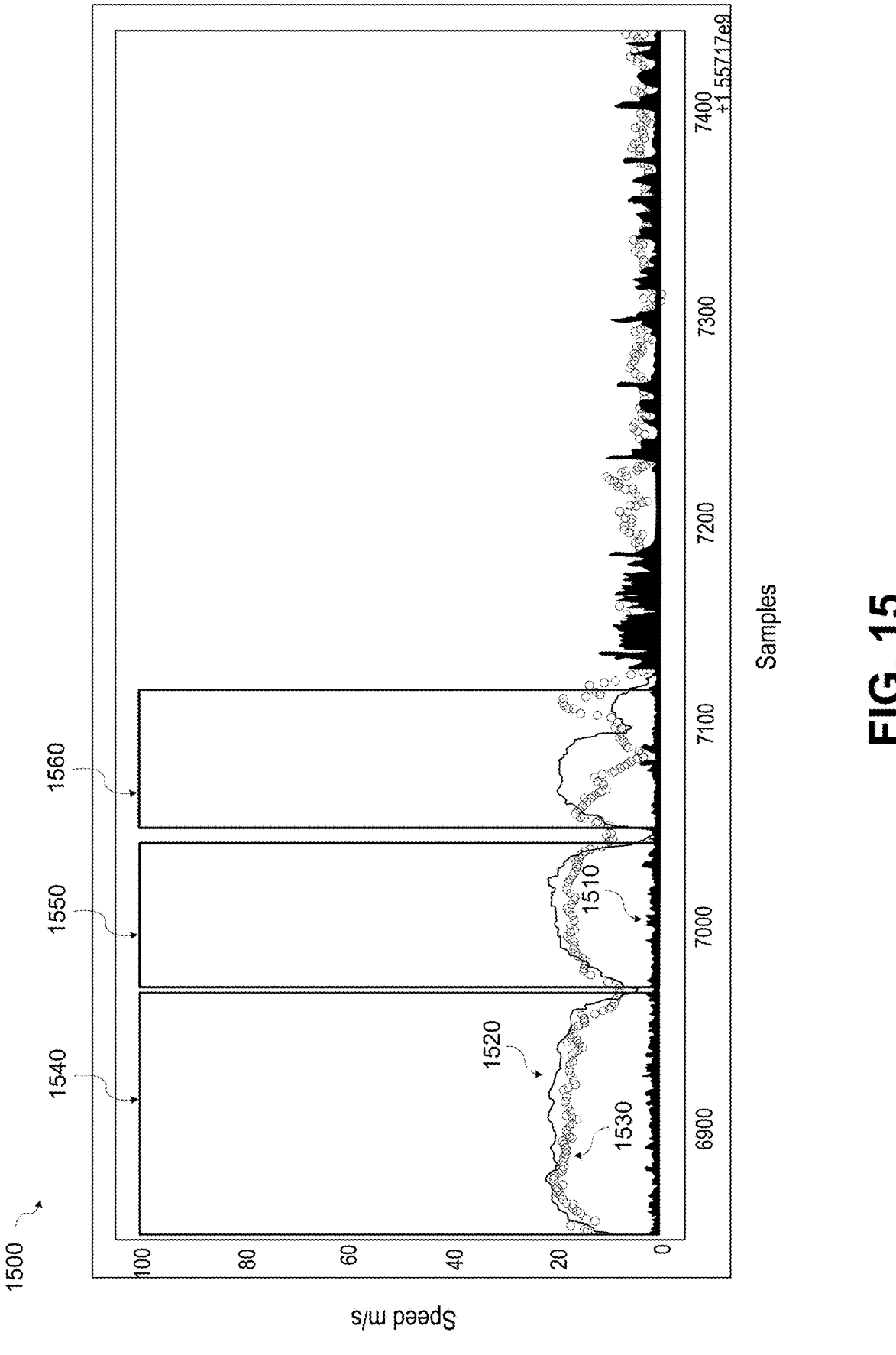
FIGS. 15 and 16 are plots illustrating examples of vehicle speed prediction by a classifier using features extracted from IMU signals sampled at 30 Hz according to aspects of the present disclosure.
Figure 16:
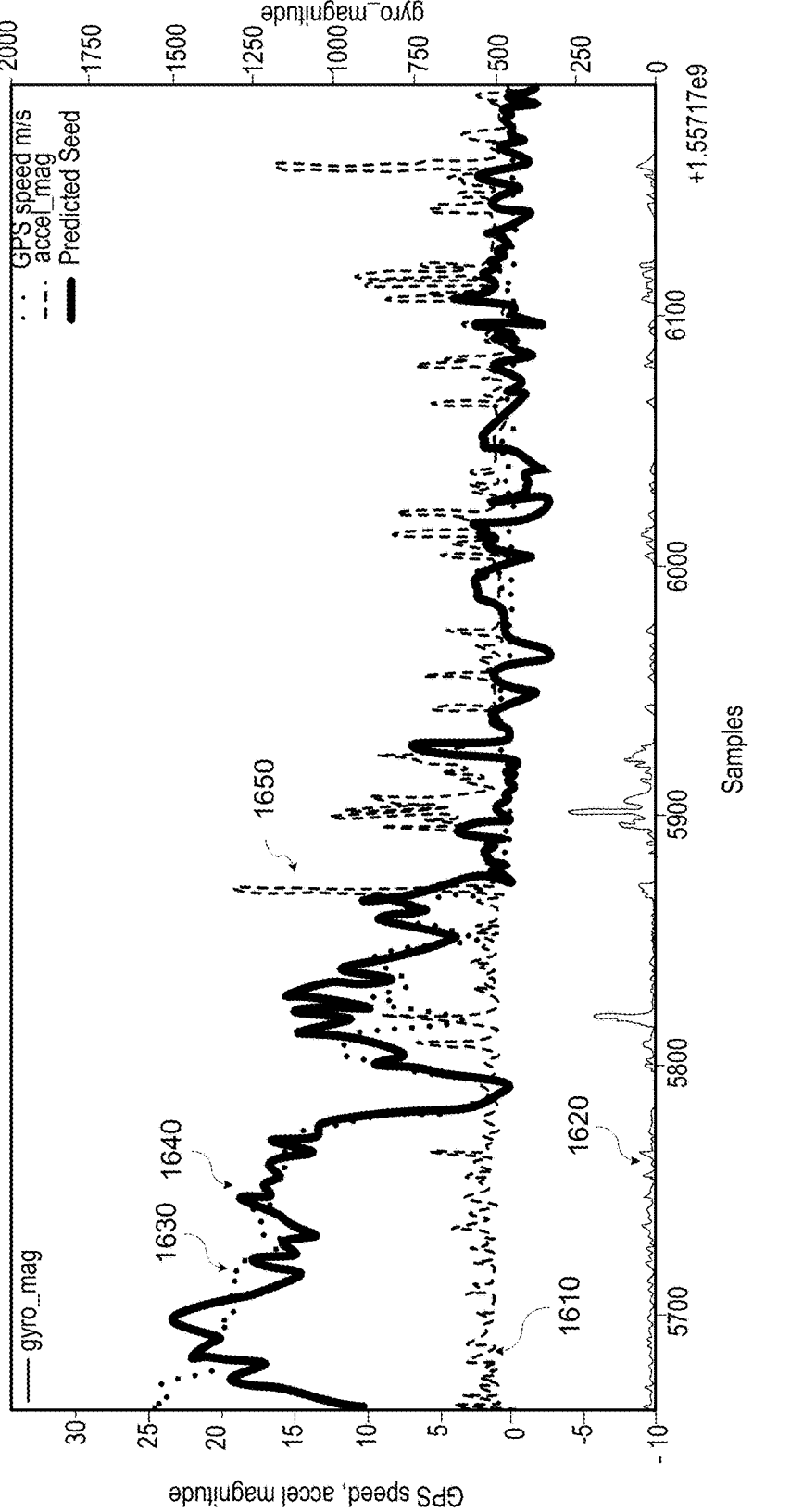

FIGS. 15 and 16 are plots 1500, 1600 illustrating examples of vehicle speed prediction by a classifier using features extracted from IMU signals sampled at 30 Hz according to aspects of the present disclosure. FIG. 15 shows accelerometer data 1510 using user acceleration (i.e., with the gravity component of acceleration removed), gyroscope data 1220, and GPS vehicle speed data 1530 for a trip, as well as predicted vehicle speed 1540 generated by the classifier. FIG. 16 similarly shows accelerometer data 1610 using user acceleration (i.e., with the gravity component of acceleration removed), gyroscope data 1620, and GPS vehicle speed data 1630 for a trip, as well as predicted vehicle speed 1640 generated by the classifier.

IMU signals, in particular accelerometer and gyroscope signals, were sampled at a sampling rate of 30 Hz, and forward-backward bandpass filtered with an IIR filter using 28 equally spaced frequency bands from 0.2 Hz to 14.8 Hz. The statistical features (e.g., median, variance, and maximum values) were extracted from the filtered signals over three window sizes (20 1540 seconds, 10 seconds 1550, 5 seconds 1560) and input to the classifier. FIGS. 15 and 16 illustrate that a closer prediction of vehicle speed may be obtained when the IMU data is sampled at a higher sampling rate. Further, as can be seen in FIG. 15, the accelerometer signal 1510 has a magnitude value exceeding a threshold value of about 10 m/s². Accordingly, filtering of the IMU sensor signals may be performed on the portions of the IMU signal up to, for example within two to five seconds or another time range, of the signal magnitude value exceeding the threshold value, but not including the signal magnitude value exceeding the threshold value or subsequent values of the signals.

Similarly, FIG. 16 illustrates the accelerometer signal 1610 having a magnitude value 1650 exceeding a threshold value of about 10 m/s². Thus, in FIGS. 15 and 16, only the portions of the IMU signals up to, but not including, the signal magnitude values exceeding the threshold value may be filtered using the IIR filter.

FIG. 17 is a flowchart illustrating an example of a method 1700 for estimating vehicle speed according to aspects of the present disclosure. At block 1710, it is determined that the mobile device is in a vehicle. For example, an accelerometer signal may be analyzed to determine a last signal pattern consistent with a user walking prior to a first accelerometer signal pattern consistent with movement of the vehicle.

At block 1720, the sensors of the mobile device may be operated to obtain movement measurements. For example, the mobile device may include an IMU having, among other things, an accelerometer, a gyroscope, and a magnetometer. One or more of the IMU sensors (e.g., the accelerometer, the gyroscope, and the magnetometer) may be operated during a drive to obtain movement measurements while the GPS receiver is inactive.

At block 1730, movement measurement signals may be received. The processor of the mobile device may receive the signals corresponding to the movement measurement from one or more of the accelerometer, the gyroscope, and the magnetometer of the IMU.

At block 1740, it may be determined whether the value of one or more of the received signals exceeds a threshold value. In response to determining that one or more of the received signals exceeds a threshold value (2340—Y), at block 1750, it may be determined to exclude that portion of received signals from subsequent filtering. The processor of the mobile device may determine to exclude a portion of the received signals within a specified time period around the portion of the received signals exceeding the threshold value from subsequent filtering. The processor may cause a portion of the received signals up to the specified time to be filtered such that the portion of the one or more of the received signals that exceeds the threshold value is excluded from subsequent filtering. For example, the processor may determine to exclude portions of the received signals for 0.5 seconds or another time period before and after the time that the one or more of the received signals exceeds the threshold value. The time period may be determined at least in part on the sampling frequency, with a shorter time period being applied for a higher sampling frequency.

In some implementations, only the portion of the one or more signals preceding the time period may subsequently be filtered. In some implementations, both the portion of the one or more signals preceding the time period and the portion of the one or more signals following the time period may subsequently be filtered, effectively excluding the portion of the received signals exceeding the threshold value. The process may continue at block 1760.

In response to determining that one or more of the received signals do not exceed a threshold value (2340—N) at block 1760 the signals may be filtered.

At block 1760, the signals may be bandpass filtered with an IIR filter using a forward-backward filtering process. The forward-backward IIR filtering filters the IMU signals normally (i.e., forward filtering), and the forward filtered signals are then "flipped" in time and filtered again with the IIR filter (i.e., backward filtering) producing a squared amplitude response. The IIR filters can better isolate the signals of interest and minimize or eliminate nonlinear phase distortion of the signals. The IIR filters are applied recursively, meaning that the result of the last step of the filter algorithm is applied to the next step. IIR filters are also advantageous, because they can isolate frequency ranges of interest with greater signal amplitude attenuation outside of a range of interest. The digital bandpass filters can be designed to isolate the amount of vibration occurring within specific frequency ranges of interest. In some implementations, a finite impulse response (FIR) filter, rather than an IIR filter, may be used for bandpass filtering of the IMU signals.

At block 1770, features may be extracted from the filtered signals. Features, for example statistical features, may be extracted from some or all of the filtered signals. The features may be extracted from time windows of different lengths. In some implementations, each of the statistical features may be extracted from the IMU signals over a 5-second time window, a 10-second time window, and a 20-second time window. The different length windows may provide levels of stability for the feature values, with longer window times producing more stable feature values. Other window lengths or a different number of windows may be used without departing from the scope of the invention. For a bandpass filtered accelerometer signal between 0.2 Hz to 1.1 Hz, nine features may be extracted, e.g., median, variance, and maximum, with each feature extracted over a 5-second time window, a 10-second time window, and a 20-second time window.

At block 1780, a classifier may be executed to predict vehicle speed. The features extracted from the filtered IMU signals may be input to the classifier, for example, an xgboost classifier. The extracted features maybe, for example, median, variance, and maximum values. Using the extracted features from the filtered IMU signals, the classifier may predict the speed of the vehicle. The vehicle speed prediction by the classifier may be quantized, for example, in increments of 5 m/s or another increment. In some implementations, the orientation of the mobile device with respect to gravity may also be determined and input to the classifier.

While not illustrated, the resulting speed of the vehicle estimated in method 1700 may be used in other embodiments described herein to detect, confirm, and/or contradict possible crash events. For example, method 1700 may be performed after detecting a possible crash event using sensor measurements collected during a predefined duration following the possible crash event to determine whether the vehicle continued driving at any point after the crash event, indicating that the crash event was unlikely to have been detected as a result of an actual vehicle accident, or if the vehicle remained stationary during the predefined duration, indicating that a vehicle accident is more likely the cause of the detected crash event. Additionally, or alternatively, the estimated speed of the vehicle at different points leading up to and/or after the detection of a possible crash event may be used to generate one or more crash classifications.

In some implementations, the method of FIG. 17 may be used with only the accelerometer signal. For example, while the processor may receive signals from the various IMU sensors (e.g., the accelerometer, the gyroscope, and the magnetometer), only the accelerometer signals may be further processed for predicting vehicle speed. The movement measurement signals from the accelerometer may be sampled at a specified sampling rate to obtain digital signals. A digital bandpass filter, for example, an infinite impulse response (IIR) filter, may be used to filter the accelerometer signals to isolate frequencies indicative of various vehicle activities and to remove signal magnitude values exceeding a specified threshold. Portions of the accelerometer signals having magnitude values exceeding the specified threshold may be excluded from further bandpass filtering. The digital bandpass filters can be designed to isolate the amount of vibration (i.e., frequencies) occurring within specific frequency ranges of interest.

The IIR filtering process may employ forward-backward filtering in which the portions of the accelerometer signals are filtered normally (i.e., forward filtering), and the forward filtered signals are "flipped" in time and filtered again with the IIR filter (i.e., backward filtering) producing a squared amplitude response. Features, for example statistical features, may be extracted from the filtered accelerometer signals and provided as input to the classifier to predict vehicle speed.

In some implementations, the acceleration measurements used in the prediction of vehicle speed may be user acceleration measurements. User acceleration measurements are defined as acceleration measurements for which the gravity component of acceleration has been removed. In some implementations, the acceleration measurements used in the prediction of vehicle speed may be raw acceleration measurements. Raw acceleration measurements are defined as acceleration measurements that include the gravity component.

Figure 18:
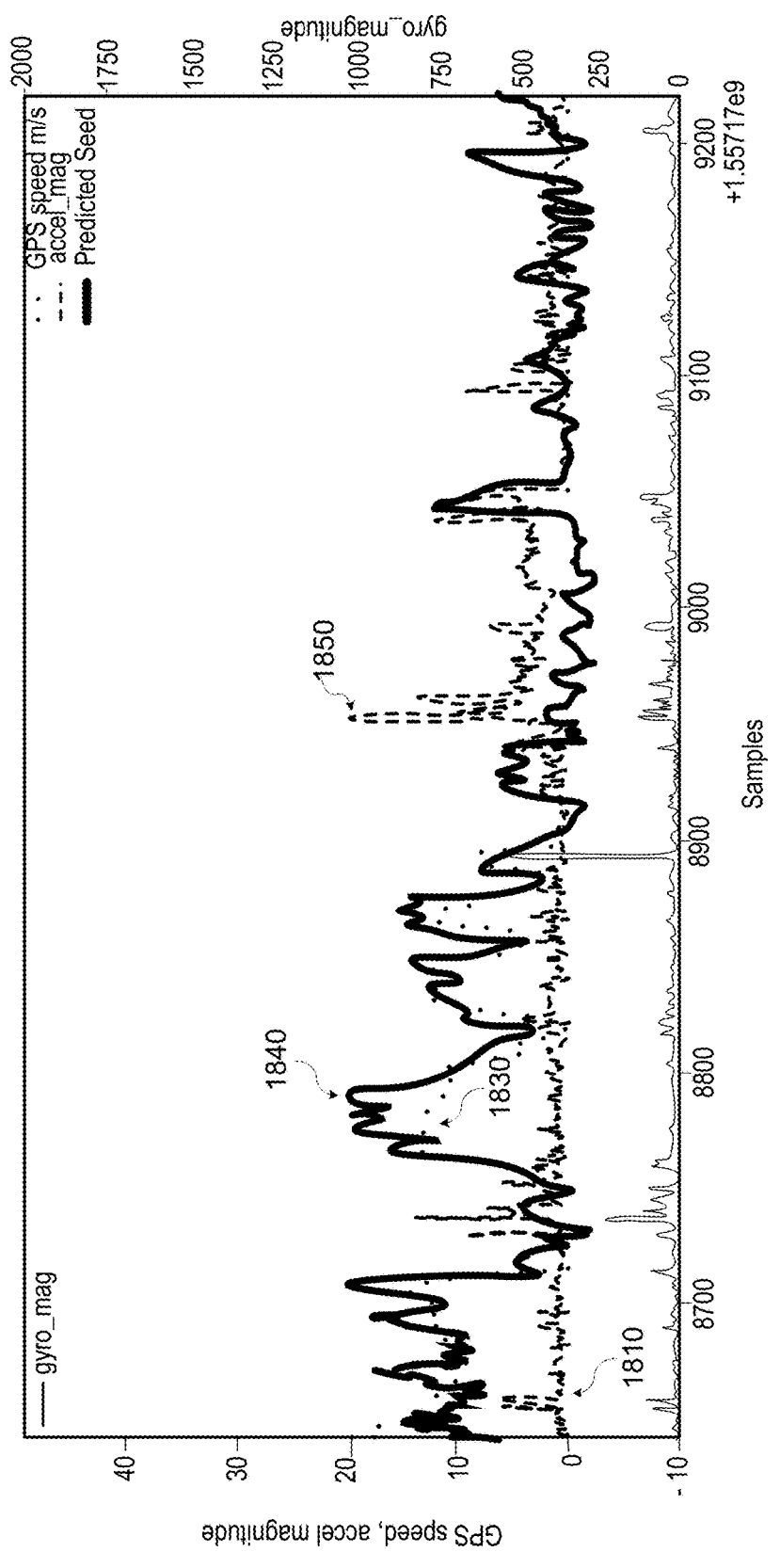
FIGS. 18 and 19 are plots illustrating examples of vehicle speed prediction by a classifier using features extracted from accelerometer signals sampled at 30 Hz according to aspects of the present disclosure.
Figure 19:
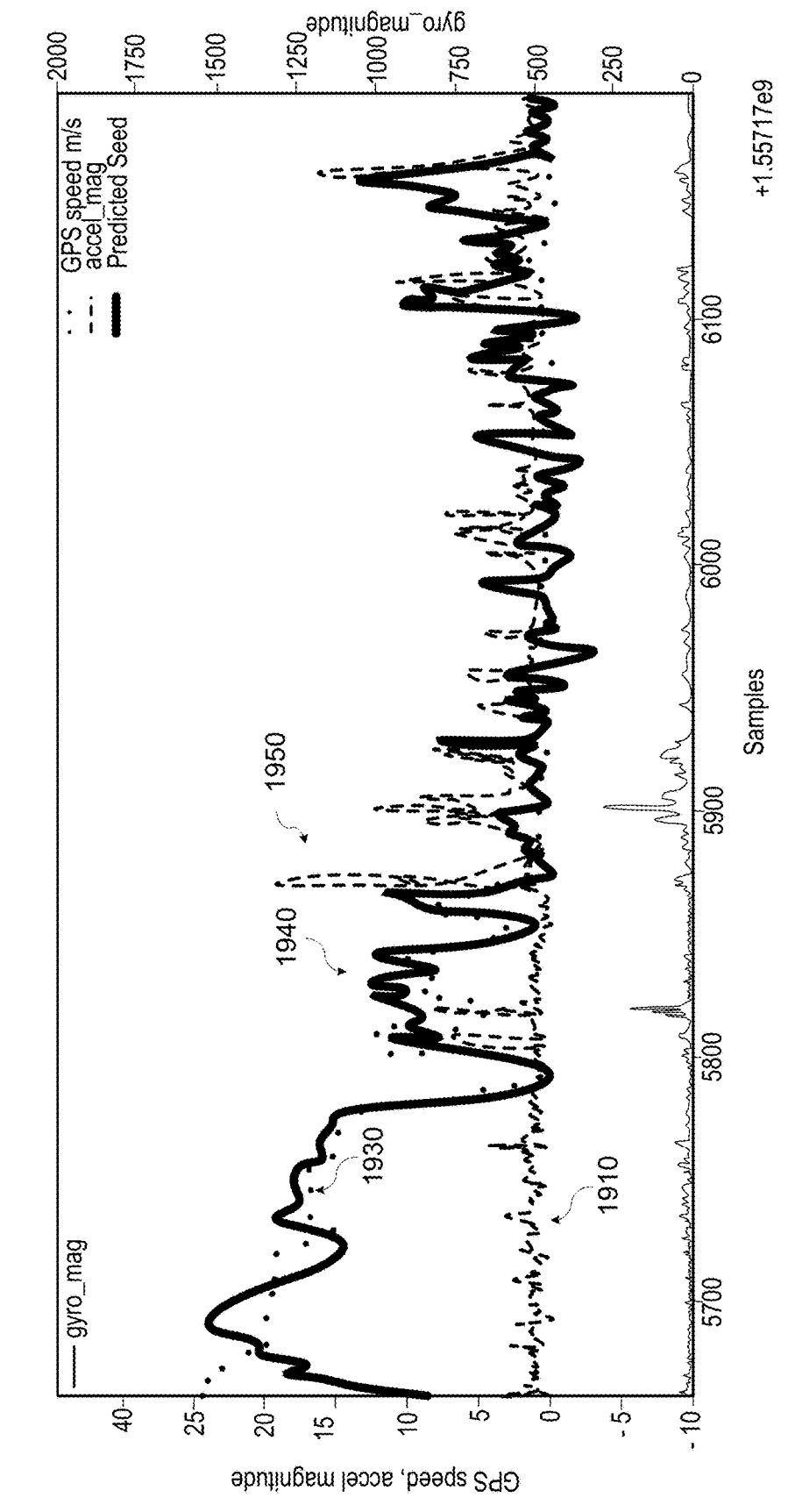

FIGS. 18 and 19 are plots 1800, 1900 illustrating examples of vehicle speed prediction by a classifier using features extracted from accelerometer signals sampled at 30 Hz according to aspects of the present disclosure. FIG. 18 shows accelerometer data 1810 using user acceleration (i.e., with the gravity component of acceleration removed), and GPS vehicle speed data 1830 for a trip, as well as predicted vehicle speed 1840 generated by the classifier. Similarly, FIG. 19 shows accelerometer data 1910 using user acceleration (i.e., with the gravity component of acceleration removed), and GPS vehicle speed data 1930 for a trip, as well as predicted vehicle speed 1940 generated by the classifier.

The accelerometer signals were sampled at a sampling rate of 30 Hz, and forward-backward bandpass were filtered with an IIR filter. The statistical features (e.g., median, variance, and maximum values) were extracted from the filtered signals and input to the classifier. As can be FIG. 18, the accelerometer signal 1810 has a magnitude value 1850 exceeding a threshold value of about 10 m/s². Accordingly, filtering of the accelerometer signal may be performed on the portion of the accelerometer signal up to, for example, within a fraction of a second of the signal magnitude value exceeding the threshold value, but not including the signal magnitude value exceeding the threshold value or subsequent values of the signals. Similarly, FIG. 19 illustrates the accelerometer signal 1910 having a magnitude value 1950 exceeding a threshold value of about 10 m/s². Thus, in FIGS. 18 and 19, only the portions of the accelerometer signals up to, but not including, the signal magnitude values exceeding the threshold value may be filtered using the IIR filter.

It should be appreciated that the specific operations illustrated in FIG. 17 provide a particular method for estimating vehicle speed according to an embodiment of the present invention. Other sequences of operations may also be performed according to alternative embodiments. For example, alternative embodiments may perform the operations outlined above in a different order. Moreover, the individual operations illustrated in FIG. 17 may include multiple sub-operations that may be performed in various sequences as appropriate to the individual operations. Furthermore, additional operations may be added or removed depending on the particular applications. One of ordinary skill in the art would recognize many variations, modifications, and alternatives.

The methods of FIG. 17 may be embodied on a non-transitory computer readable medium known to those of skill in the art, having stored therein a program including computer executable instructions for making a processor, computer, or other programmable device execute the operations of the methods.

In some implementations, the mobile device may be aligned to the vehicle to predict longitudinal acceleration by methods similar to the method of FIG. 17. In some implementations, other features, such as the median, variance, maximum of the velocity change derived through integrating accelerometer data and the median, variance, and maximum of the derivative of acceleration (also known as jerk), may be extracted from the bandpass filtered data and included as input to the classifier to predict vehicle speed as well as other vehicle movement characteristics. In some implementations, distance may be estimated by integrating the vehicle speed predicted by the classifier. FIG. 20 is a cluster plot 2000 showing distance estimated by the classifier 2010 compared to distance 2020 measured by GPS according to aspects of the present disclosure.

According to some aspects of the present disclosure, vehicle mileage may be calculated from IMU sensor data collected in the background. Accelerometer data may be collected in the background during a trip in the vehicle. The accelerometer data may be down sampled to a frequency lower than the sampling frequency, for example 9 Hz or another frequency, and the magnitude of the down sampled signal calculated (e.g., by the processor of the mobile device).

The down sampled signal magnitudes may be segmented into fixed size time windows, and input to a machine learning model (e.g., a classifier) to predict the distance traveled for each segment. The predicted distance traveled for each segment may be combined to determine a predicted distance traveled for the trip.

In some implementations, the predicted distance traveled (i.e., mileage) may be accumulated for all vehicle trips during a specified time period, for example, one year or another time period, to determine the total mileage traveled during that time period.

Vehicle speed estimation based on IMU signals and acceleration only signals can have applications for areas such as driving data collection, transportation mode analysis, and crash prediction, as well as other areas.

In some embodiments, vehicle crashes may be predicted based only on signals generated by the IMU. Crash detection based only on the IMU signals provides an advantage over GPS-based crash detection at least in that the IMU consumes less mobile device power than a GPS receiver. For example, IMU data can be collected in the background any time the mobile device is operational. In addition, the sampling frequency for the IMU sensors may be controlled based on detected sensor activity. For example, a low sampling frequency used during steady state conditions may be increased when sudden changes acceleration or changes in direction are sensed. Obtaining GPS data, on the other hand, requires launching and running a GPS application on the mobile device which consumes additional power.

According to aspects of the present disclosure, information normally obtained from GPS data may be inferred from IMU data. For example, using the IMU data it may be determined whether a vehicle has been stopped for a specified period of time long enough to qualify as an event that a GPS measurement would identify as the vehicle being stopped for that amount of time.

Figure 21:
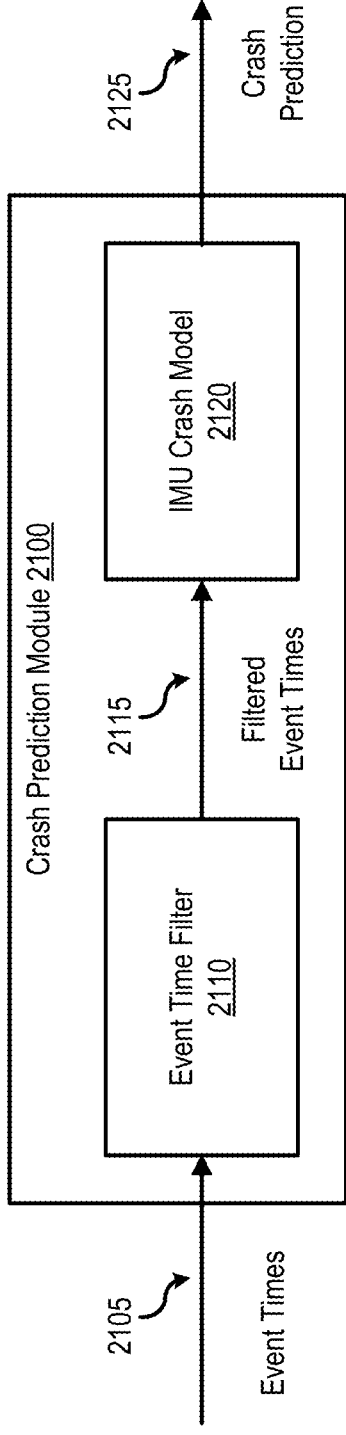
FIG. 21 is a block diagram illustrating an example of a crash prediction module according to aspects of the present disclosure.

FIG. 21 is a block diagram illustrating an example of a crash prediction module 2100 according to aspects of the present disclosure. Referring to FIG. 21, the crash prediction module 2100 may include an event time filter 2110 and an IMU crash model 2120. Both the event time filter 2110 and the IMU crash model 2120 may be machine learning models. The event time filter 2110 may be trained using IMU sensor data to identify event times that may have a higher likelihood (e.g., as determined from historical data) of indicating a crash than neighboring times.

Data from all the times recorded by the IMU sensors may be received by the crash prediction module 2100 as event times 2105. The event times 2105 may include IMU sensor data acquired during specified time windows. The event time filter 2110 may identify candidate event times. For example, the event time filter 2110 may identify candidate event times as time windows including accelerometer data exceeding a threshold magnitude (e.g., 10 m/s² or another magnitude).

These candidate event times may have a higher likelihood than neighboring times of indicating a crash.

The event time filter 2110 may further filter the candidate event times by evaluating the IMU sensor data in time windows around the candidate event times to determine if various criteria are met. For example, using the IMU data, the event time filter 2110 can provide an indication equivalent to a GPS indication of vehicle speed going above a specified speed (e.g., 5 m/s or another speed) for a specified amount of time (e.g., 2 minutes or another time). As another example, the event time filter 2110 can provide an indication equivalent to a GPS indication that the vehicle traveled a specified distance (e.g., 250 meters or another distance) in a specified time (e.g., three minutes or another time). Other indications equivalent to GPS indications may be provided without departing from the scope of the present disclosure. Candidate event times and associated data that do meet the specified criteria can be filtered out by the event time filter 2110. Removing candidate event times unlikely to be crash indications can improve results (e.g., reduce false positives) of the IMU crash model.

The event time filter 2110 may output filtered event times 2115 that meet the specified criteria as input to the IMU crash model 2120. Using the filtered event times 2115, the IMU crash model 2120 may generate predictions 2125 of whether the vehicle was involved in a crash.

Figure 22:
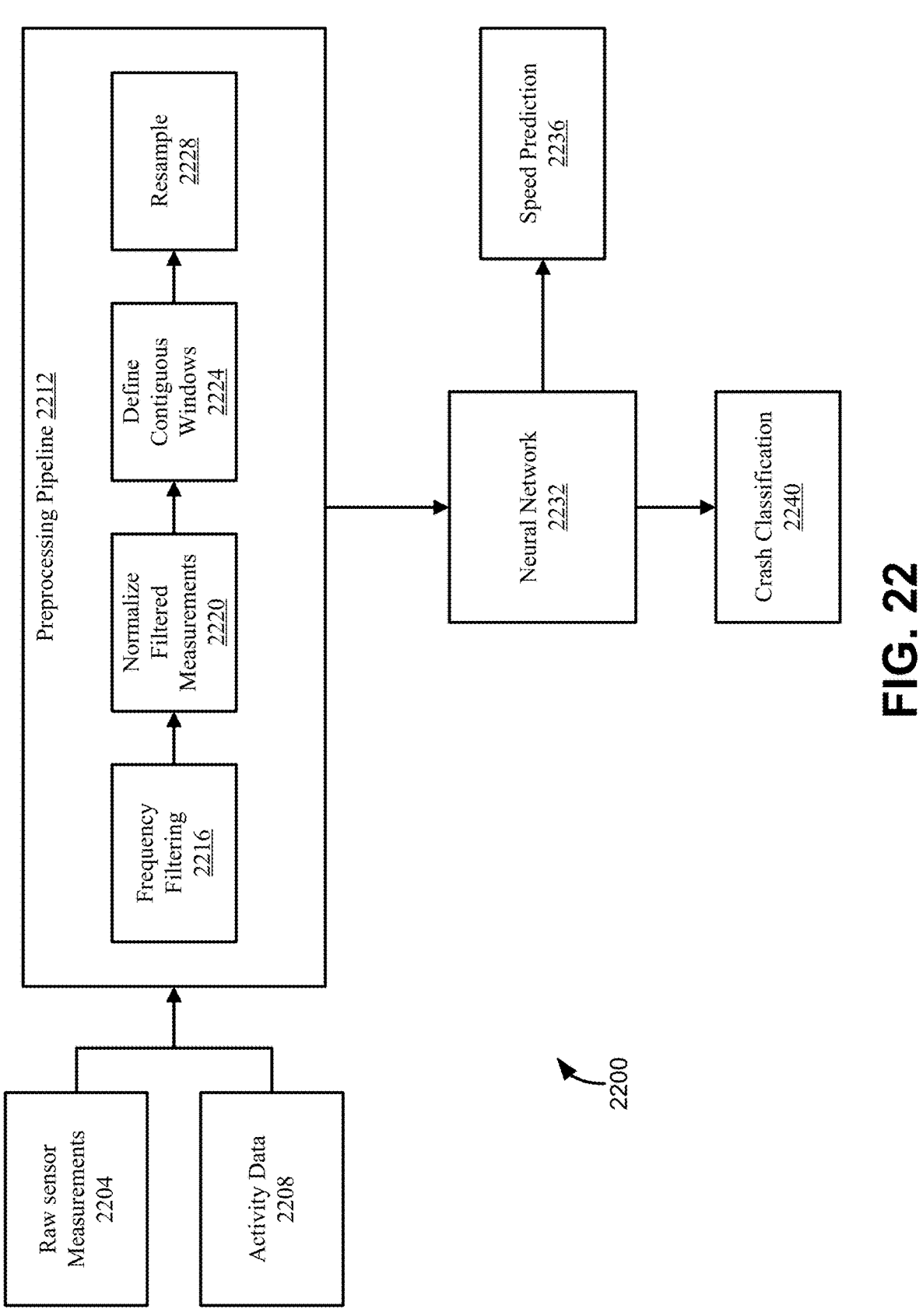
FIG. 22 is an exemplary block diagram of system for predicting the speed of a vehicle from mobile device sensor measurements according to some embodiments.

FIG. 22 is an exemplary block diagram of system 2200 for predicting the speed of a vehicle and generating crash classifications from mobile device sensor measurements according to some embodiments. System 2200 generates one or more predictions of a speed of a vehicle from sensor measurements received by a mobile device positioned within the vehicle. In some instances, the processes described in FIG. 22 are executed in real-time by the mobile device as the mobile device receives sensor measurements from sensors of the mobile device. In other instances, the process may be executed partially by the mobile device and partially by one or more other devices (e.g., such as servers, mobile devices, computing systems, or the like) or entirely by the one or more other devices.

System 2200 receives raw sensor measurements 2204 from one or more sensors of the mobile device (e.g., an accelerometer, magnetometer, or the like). The raw sensor measurements can include sensor measurements in one or more axis (e.g., x axis, y axis, and/or z axis). System 2200 also receives activity data 2208 that includes a prediction of an activity occurring at approximately a same time in which raw sensor measurements 2204 are received. For instance, the operating system (or activity detection engine) may determine a probability that the mobile device is positioned within the vehicle that is currently driving. Raw sensor measurements 2204 and activity data 2208 are input into processing pipeline 2212. Processing pipeline 2212 includes four stages: frequency filtering 2216, normalize filtered measurements 2220, define contiguous windows 2224, and resample 2228. The output of processing pipeline 2212 can be input into a neural network (or other machine-learning model), which will generate a prediction of a speed of the vehicle.

Frequency filtering 2216 includes filtering out a portion of the data values that occur at particular frequencies. For instance, the raw sensor measurements may be converted to a frequency domain using a transform (e.g., Fourier, or the like). Once in the frequency domain, the raw sensor measurements may be filtered to eliminate noise or data values that are less accurate in the vehicle speed predictions. Frequency filtering 2216 filters out frequencies that are greater than a threshold frequency. In some instances, the threshold may be, for example, a frequency from 9-50 Hz. The frequency threshold may be selected by a process of system 2200, a user, a communication received from a remote device, or the like. Processing pipeline 2212 then passes the remaining raw sensor measurements to normalized filtered measurements 2220, where the remaining raw sensor measurements are normalized to a predetermined scale.

Processing pipeline 2212 then defines contiguous windows 2224 that each include a portion of the normalized sensor measurements. The contiguous windows include a portion of a the normalized sensor measurements (in the time domain) that were received during a time interval. The time interval length may be dynamically determined based on the normalized sensor measurements. For instance, a median delta may be defined as the median difference in time between two consecutive values of the normalized sensor measurements. A contagious window may be defined each time the time interval between two consecutive values is greater than a threshold that is based on the median delta. In some instances, the threshold may be a multiple of the standard deviation from the median delta, such as a one standard deviation, two standard deviations, three standard deviations, etc. In other instances, the threshold may be selected by a user or from input received from another device. Any number of contiguous windows may be defined for the normalized sensor values including one (e.g., when a time difference between each consecutive values of the normalized sensor measurements is not greater than threshold 1512) or any number greater than one.

Alternatively, defining contiguous windows 2224 may generate uniform windows. For instance, each contiguous window may be of a predetermined time interval length such as, but limited to, five seconds, 10 seconds, 30 seconds, one minute, etc. The predetermined time interval length may be predetermined (e.g., prior to runtime), dynamically selected (at any time after runtime), selected based on user input, selected based on a value received from an remote computing device, or the like.

The last stage of processing pipeline 2212 includes resampling 2228 in which the contiguous windows are resampled to a predetermined frequency. The predetermined frequency may be a frequency selected by the processing pipeline 2212, system 2200, the mobile device, a user, a remote device, or the like. In some instances, the predetermined frequency may be a frequency from 9-50 Hz.

The output from processing pipeline 2212 may be the processed sensor measurements that correspond to each contiguous window. The processed sensor measurements that correspond to a contiguous window are passed to neural network 2232 which generates predicted speed 2236 for each time unit (e.g., defined based on the median delta, by user input, or as some division of the total time interval of the contiguous window) included in the contiguous window. For instance, if the contiguous window includes 10 seconds of processed sensor measurements and the time unit is one second, then the contiguous window would include 10 time units and the neural network 2232 may output 10 predicted speed values. If the contiguous windows are not of uniformed length (e.g., but based on a time difference between two values being greater than a multiple of the standard deviation from the time delta), then neural network 2232 may generate a different quantity of predictions for each contiguous window.

Additionally, or alternatively, the processed sensor measurements corresponding to a plurality of contiguous windows may be passed to neural network 2232 to generate a crash classification 2240. As described above in relation to FIG. 3, the contiguous windows may span an amount of time starting at an initial point in time when a possible crash event is detected (e.g., from sensor measurements exceeding one or more predefined threshold criterion) over a predefined duration, such as 60 seconds, 90 seconds, 180 seconds, or another similarly suitable amount of time that maximizes classification accuracy while minimizing delays in crash detection and service provisioning.

Figure 23:
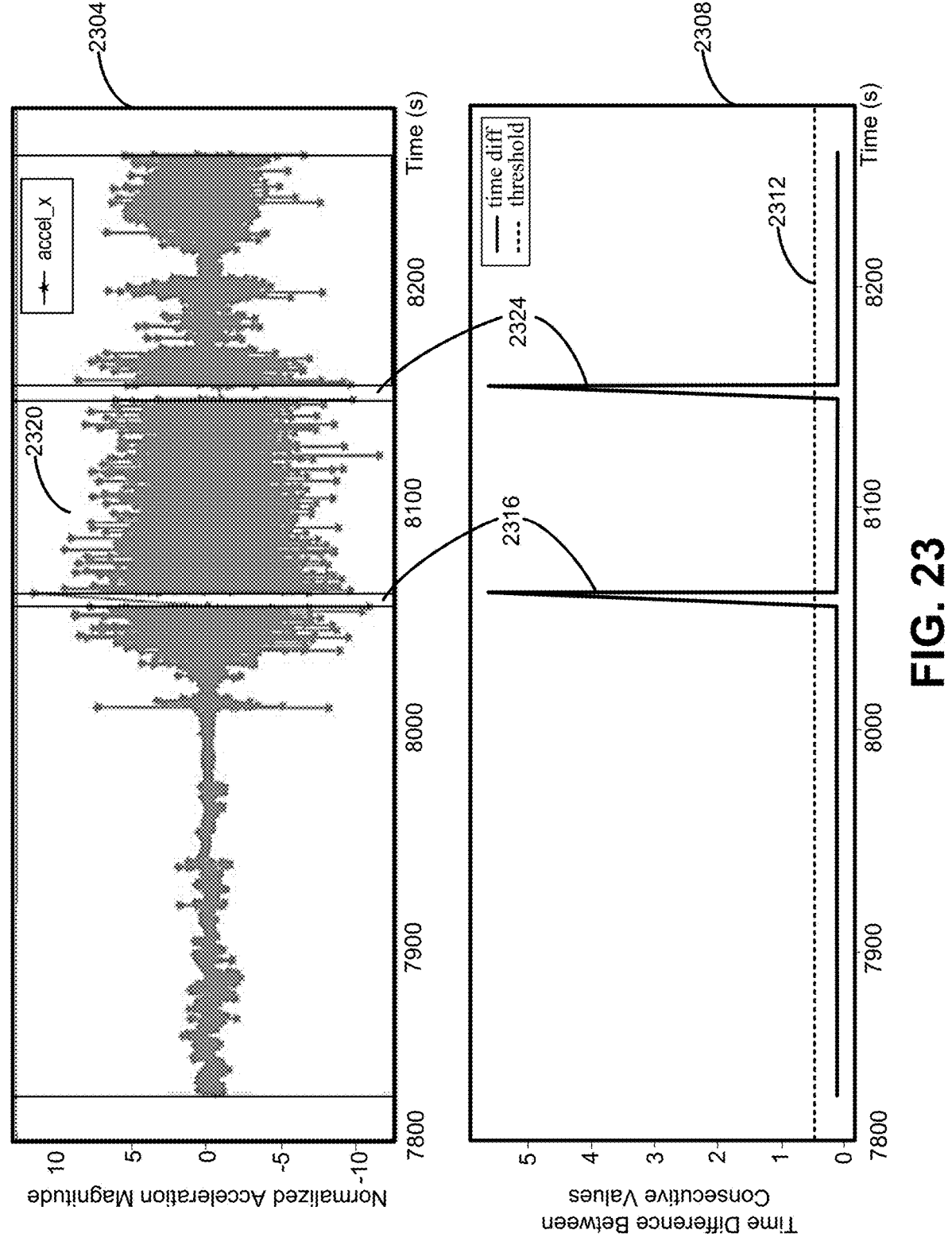
FIG. 23 is an exemplary set of graphs illustrating the division of processed sensor measurements into contiguous windows according to some embodiments.

FIG. 23 is an exemplary set of graphs illustrating the division of processed sensor measurements into contiguous windows according to some embodiments. Graph 2304 includes a plot of normalized acceleration values with the x-axis representing time. Graph 2308 includes a plot of the median difference between two consecutive values of the normalized acceleration values vs time. As a result, each set of consecutive values plotted in graph 2304 has a corresponding value plotted in graph 2308. Graph 2304 includes a first contiguous window that may be defined prior to the beginning of the plot (e.g., at some time prior to time 7800). The first contiguous window extends until the time difference between consecutive values of the normalized acceleration values exceeds threshold 2312. For example, at 2316, there is a time difference between consecutive values that is significantly larger than the threshold 2312 at time 8050, which signifies the end of the first contiguous window and the beginning of second contiguous window 2320. At 2324, there is another time difference between consecutive values that is significantly larger than the threshold 2312 at time 8150, which signifies the end of second contiguous window 2320 and the beginning of a third contiguous window. In some instances, graphs 2304 and 2308 may be rendered or displayed. In other instances, graphs 2304 and 2308 may not be rendered or displayed. In still yet other instances, graphs 2304 and 2308 may be represented as a metadata, data, a data structure or the like. Moreover, while graphs 2304 and 2308 illustrate segmenting normalized acceleration values in the x-axis into contiguous windows, other inputs may be used in addition to or in place of normalized acceleration values in the x-axis such as, but not limited to, normalized acceleration values in the y-axis, normalized acceleration values in the z-axis, normalized acceleration magnitude, activity data, or the like.

Figure 24:
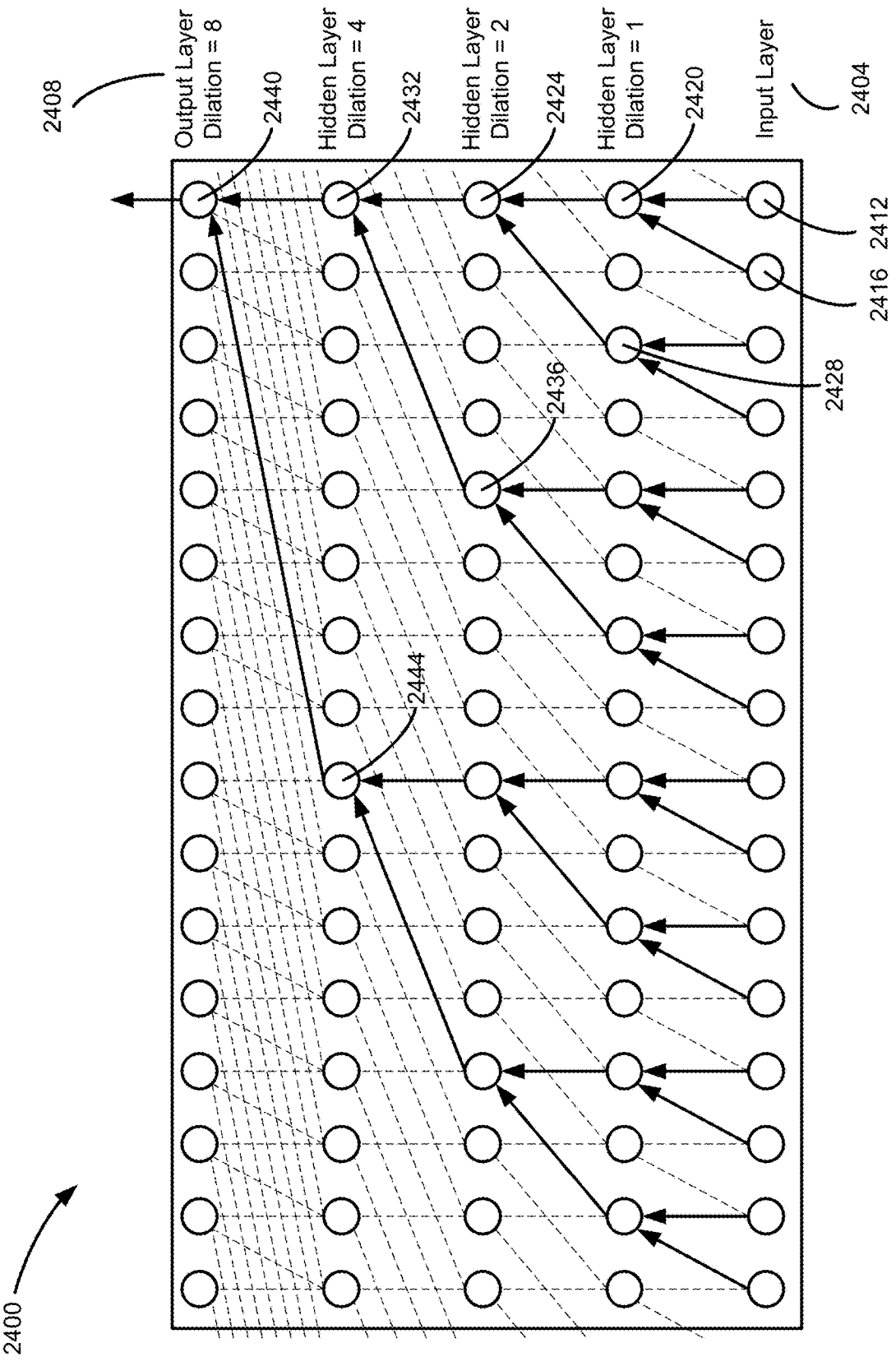
FIG. 24 is an exemplary representation of the layers of a neural network that can generate a prediction of the speed of a vehicle according to some embodiments.

FIG. 24 is an exemplary representation of the layers of a neural network that can generate a prediction of the speed of a vehicle and/or generate a crash classification according to some embodiments. Neural networks include input layer 2404 (e.g., where features are input to the neural network), output layer 2408, and one or more hidden layers positioned between the input layer and the output layer. Each layer includes a one or more neurons that are each connected to one or more neurons of a previous layer (except for the input layer) and one or more neurons of subsequent layer (except for the output layer). Each neuron of each hidden layer provides a non-linear transformation of the features received from a previous layer. Weights may be assigned to the connections between neurons to direct the transformation that is applied to the features.

Neural network 2400 may be a convolutional neural network, which includes one or more convolution layers, in addition to or in place of, the hidden layers. Each neuron of a convolution layer includes a kernel defined by hyper parameters that is convolved across the features received from a previous layer. In some instances, the convolution layers may be dilated convolutions in which the kernel is applied over a larger area (of input features from the previous layer) than its length (e.g., the layer's distance from the input layer). Each subsequent layer may include additional dilations. For example, a first convolution layer may include a dilation of one in which the kernel of neuron 2420 is applied over an area of one (e.g., one neuron from the neuron adjacent to neuron 2420). The kernel of neuron 2420 may be applied to neurons 2412 and 2416. The second convolution layer may include a dilation of two in which the kernel of neuron 2424 is applied over an area of two from the adjacent neuron 2420 of the previous layer. The kernel of neuron 2424 may be applied to neurons 2420 to neuron 2428.

Continuing the example, the next layer includes a dilation of four and the kernel of neuron 2432 is applied an area of four from the adjacent neuron 2424 of the previous layer. The kernel of neuron 2432 is applied from 2424 to 2436. The last layer depicted has a dilation of eight. The kernel of neuron 2440 is applied from neuron 2432 to neuron 2444 (e.g., eight neurons from neuron 2432). Neural network 2400 may include any number of neurons (e.g., 64, 128, 256, etc.), each being configured to apply a kernel. Neural network 2400 may include any number of dilations. For instance, in addition to the dilations 1, 2, 4, and 8 shown, neural network may include 16, 32, 64, etc. with each subsequent dilation being double the previous layer's dilation.

Input features 2412 and 2416 correspond to sensor measurements received over time (e.g., from right to left being from time (T) T=0 to time T=∞). For instance, input feature 2412 may correspond to accelerometer measurements collected at time T=0 and input feature 2416 may correspond to accelerometer measurements collected at the next subsequent time interval T=1 (where the time between T=0 and T=1 may be of any amount of time such as one second, one millisecond, etc.). Dilated convolutions enable the neural network to include a larger receptive field of input features, which enables selective use of sensor measurements across a larger time interval. For instance, a neural network, such as neural network 2400, that includes 128 kernels and dilations of 1, 2, 4, 8, 16, and 32, would include a receptive field of 96. This means the neural network would have 96 inputs (e.g., 96 discrete sensor measurements or the sensor measurement collected over 10.6 seconds). This improves the efficiency of the neural network by improving both the speed and accuracy of the predictions generated by the neural network (e.g., speed prediction, crash prediction, etc.).

Figure 25:
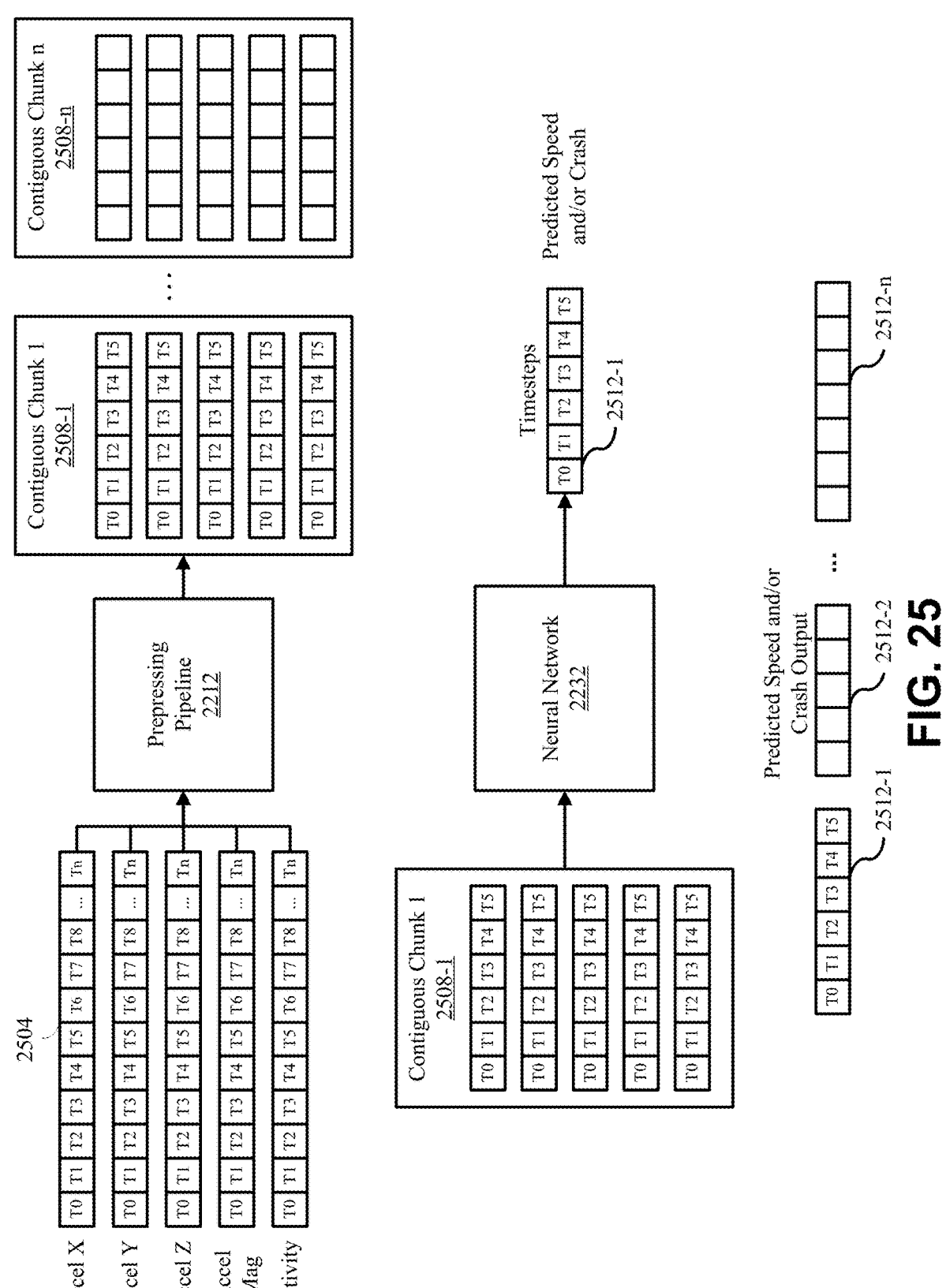
FIG. 25 is exemplary block diagram of a system for predicting speed of a vehicle that corresponds to time steps using mobile device sensor measurements according to some embodiments.

FIG. 25 is an exemplary block diagram of a system for predicting speeds of a vehicle and/or crash classifications that correspond to time steps using mobile device sensor measurements according to some embodiments. A set of sensor measurements 2504 may be received as input. For example, a mobile device, such as mobile device 104, collects the set of sensor measurements from sensors of the mobile device while the mobile device is disposed within the vehicle. The set of sensor measurements includes one or more sensor measurements collected over a time interval (e.g., from T0 to Tn) where each sensor measurement is associated with the time, T, in which the measurement was collected. The set of sensor measurements may include one or more acceleration measurements in the x-axis, one or more acceleration measurements in the y-axis, one or more acceleration measurements in the z-axis, one or more acceleration magnitude measurements, an identification of a current activity from Activity Data for each time in which there is an acceleration measurement, combinations thereof, and the like. In some instances, in addition to acceleration measurements, the sensor measurements may include gyroscopic measurements, magnetometer measurements, GPS measurements, combinations thereof, or the like.

Preprocessing pipeline 2212 may receive sensor measurements 2504 and generate a series of contiguous chunks 2508 of processed sensor measurements. Each contiguous chunk 2508 may correspond to processed sensor measurements that correspond to a contiguous window (e.g., as described in connection to FIGS. 22 and 23). For example, contiguous chunk 1 2508-1 may include the processed sensor measurements of sensor measurements collected over a first contiguous window. These processed sensor measurements may include one or more values for each input sensor type (e.g., acceleration measurements in the x-axis, acceleration measurements in the y-axis, acceleration measurements in the z-axis, acceleration magnitude, and activity data). Any number of contiguous chunks may be generated by preprocessing pipeline 2212. Since each contiguous chunk includes processed sensor measurements of sensor measurements collected during a contiguous window and since contiguous windows may be of varying lengths, the quantity of sensor measurements of each contiguous chunk 2508-1-2508-$n$ may be different (e.g., from a single value for each sensor type to any particular quantity of values for each sensor type).

The neural network receives the contiguous chunks as input and generates, for each time for which there is sensor measurements, a predicted speed and/or crash classification of the vehicle 2512-1-2512-$n$. For instance, since contiguous chunk 1 2508-1 includes sensor measurements for times T0-T5, neural network 2232 may generate a predicted speed 2512-1 of the vehicle for each of T0-T5. Neural network 2232 may then receive the next contiguous chunk 2508-2 (not shown) and generate predictions 2512-2 for each time unit in that contiguous chunk. This process may continue generating predictions 2512-$n$ until there are no more contiguous chunks for the neural network.

FIG. 26 is a flowchart of example of a process for filtering speed predictions according to aspects of the present disclosure. The process includes generating a set of gravity vectors from raw accelerometer measurements, each gravity vector of the set of gravity vectors corresponding to a time interval (block 2604). Each gravity vector of the set of gravity vector may be one dimensional (e.g., incorporate raw accelerometer measurements from a single axis, such as the x-axis, y-axis, or z-axis), two dimensional (e.g., incorporate raw accelerometer measurements from two axes), or three dimensional (e.g., incorporate raw accelerometer measurements from the x-axis, y-axis, and z-axis). Each gravity vector may be associated with the time in which the corresponding raw acceleration measurements were collected. Gravity vectors may be generated in predetermined regular intervals (e.g., referred to herein as time steps) that may be determined based on the sampling rate of the accelerometer or by a user. For example, a gravity vector may be generated every half second, second, or the like.

In some instances, each gravity vector may be derived from a median of a set of raw acceleration signals. This may prevent signal noise from the accelerometer from propagating to the derived gravity vector. For instance, a rolling window may be defined with a fixed length time interval. The median accelerometer measurements collected over the time interval may be used to derive a gravity vector. For example, the sliding window may include 22 seconds (e.g., T=0-22) of raw accelerometer measurements and derive a first gravity vector from the median accelerometer measurements collected over the 22 seconds sliding window. The sliding window may than increment such that the sliding window includes a newest raw accelerometer measurement and discards an oldest raw accelerometer measurement (e.g., T=1-23, where the window no longer includes the accelerometer measurement collected at T=0, but includes an accelerometer measurement collected at T=23). A second gravity vector may be derived from the raw accelerometer measurements that are within the sliding window. The sliding window may increment in real time, when a new accelerometer measurement is received at a predetermined time intervals (e.g., every 0.5 seconds, every 1 second, or the like).

The process continues by computing an angle between a current gravity vector and a previous gravity vector (e.g., computing the "gravity angle difference") (block 2608). The process may begin at a first gravity vector in which a previous gravity vector exists to calculate the angle between and continue for each successive gravity vector in the set of gravity vectors until there are no more gravity vectors. In some instances, the previous gravity vector may be the immediately previous gravity vector to the current gravity vector. In this instance, the process may begin at the second gravity vector (as the current gravity vector) since there exists an immediately previous gravity vector from which to calculate the angle. In other instances, the previous gravity vector may be of a predetermined distance from the current gravity vector, such as five gravity vectors previous to the current gravity vector, 10 gravity vectors previous to the current gravity vector, etc.

The process continues by determining if there are more gravity vectors (e.g., there is a gravity vector that was derived after the current gravity vector in the set of gravity vectors) (block 2612). If so, the process continues by setting the current gravity vector to the next gravity vector in the set of gravity vectors (block 2616) and returning to block 2608. Blocks 2608-2616 form a loop over the set of gravity vectors. The current gravity vector (at block 2608) is initially set to the first (and oldest) gravity vector in the set of gravity vectors and iterates through the set of gravity vectors computing the gravity angle difference between the current gravity vector and the previous gravity vector until there are no more gravity vectors in the set of gravity vectors. Once the loop has concluded, a gravity angle difference value will be available for each time step (e.g., the quantity of gravity angle difference values may be approximately equal to or less than the quantity of gravity vectors in the set of gravity vectors).

The process continues by computing a rolling sum over a gravity angle difference within a sliding time window of a predetermined length (block 2620). For example, the sliding window may 10 seconds, 15 seconds, 20 seconds, or the like. The process computes the sum of the gravity angle difference values that are within the sliding window (e.g., T=5 to T=20). The sliding window is then incremented by one time step and another sum is calculated using the gravity angle values that are within the incremented sliding window (e.g., T=6 to T=21). The rolling sum over a gravity angle difference within a sliding time window may be referred to as the "sum sliding window gravity angle difference." In some instances, a "sum sliding window gravity angle difference" may be computed for each time step in which there is a gravity angle difference value. In other instances, a "sum sliding window gravity angle difference" may be computed for each complete sliding window. For example, for a sliding window of length x, the sliding window would not be complete until T=x. In those instances, a "sum sliding window gravity angle difference" may be computed for all values that exist at T greater than or equal to x.

The process then continues by identifying one or more speed predictions from a set of speed predictions that corresponds to a same time interval in which the rolling sum exceeds a threshold (block 2624). The set of speed predictions includes a predicted speed of the vehicle for each time step in which there is a "sum sliding window gravity angle difference." The process identifies each "sum sliding window gravity angle difference" that exceeds a threshold value. In some instances, the threshold may be dynamic. For instance, the threshold may be more or less sensitive based on detected events. If a vehicle crash is detected, for example, the threshold may be sensitive with respect to the time interval immediately following the detected vehicle crash. The process then identifies the one or more speed predictions that correspond to a same time step as the "sum sliding window gravity angle differences" that exceed the threshold value.

The process continues by filtering from the set of speed predictions the one or more speed predictions (block 2628). In some instances, the acceleration measurements may include unwanted values and may be partly the result of a user handling the mobile device instead of the vehicle, noise, or the like. Use of these acceleration values to generate speed predictions may yield inaccurate results. The "sum sliding window gravity angle difference," representing the volatility of the acceleration measurements, may be used as a filter to remove speed predictions that correspond to accelerations measurements with a high degree of variability (e.g., likely to be the result of non-vehicular forces or noise). When the "sum sliding window gravity angle difference" exceeds the threshold value at a time step (e.g., acceleration measurements at that time step have a high degree of volatility), the speed prediction that corresponds to that time step may be filtered from the set of speed predictions.

In some instance, the process may continue indefinitely provided there are acceleration measurements to process. For instance, blocks 2604-2628 may execute continuously while the mobile device is positioned in the vehicle on a trip (e.g., the vehicle is moving from a starting location to a destination location). The process may derive speed predictions and filter those speed predictions in real time. In other instances, blocks 2604-2628 may execute once the trip has concluded. For instance, during the trip the mobile device may collect sensor measurements throughout the drive. Once the drive concludes, the sensor measurements nay be processed in a batch process to both generate a set of speed predictions over the trip and filter those speed predictions.

In still yet other instances, the process of 2604-2628 may execute as semi-batch process in which blocks 2604-2628 may execute each time a predetermined amount of sensor measurements is collected (e.g., based on a threshold quantity of memory, enough to generate a predetermined quantity of gravity vectors, the time interval between when the vehicle starting moving to when the vehicle stopped moving, or the like) and/or upon completion of the trip (e.g., in the instance where less than a threshold amount of sensor measurements were collected, but the trip concluded).

Figure 27:
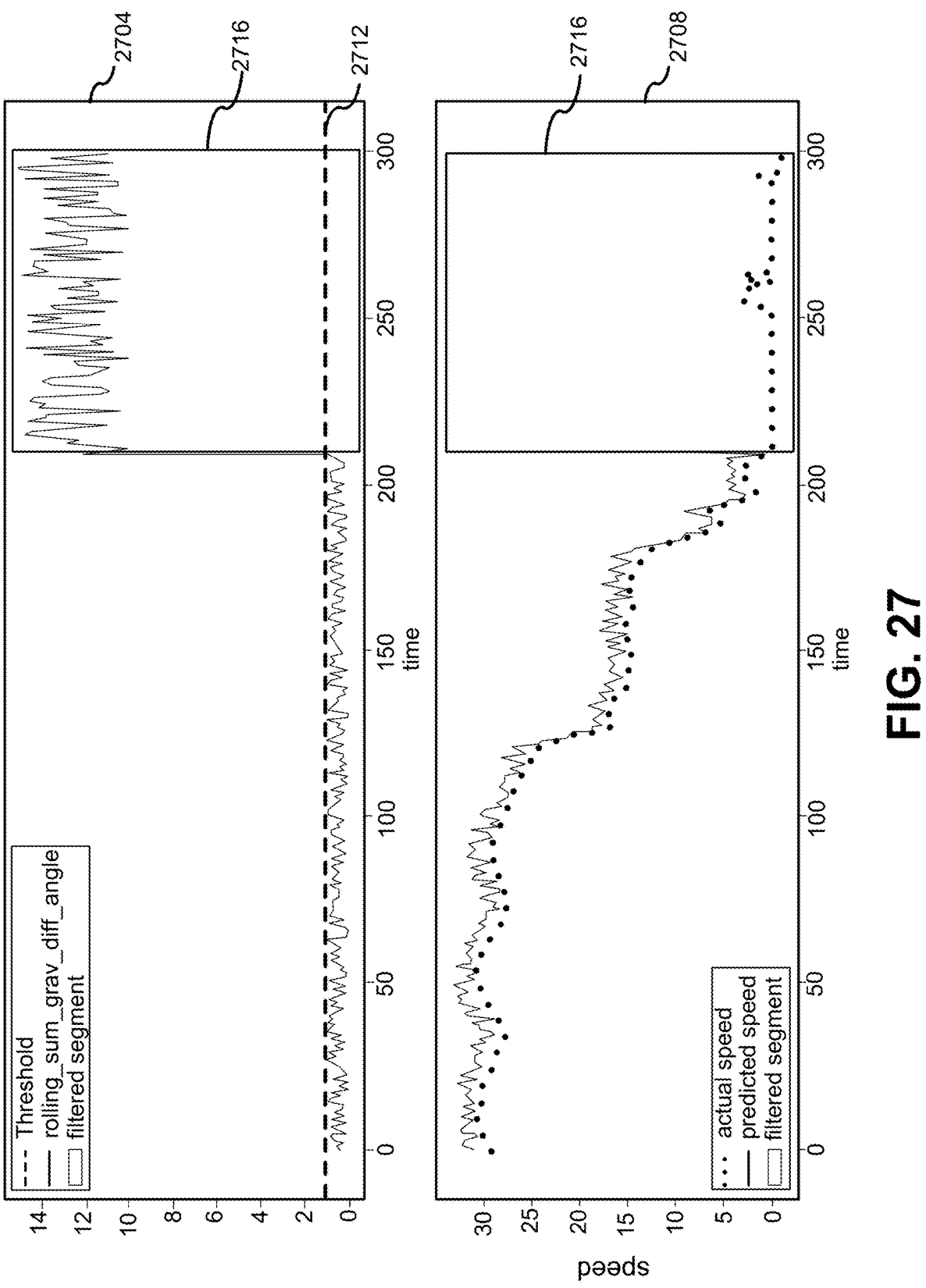
FIG. 27 includes graphs illustrating an example in which the "sum sliding window gravity angle difference" is used to filter speed predictions according to aspects of the present disclosure.

FIG. 27 includes graphs illustrating an example in which the "sum sliding window gravity angle difference" is used to filter speed predictions according to aspects of the present disclosure. Graph 2704 is a plot of the "sum sliding window gravity angle difference" over time. Graph 2708 is a plot of the actual speed of a vehicle and the predicted speed of the vehicle over the same time interval as graph 2704. Graphs 2704 and 2708 provide an illustration of an example in which speed predictions are filtered according to the process of FIG. 26. In graph 2704, when the "sum sliding window gravity angle difference" exceeds threshold 2712, as it does at approximately 210 seconds, the system begins filtering the corresponding speed prediction values 2716. Graphs 2704 and 2708 provide a graphical representation of the filtering of speed prediction values. During the process of filtering speed predictions (e.g., the process of FIG. 26), the derived values (e.g., predicted speed, the "sum sliding window gravity angle difference".) may not be represented graphically (as shown FIG. 27) but instead represented as data, as data structure, or the like.

Figure 28:
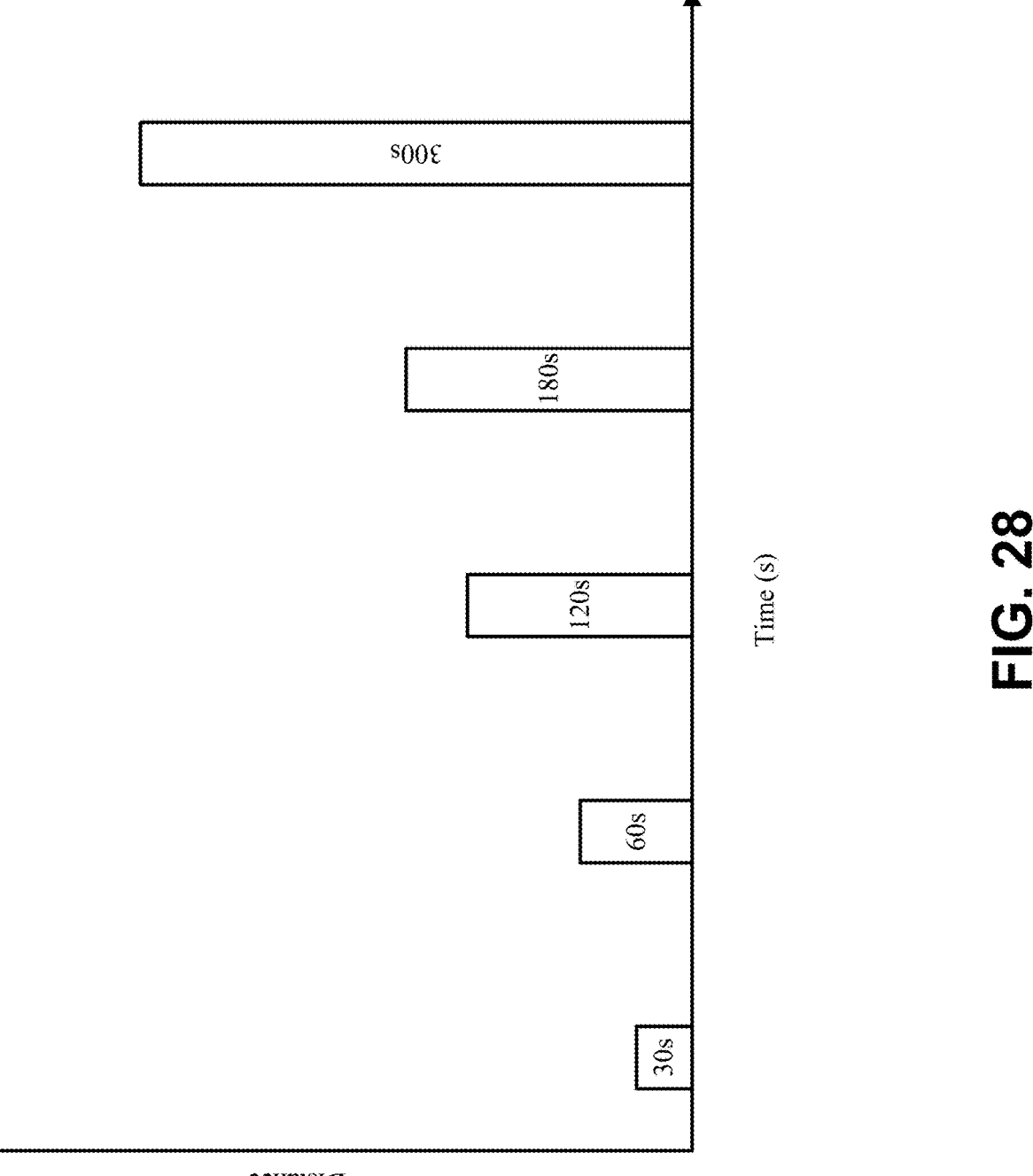
FIG. 28 is exemplary graph depicting the use of speed prediction to derive features for machine-learning model to generate a crash prediction according to some embodiments.

FIG. 28 is exemplary graph depicting the use of speed prediction to derive features for machine-learning model to generate a crash prediction according to some embodiments. A machine-learning model may generate crash predictions for a vehicle that is in operation. In some instances, signal noise or other non-vehicular forces (e.g., such as a user operating the mobile device) may cause a false positive where a crash is detected but no crash occurred. Additional features that characterize the environment of the vehicle after the crash occurred may be used to improve the accuracy of predicted crashes (e.g., eliminating false positives) and as input to the machine-learning model to refine the model or retraining.

For example, after a collision, a driver of a vehicle should bring the vehicle to a complete stop at a safe location. The driver may then survey the damage to the vehicle (e.g., to determine whether the vehicle is safe to operate), asses injuries, exchange information with other drivers, etc. Speed prediction may be used to determine if/when the vehicle comes to a stop after a detected crash. If the vehicle does stop within a predetermined time interval or distance after a detected crash, then the crash prediction is more likely to have been accurate. On the other hand, if the vehicle continues to drive after the detected crash, then the detected crash may be a false positive. The detection of the vehicle coming to a stop (based on the speed prediction) and the distance after the detected crash in which the vehicle came to a stop may be additional features that may be used to determine the accuracy of crash prediction (e.g., filter out false positives/negatives) and to further improve the accuracy of the machine-learning model in generating crash predictions (e.g., by labeling sensor data used to train the machine-learning model).

The distance from a location of a potential crash may be determined by computing the mean predicted speed over one or more windows after the time in which the crash was detected. The window may be of a fixed and predetermined length such as 30 seconds, 60 seconds, 120 seconds, 180 seconds, 300 seconds, or of any length set by the mean predicted speed (e.g., with a higher mean predicted speed having a larger window) a user. Distances can be calculated by multiplying the mean speed by the duration of each window). The distances may be calculated for each window using the predicted speed (e.g., as described in FIG. 22) and again using filtered speed. For the five windows depicted in FIG. 28 (e.g., 30 seconds, 60 seconds, 120 seconds, 180 seconds, 300 seconds), 10 distance features would be derived: one distance feature for each window using unfiltered predicted speed, and one distance feature for each window using filtered predicted speed. Additional distance features may be generated if additional windows are selected.

The distance features may be used to determine a predicted crash actually occurred. For example, if the vehicle comes to a stop within a predicted distance after a crash was detected, and/or remained stationary, then it may be more likely that the crash occurred. On the other hand, if vehicle does not come to a stop within a predicted distance, and/or continued driving, then it may be more likely that the predicted crash was a false positive. In that case, the detected crash may be discarded and data collection by the mobile device may continue until the drive has concluded.

Alternatively or additionally, the distance features may be used as additional inputs for a machine-learning model configured to generate the crash predictions (e.g., either the same machine-learning model that generated the original crash prediction or a different machine-learning model). Generating a new crash prediction using the distance features as additional input may produce a crash prediction that is more accurate than the initial crash prediction.

In some instances, the additional information may be used to provide labels for future training. For example, if the driver did not stop after a crash was predicted, then the sensor data that was input to the machine-learning model may be labeled with "not a crash." Similarly, if the vehicle did stop after the predicted crash, then the sensor data that was input to the machine-learning model may be labeled with "crash." The labels assigned to the sensor data may be used by the machine-learning model to refine how machine-learning model generates future predictions and may improve the accuracy of the machine-learning model in generating future crash predictions.

Figure 29:
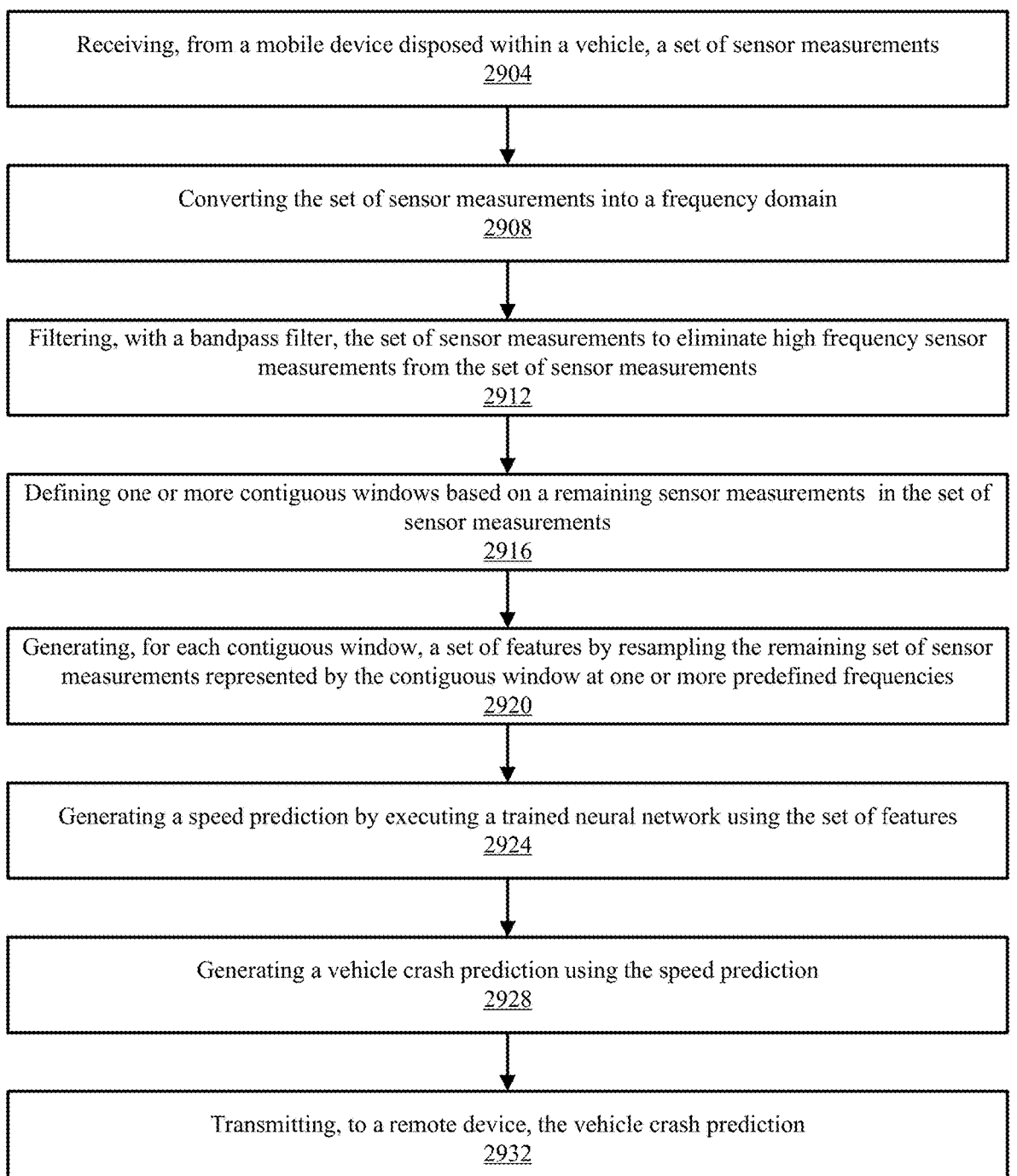
FIG. 29 is a flowchart of example of a process for generating a crash prediction a predicted speed of a vehicle according to some embodiments.

FIG. 29 is a flowchart of example of a process for generating a crash prediction using a predicted speed of a vehicle according to some embodiments. The process begins by receiving, from a mobile device disposed within a vehicle, a set of sensor measurements (block 2904). The set of sensor measurements may include measurements received or derived from one or more sensors of the mobile device such as, but not limited to measurements from an accelerometer, activity data, measurements from a magnetometer, and/or measurements from one or more other sensors of the mobile device. The sensor measurements may be received over a predetermined time interval or event. For instance, the set of sensor measurements may be received in real time or in regular intervals such as, but not limited to, every half second, one second, five seconds, or any predetermined interval.

Alternatively, the set of sensor measurements may be received (in real time or in regular intervals) over a trip (e.g., where a vehicle is being operated to move from a starting location to a destination location). For example, activity data may be used to determine when an activity such as a drive begins and ends. When the mobile device detects that a drive has begun, the mobile device may begin collecting the set of accelerometer measurements from the accelerometer of the mobile device until the activity data (a user, or remote communication), indicates that the drive has terminated.

Alternatively still, the set of sensor measurements may be received from a remote device such as remote accelerometer, a mobile device, a server, or the like. The set of sensor measurements may include sensor measurements collected during the drive. In some instances, the set of sensor measurements may be received after the drive was terminated, upon detection of a crash event, upon detection of another event, upon the expiration of a time interval, when sensor signals exceed a threshold, or the like.

The process continues by converting the set of sensor measurements into a frequency domain (block 2908). The set of sensor measurements may be converted using any means such as a Fourier transform or the like. In some instances, this may performed by a machine-learning model trained to process accelerometer signals. The machine-learning model may be configured to additionally perform one or more of blocks 2912-2920.

The process continues by filtering, with a bandpass filter, the set of sensor measurements to eliminate high frequency sensor measurements from the set of sensor measurements (block 2912). The bandpass filter filters out a portion of the sensor measurements that occur at particular frequencies. For example, frequencies associated with signal noise sensor measurements that do not correspond to the vehicle (e.g., movement of the mobile device independent from movement of the vehicle). In some instances, frequencies that are greater than a first threshold frequency and less than a second threshold frequency may be filtered. The first threshold may be, for example, approximately 50 Hz and the second threshold may be, for example, approximately 9 Hz. The first and second thresholds may be selected by a process of the mobile device (such as a data collection application, the operating system, etc.), by a user, from a communication received from a remote device, or the like.

The process continues by defining one or more contiguous windows based on remaining sensor measurements in the set of sensor measurements (block 2916). Defining one or more contiguous windows from the remaining (filtered) set of sensor measurements may be performed as described by block 2924 of FIG. 29. The contiguous windows may be defined for the time interval over which the accelerometer signals were received. Each accelerometer measurement may correspond to a contiguous window based on time interval represented by a contiguous window and when the accelerometer signal was generated by the accelerometer.

The one or more contiguous windows may be defined by identifying a time difference between each pair of consecutive accelerometer signals (e.g., when the signals were generated by the accelerometer). A continuous window may be defined between a first pair of consecutive sensor measurements that is greater than a threshold (e.g., three standard deviations from the mean time difference between consecutive accelerometer measurements or the like) and the next pair of consecutive sensor measurements that is greater than the threshold. Since the time difference between pairs of consecutive accelerometer measurements varies, the contiguous windows may not be of equal length. Each contiguous window includes a time interval over which a subset of the remaining set of sensor measurements were generated by the accelerometer.

The process continues by generating, for each contiguous window, a set of features by resampling the subset of the remaining set of sensor measurements represented by the contiguous window to one or more predefined frequencies (block 2916). The subset of the remaining set of sensor measurements may be resampled as described by 2228 of FIG. 22, which may be determined, for example, as a frequency of 9-50 Hz, by user input, by a communication from a remote device, or the like.

The process continues by generating, for each set of features, one or more speed predictions by executing a trained neural network using the set of features. The trained neural network may be neural network 2232 of FIG. 22, neural network 2400 of FIG. 24 (e.g., which may the same as neural network 2232), or a different neural network. The neural network may be trained using supervised or unsupervised learning to generate a speed prediction from sensor measurements.

In some instances, the speed predictions may be filtered to prevent reliance on signal noise or accelerometer signals that are not associated with the vehicle from producing inaccurate speed predictions. For example, the one or more speed predictions may be filtered as described by the process of FIG. 26.

The process continues by generating a vehicle crash prediction using the one or more speed predictions (block 2928). For example, a vehicle crash prediction may be provided by a crash-prediction machine-learning model that indicates a crash event occurred. The vehicle crash prediction may be authenticated using the speed prediction to determine whether the vehicle stopped after the crash event. If the vehicle did not stop then the crash prediction may be defined as false (e.g., the crash event did not occur). If the vehicle did stop, then the crash prediction may be defined as true (e.g., the crash event did occur).

For another example, a vehicle crash prediction may be provided by a crash-prediction machine-learning model that indicates a crash event occurred. The vehicle crash prediction may be authenticated using the speed prediction to determine whether the vehicle stopped after the crash event. The speed prediction may be used to derive distance features that indicate if and/or when the vehicle stopped after an initial crash detection. The distance features may be provided to the crash prediction machine-learning model (e.g., the neural network that provided the speed prediction, the same crash prediction machine-learning model that provided the initial crash prediction, or another crash prediction machine-learning model), which may execute using the distance features and (optionally) the sensor measurements to provide a final crash detection to generate a final crash prediction. The final crash prediction may be a probability that a crash occurred (e.g., between 0-1, 0-100, a grade between A-F, a Boolean such as true or false, or the like).

The probability may be compared to one or more thresholds. If the probability is greater than the one or more thresholds, then it may be determined that a crash occurred (e.g., the vehicle crash prediction may be defined as true). If the probability was less than a first threshold but greater than a second threshold (if utilized), the mobile device may trigger a notification to a user or another device (such as a server, an onboard computing device of the vehicle, another mobile device, or the like) to request additional information and/or confirmation of whether the crash did or did not occur. The crash event may be defined based on the user input as true (e.g., crash occurred) or false (e.g., crash did not occur). If the probability is less than the one or more thresholds, then it is determined that the crash did not occur (e.g., and the vehicle crash prediction may be defined as false).

The process continues by transmitting, to a remote device, the vehicle crash prediction (and/or final crash prediction) (block 2932).

In some instances, if it is determined that a crash occurred, one or more actions may be executed by the mobile device. Examples of the one or more actions include, but are not limited to, transmitting a notification (e.g., a push notification, an email, a robocall, a text message, or the like) to emergency services, initiating a claims process, transmitting a notification to insurance personnel, transmitting a notification to another mobile device (e.g., informing an emergency contact of the driver or passenger, requesting additional information associated with the crash from other occupants of the vehicle or occupants of other vehicles involved in the crash, or the like), determining a severity of the crash, combinations thereof, or the like.

If no crash is predicted, the process may return to block 2904 in which a new set of sensor measurements may be collected. The new set of sensor measurements may be associated with another portion of the same trip or from a subsequent trip.

FIG. 30 is a block diagram of a process for authenticating a vehicle crash prediction using speed predictions according to aspects of the present disclosure. The process begins by receiving, from a mobile device disposed within a vehicle, a set of sensor signals (block 3004). The set of sensor measurements may include measurements received or derived from one or more sensors of the mobile device such as, but not limited to measurements from an accelerometer, activity data, measurements from a magnetometer, and/or measurements from one or more other sensors of the mobile device. The sensor measurements may be received over a predetermined time interval or event. For instance, the set of sensor measurements may be received in real time or at regular intervals.

Alternatively, the set of sensor measurements may be received (in real time or at regular intervals) over a trip (e.g., where a vehicle is being operated to move from a starting location to a destination location). For example, activity data may be used to determine when an activity such as a drive begins and ends. When the mobile device detects that a drive has begun, the mobile device may begin collecting the set of accelerometer measurements from the accelerometer of the mobile device until the activity data (a user, or remote communication), indicates that the drive has terminated.

Alternatively still, the set of sensor measurements may be received from a remote device such as remote accelerometer, a mobile device, a server, or the like. The set of sensor measurements may include sensor measurements collected during the drive. In some instances, the set of sensor measurements may be received after the drive was terminated, upon detection of a crash event, upon detection of another event, upon the expiration of a time interval, when sensor signals exceed a threshold, or the like.

The process continues by generating a set of contiguous windows using the set of sensor measurements, wherein each contiguous window of the set of contiguous windows represents a subset of the set of sensor measurements (block 3008). Defining one or more contiguous windows from the set of sensor measurements may be performed as described by block 2924 of FIG. 29. The contiguous windows may be defined for the time interval over which the accelerometer signals were received. Each contiguous window may represent a subset of the set of accelerometer measurements that were generated by the accelerometer during a time included in the contiguous window.

The one or more contiguous windows may be defined by identifying a time difference between each pair of consecutive accelerometer signals (e.g., when the signals were generated by the accelerometer). In some instances, the sensor measurements may be processed before the contiguous windows are defined such as filtering (e.g., as described by 2216) and normalizing the remaining sensor measurements (e.g., as described by 2220). A contiguous window may be defined between a first pair of consecutive sensor measurements that is greater than a threshold (e.g., one or more standard deviations from the mean time difference between consecutive sensor measurements or the like) and the next pair of consecutive sensor measurements that is greater than the threshold. Since the time difference between pairs of consecutive accelerometer signal varies, the contiguous windows may be of varying lengths. Each contiguous window includes a time interval over which a subset of the remaining set of sensor measurements were generated by or derived from sensor of the mobile device.

The process continues by generating, for each contiguous window of the set of contiguous windows, a speed prediction by executing a trained neural network using the set of contiguous windows (block 3012). One or more features may be derived from each contiguous window. Each feature be an input to the trained neural network. The neural network may be neural network 2232 of FIG. 22 or neural network 2400 of FIG. 24 or the like. The trained neural network may execute using the subset of the set of sensor measurements that corresponds to each contiguous window to generate one or more speed predictions for the contiguous window. Each speed prediction may correspond to a time step (e.g., a particular time within the contiguous window). In some instances, the neural network may generate a set of speed predictions with one speed prediction for each time step of the contiguous window.

The process continues by receiving an indication that the vehicle is involved in a crash event (block 3016). The indication of the crash event may be determined by the mobile device from the sensor measurements. For instance, a crash prediction machine-learning model may execute to generate a crash prediction using the sensor measurements. The crash prediction machine-learning model may be the neural network or a separate model. In some instances, the indication of the crash event may be received from a remote device. For instance, the sensor measurements may be transmitted to a remote device. The remote device may execute the crash prediction machine-learning model to generate a crash prediction. The remote device may then transmit the indication of a crash event back to the mobile device.

The process continues by authenticating the crash event using the speed prediction (block 3020). The crash prediction may be authenticated by one or more of the process described in FIG. 36. In some examples, authenticating the crash event may include determining, using the speed prediction, whether the vehicle continued to drive after the crash event. The mobile device may use multiple time windows (30 seconds, 60 seconds, 120, seconds, 180 seconds, 300, seconds, etc.) and determine if and/or when the vehicle stopped with each time window. If the vehicle did not stop, then it may be determined that the indication of the crash event was a false positive (e.g., no crash event occurred).

In other examples, authenticating the crash event can include determining, using the speed prediction, whether the vehicle continued to drive after the crash event. If it was determined that the vehicle stopped after the crash event, distance features may be derived from the speed predictions and the time windows. The distance features may indicate if and/or when the vehicle stopped after an initial crash detection and at what distance from the crash event. The distance features may be provided to the crash prediction machine-learning model (e.g., the neural network that provided the speed prediction, the same crash prediction machine-learning model that provided the initial crash prediction, or another crash prediction machine-learning model), which may execute using the distance features and (optionally) the sensor measurements to generate an updated crash prediction. The updated crash prediction may be a probability that a crash occurred (e.g., between 0-1, 0-100, a grade between A-F, a Boolean such as true or false, or the like).

The probability may be compared to one or more thresholds. If the probability is greater than the one or more thresholds, then it may be determined that a crash event occurred. If the probability was less than an first threshold, but greater than a second threshold (if utilized), the mobile device may trigger a notification to a user or another device (such as a server, an onboard computing device of the vehicle, another mobile device, or the like) to request additional information and/or confirmation of whether the crash did or did not occur. The crash event may be defined based on the user input as true (e.g., crash occurred) or false (e.g., crash did not occur). If the probability is less than the one or more thresholds, then it is determined that the crash did not occur.

The process continues by determining, based on authenticating the crash event that the crash event did not occur (block 3028).

The process continues by purging, in response to determining that the crash event did not occur, the crash event from memory. In some instance, purging the crash event from memory may include purging the local memory of the mobile device. In other instances, the crash event from memory may include purging memory of one or more remote devices (e.g., other mobile devices, servers) that may be configured to process sensor measurements of the mobile device, provide speed predictions using sensor measurements of the mobile device, provide crash predictions using sensor measurements of the mobile device, or the like.

The processes of blocks 3004-3824 may continue to receive sensor measurements and upon receiving another indication of a possible crash event, authenticate the crash event.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), mask programmable gate array (MPGA), processors, controllers, micro-controllers, microprocessors, other electronic units designed to perform the functions described above, and/or combinations thereof.

Also, it is noted that the embodiments and/or examples may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, one or more of the operations may be performed out-of-order from the order depicted. A process may terminate when its operations are completed or return to a previous step or block. A process could have additional steps or blocks not included in the figure. A process may correspond to a method, a function, a procedure, a subroutine, a subprogram, etc. When a process corresponds to a function, its termination corresponds to a return of the function to a calling function or a main function.

Furthermore, the devices and/or systems described herein may be implemented by hardware, software, scripting languages, firmware, middleware, microcode, hardware description languages, and/or any combination thereof. When implemented in software, firmware, middleware, scripting language, and/or microcode, the program code, or code segments to perform the necessary tasks may be stored in a non-transitory computer-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any non-transitory computer-readable medium tangibly embodying instructions may be used in implementing the methodologies described herein. For example, software codes may be stored in a memory. Memory may be implemented within the processor or external to the processor. As used herein, the term "memory" refers to any type of volatile, non-volatile, or other storage medium and is not to be limited to any particular type of memory, number of memories, or type of media upon which memory is stored.

Moreover, as disclosed herein, the term "storage medium" may represent one or more memories for storing data, including read only memory (ROM), random access memory (RAM), magnetic RAM, cache memory, magnetic disk storage mediums, optical storage mediums, flash memory devices, and/or other machine readable mediums for storing information. The term "computer-readable medium" includes, but is not limited to, portable or fixed storage devices, optical storage devices, and/or various other storage mediums capable of storing that contain or carry instruction(s) and/or data.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A crash detection and response system, comprising:
a plurality of sensors disposed in a vehicle;
a memory; and a processor coupled to the memory, wherein the processor is configured to perform operations including:
operating the plurality of sensors during a trip in the vehicle to collect driving data;
detecting, using the driving data, a driving event as it occurs during the trip, wherein the driving event occurs at a first time;
generating, after a first predefined duration starting at the first time and ending at a second time, a first crash classification for the driving event, wherein generating the first crash classification comprises executing a crash prediction machine learning model on the driving data collected during the first predefined duration and the driving data used to detect the driving event;
determining that the first crash classification meets a first predefined crash threshold criterion;
initiating an escalation action sequence in response to determining that the first crash classification meets the first predefined crash threshold criterion, wherein the escalation action sequence comprises a plurality of actions that are automatically executed by the system according to a predefined order;
generating, after a second predefined duration starting at the second time and ending at a third time, a second crash classification for the driving event, wherein generating the second crash classification comprises executing the crash prediction machine learning model on the driving data collected during the second predefined duration, the driving data collected during the first predefined duration, and the driving data used to detect the driving event;
determining that the second crash classification does not meet a second predefined crash threshold criterion; and
in response to determining that the second crash classification does not meet a second predefined crash threshold criterion, terminating the escalation action sequence prior to an automatic execution of an action of the plurality of actions.

2. The system of claim 1, wherein the plurality of actions are automatically executed at corresponding predefined points in time according to the predefined order, and the processor is further configured to perform operations including:
determining, prior to each corresponding predefined point in time, whether the driving data collected up to each corresponding predefined point in time confirms the first crash classification, wherein in response to determining that the driving data collected up to a particular predefined point in time contradicts the first crash classification, the escalation action sequence is terminated prior to an execution of a corresponding action.

3. The system of claim 1, wherein the processor is further configured to perform operations including:
determining a crash severity for the driving event using the first crash classification, wherein the predefined order in which the plurality of actions are automatically executed is based on the crash severity.

4. The system of claim 3, wherein the first crash classification comprises a confidence that the driving event was detected as a result of a vehicle accident, and determining the crash severity for the driving event is based on the confidence.

5. The system of claim 1, further comprising a mobile device comprising the plurality of sensors.

6. The system of claim 1, wherein:
the escalation action sequence begins with a first action of the plurality of actions comprising outputting, via a mobile device, an indication of the first crash classification and a prompt to a user of the mobile device to confirm the first crash classification; and the processor is further configured to perform operations including:

determining, prior to a third time, that a denial of the first crash classification has been received from the user in response to the prompt; and terminating the escalation action sequence prior to an automatic execution of an action of the plurality of actions based on the denial of the first crash classification.

7. The system of claim 1, wherein:

the escalation action sequence begins with a first action of the plurality of actions comprising outputting, via a mobile device, an indication of the first crash classification and a prompt to a user of the mobile device to confirm the first crash classification; and the processor is further configured to perform operations including:

determining, prior to a third time, that a response to the prompt has not been received from the user;

determining that the vehicle drove during a second predefined duration starting at the second time and ending at the third time using the driving data collected during the second predefined duration; and terminating the escalation action sequence prior to an automatic execution of an action of the plurality of actions based on determining that the vehicle drove during the second predefined duration.

8. The system of claim 1, wherein the processor is further configured to perform operations including:

determining that the vehicle remained stationary for the first predefined duration after the first time using the driving data collected during the first predefined duration starting at the first time.

9. The system of claim 8, wherein:

the first crash classification is generated in response to determining that the vehicle remained stationary for the first predefined duration after the first time; or the crash prediction machine learning model is further executed on an indication that the vehicle remained stationary for the first predefined duration after the first time.

10. A method of executing crash response services by a crash detection and response system, comprising:

operating a plurality of sensors disposed in a vehicle during a trip in the vehicle to collect driving data;

detecting, using the driving data, a driving event as it occurs during the trip, wherein the driving event occurs at a first time;

generating, after a first predefined duration starting at the first time and ending at a second time, a first crash classification for the driving event, wherein generating the first crash classification comprises executing a crash prediction machine learning model on the driving data collected during the first predefined duration and the driving data used to detect the driving event;

determining that the first crash classification meets a first predefined crash threshold criterion;

initiating an escalation action sequence in response to determining that the first crash classification meets the first predefined crash threshold criterion, wherein the escalation action sequence comprises a plurality of actions that are automatically executed according to a predefined order;

generating, after a second predefined duration starting at the second time and ending at a third time, a second crash classification for the driving event, wherein generating the second crash classification comprises executing the crash prediction machine learning model on the driving data collected during the second predefined duration, the driving data collected during the first predefined duration, and the driving data used to detect the driving event:

determining that the second crash classification does not meet a second predefined crash threshold criterion; and in response to determining that the second crash classification does not meet a second predefined crash threshold criterion, terminating the escalation action sequence prior to an automatic execution of an action of the plurality of actions.

11. The method of claim 10, wherein the plurality of actions are automatically executed at corresponding predefined points in time according to the predefined order, the method further comprising:

determining, prior to each corresponding predefined point in time, whether the driving data collected up to each corresponding predefined point in time confirms the first crash classification, wherein in response to determining that the driving data collected up to a particular predefined point in time contradicts the first crash classification, the escalation action sequence is terminated prior to an execution of a corresponding action.

12. The method of claim 10, further comprising:

determining a crash severity for the driving event using the first crash classification, wherein the predefined order in which the plurality of actions are automatically executed is based on the crash severity.

13. The method of claim 12, wherein the first crash classification comprises a confidence that the driving event was detected as a result of a vehicle accident, and determining the crash severity for the driving event is based on the confidence.

14. The method of claim 10, wherein:

the escalation action sequence begins with a first action of the plurality of actions comprising outputting, via a mobile device, an indication of the first crash classification and a prompt to a user of the mobile device to confirm the first crash classification; and the method further comprises:

determining, prior to a third time, that a denial of the first crash classification has been received from the user in response to the prompt; and terminating the escalation action sequence prior to an automatic execution of an action of the plurality of actions based on the denial of the first crash classification.

15. The method of claim 10, wherein:

the escalation action sequence begins with a first action of the plurality of actions comprising outputting, via a mobile device, an indication of the first crash classification and a prompt to a user of the mobile device to confirm the first crash classification; and the method further comprises:

determining, prior to a third time, that a response to the prompt has not been received from the user;

determining that the vehicle drove during a second predefined duration starting at the second time and ending at the third time using the driving data collected during the second predefined duration; and terminating the escalation action sequence prior to an automatic execution of an action of the plurality of actions based on determining that the vehicle drove during the second predefined duration.

16. The method of claim 10, further comprising:

determining that the vehicle remained stationary for the first predefined duration after the first time using the driving data collected during the first predefined duration starting at the first time, wherein:

the first crash classification is generated in response to determining that the vehicle remained stationary for the first predefined duration after the first time; or the crash prediction machine learning model is further executed on an indication that the vehicle remained stationary for the first predefined duration after the first time.

17. A non-transitory machine-readable storage medium, including instructions that, when executed by one or more processors of a crash detection and response system, cause the one or more processors to perform operations comprising:

operating a plurality of sensors disposed in a vehicle during a trip in the vehicle to collect driving data;

detecting, using the driving data, a driving event as it occurs during the trip, wherein the driving event occurs at a first time;

generating, after a first predefined duration starting at the first time and ending at a second time, a first crash classification for the driving event, wherein generating the first crash classification comprises executing a crash prediction machine learning model on the driving data collected during the first predefined duration and the driving data used to detect the driving event;

determining that the first crash classification meets a first predefined crash threshold criterion;

initiating an escalation action sequence in response to determining that the first crash classification meets the first predefined crash threshold criterion, wherein the escalation action sequence comprises a plurality of actions that are automatically executed according to a predefined order;

generating, after a second predefined duration starting at the second time and ending at a third time, a second crash classification for the driving event, wherein generating the second crash classification comprises executing the crash prediction machine learning model on the driving data collected during the second predefined duration, the driving data collected during the first predefined duration, and the driving data used to detect the driving event;

determining that the second crash classification does not meet a second predefined crash threshold criterion; and in response to determining that the second crash classification does not meet a second predefined crash threshold criterion, terminating the escalation action sequence prior to an automatic execution of an action of the plurality of actions.

18. The non-transitory machine-readable storage medium of claim 17, wherein the operations further comprise:

determining a crash severity for the driving event using the first crash classification, wherein the predefined order in which the plurality of actions are automatically executed is based on the crash severity.

* * * * *